US012761333B2

(12) United States Patent
Lim et al.

(10) Patent No.: US 12,761,333 B2
(45) Date of Patent: Oct. 13, 2026

(54) METHOD FOR MANUFACTURING LIDAR DEVICE, AND ACTIVE ALIGN DEVICE FOR IMPLEMENTING METHOD FOR MANUFACTURING LIDAR DEVICE

(71) Applicants: SOS LAB CO., LTD., Gwangju (KR); FURONTEER INC, Seongnam-si (KR)

(72) Inventors: Chan M Lim, Yongin-si (KR); Dong Kyu Kim, Gwangju (KR); Chang Mo Jeong, Seoul (KR); Hoon Il Jeong, Chungcheongnam-do (KR); Eunsung Kwon, Uijeongbu-si (KR); Junhyun Jo, Gwangju (KR); Bumsik Won, Anyang-si (KR); Suwoo Noh, Gwangju (KR); Sang Shin Bae, Seoul (KR); Seong Min Yun, Hwaseong-si (KR); Jong Hyun Yim, Gumi-si (KR)

(73) Assignees: SOS LAB CO., LTD., Gwangju (KR); FURONTEER INC, Seongnam-si (KR)

( * ) Notice: Subject to any disclaimer, the term of this patent is extended or adjusted under 35 U.S.C. 154(b) by 369 days.

(21) Appl. No.: 18/392,395

(22) Filed: Dec. 21, 2023

(65) Prior Publication Data

US 2024/0125908 A1 Apr. 18, 2024

Related U.S. Application Data

(63) Continuation of application No. PCT/KR2022/008810, filed on Jun. 21, 2022.

(30) Foreign Application Priority Data

Jun. 21, 2021 (KR) ........................ 10-2021-0080322

(51) Int. Cl.

| | |
|---|---|
| ***G01S 17/89*** | (2020.01) |
| ***G01S 7/481*** | (2006.01) |
| ***G01S 7/497*** | (2006.01) |

(52) U.S. Cl.
CPC .......... *G01S 7/4972* (2013.01); *G01S 7/4813* (2013.01); *G01S 17/89* (2013.01)

(58) Field of Classification Search
CPC ...... G01S 7/4972; G01S 7/481; G01S 7/4815; G01S 7/4816; G01S 7/4813; G01S 17/89; G02B 7/02
See application file for complete search history.

(56) References Cited

U.S. PATENT DOCUMENTS

| | | | | |
|---|---|---|---|---|
| 10,295,660 | B1 * | 5/2019 | McMichael ............ | G02B 7/005 |
| 11,255,951 | B1 * | 2/2022 | McMichael ............ | G02B 7/005 |

(Continued)

FOREIGN PATENT DOCUMENTS

| | | | |
|---|---|---|---|
| CN | 111077507 | A | 4/2020 |
| CN | 112285669 | A | 1/2021 |

(Continued)

OTHER PUBLICATIONS

International Search Report and Written Opinion mailed Sep. 28, 2022 in International Application No. PCT/KR2022/008810, in 8 pages. English translation of ISR.

*Primary Examiner* — Jacob Y Cho
(74) *Attorney, Agent, or Firm* — Knobbe, Martens, Olson & Bear, LLP

(57) ABSTRACT

A method for manufacturing a LiDAR device is proposed. The method may include providing a LiDAR module including a laser emitting module and a laser detecting module to a target region. The method may also include adjusting, on the basis of first detecting data obtained from the laser detecting module, a relative position of a detecting optic module with respect to the laser detecting module. The method may further include adjusting, on the basis of image (Continued)

data obtained from at least one image sensor, a relative position of an emitting optic module with respect to the laser emitting module.

15 Claims, 32 Drawing Sheets

(56) References Cited

U.S. PATENT DOCUMENTS

| | | | | |
|---|---|---|---|---|
| 2016/0282453 | A1 | 9/2016 | Pennecot et al. | |
| 2019/0235064 | A1 | 8/2019 | Droz et al. | |
| 2019/0339368 | A1* | 11/2019 | Berger | G01S 17/931 |
| 2020/0033450 | A1 | 1/2020 | Zhang | |
| 2021/0405196 | A1* | 12/2021 | Hall | G01S 17/87 |

FOREIGN PATENT DOCUMENTS

| | | | | | |
|---|---|---|---|---|---|
| DE | 102020216180 | A1 | * | 6/2022 | G01S 7/4972 |
| JP | 2008176342 | A | * | 7/2008 | |
| JP | 2020503533 | A | * | 1/2020 | G01S 17/10 |
| KR | 102450708 | B1 | * | 10/2022 | G02B 27/30 |
| KR | 20230095090 | A | * | 6/2023 | H01S 5/02257 |
| WO | WO-2021116285 | A1 | * | 6/2021 | H04N 9/3191 |
| WO | WO-2022053245 | A1 | * | 3/2022 | G02B 7/025 |
| WO | WO-2024176498 | A1 | * | 8/2024 | G01S 7/4972 |

* cited by examiner

FIG. 20

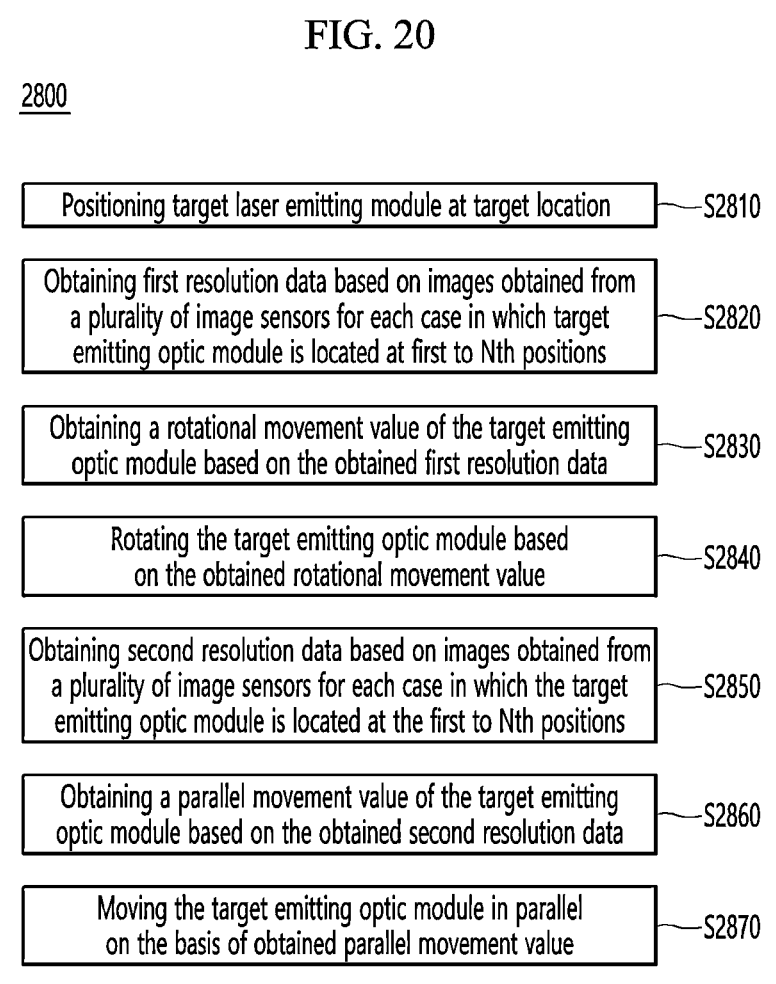

2800

| | |
|---|---|
| Positioning target laser emitting module at target location | S2810 |
| Obtaining first resolution data based on images obtained from a plurality of image sensors for each case in which target emitting optic module is located at first to Nth positions | S2820 |
| Obtaining a rotational movement value of the target emitting optic module based on the obtained first resolution data | S2830 |
| Rotating the target emitting optic module based on the obtained rotational movement value | S2840 |
| Obtaining second resolution data based on images obtained from a plurality of image sensors for each case in which the target emitting optic module is located at the first to Nth positions | S2850 |
| Obtaining a parallel movement value of the target emitting optic module based on the obtained second resolution data | S2860 |
| Moving the target emitting optic module in parallel on the basis of obtained parallel movement value | S2870 |

METHOD FOR MANUFACTURING LIDAR DEVICE, AND ACTIVE ALIGN DEVICE FOR IMPLEMENTING METHOD FOR MANUFACTURING LIDAR DEVICE

CROSS REFERENCE TO RELATED APPLICATIONS

This is a continuation application of International Patent Application No. PCT/KR2022/008810 filed on Jun. 21, 2022, which claims priority to Korean patent application No. KR 10-2021-0080322 filed Jun. 21, 2021, contents of each of which are incorporated herein by reference in their entireties.

BACKGROUND

Technical Field

The present disclosure relates to a manufacturing method for a LiDAR device and an active alignment device for implementing the same. More specifically, the present disclosure relates to a manufacturing method for a LiDAR device including a laser emitting module, a laser detecting module, an emitting optic module, and a detecting optic module, and an active alignment device for implementing the same.

Description of Related Technology

In recent years, as interest in self-driving cars and driverless cars increases, light detection and ranging (LiDAR) is in the spotlight. LiDAR tends to be associated not only with automobiles but also with various fields such as drones and aircraft, because it has the advantages of having excellent precision and resolution and of being able to perceive objects in three dimensions, as a device that uses a laser to obtain surrounding distance information.

SUMMARY

One aspect is a manufacturing method for a LiDAR device including a laser emitting module, a laser detecting module, an emitting optic module, and a detecting optic module.

Another aspect is a manufacturing method for a LiDAR device for solving the problem of optical misalignment between components of a LiDAR device including a laser emitting module, laser detecting module, emitting optic module, and detecting optic module.

Another aspect is a method for manufacturing a LiDAR (Light Detection And Ranging) device comprising a laser emitting module, a laser detecting module, an emitting optic module and a detecting optic module, the method comprising: providing a LiDAR module comprising the laser emitting module and the laser detecting module on a target area; positioning the detecting optic module on the laser detecting module; adjusting a relative position of the detecting optic module with respect to the laser detecting module based on a first detecting data obtained from the laser detecting module, wherein the first detecting data is generated based on light having a predetermined pattern; fixing the detecting optic module so that the adjusted relative position of the detecting optic module with respect to the laser detecting module is maintained; positioning the emitting optic module on the laser emitting module; adjusting a relative position of the emitting optic module with respect to the laser emitting module based on an image data obtained from at least one of image sensors, wherein the image data is generated for laser emitted from the laser emitting module; shifting the adjusted relative position of the emitting optic module with respect to the laser emitting module based on a second detecting data obtained from the laser detecting module, wherein the second detecting data is generated based on laser emitted from the laser emitting module; and fixing the emitting optic module so that the shifted relative position of the emitting optic module to the laser emitting module is maintained.

The present disclosure is not limited to the above-described aspects, and other aspects not mentioned will be apparent to those skilled in the art from this specification and the attached drawings.

According to an embodiment of the present disclosure, a manufacturing method for a LiDAR device including a laser emitting module, laser detecting module, emitting optic module, and detecting optic module may be provided.

According to an embodiment of the present disclosure, a manufacturing method for a LiDAR device for solving the problem of optical misalignment between components of a LiDAR device including a laser emitting module, a laser detecting module, an emitting optic module, and a detecting optic module can be provided.

The effects of the present disclosure are not limited to the effects described above, and effects not mentioned can be clearly understood by those skilled in the art from this specification and the attached drawings.

BRIEF DESCRIPTION OF THE DRAWINGS

FIG. 20 is a diagram illustrating an active alignment method for a transmission module of a LiDAR device according to an embodiment.

DETAILED DESCRIPTION

Figure 1:
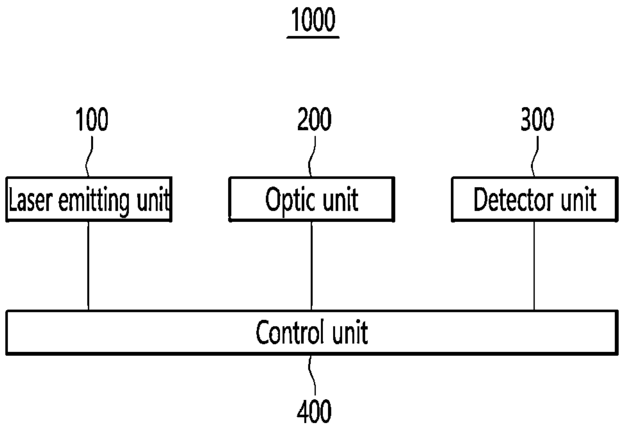
FIG. 1 is a diagram illustrating a LiDAR device according to an embodiment.

A solid-state LiDAR device may obtain distance information about a three-dimensional surrounding space without a mechanically moving structure, in which a laser emitting module and a laser detecting module may be used to implement the solid-state LiDAR device.

Herein, in order to manufacture the above-described LiDAR device or solid-state LiDAR device, it is important to obtain optical alignment between components included in the LiDAR device. In particular, as the above-described LiDAR device or solid-state LiDAR device becomes more advanced, problems arise when the optical alignment between components is misaligned.

Therefore, as described above, adjusting the optical alignment between the components included in the LiDAR device may serve as an important technical matter in actually implementing the products. In particular, in order to improve the productivity of LiDAR devices, technology is needed to automatically adjust the optical alignment between the components included in the LiDAR device.

Since the embodiments described in this specification are intended to clearly explain the idea of the present disclosure to those skilled in the art in the field to which the present disclosure pertains, the present disclosure is not limited to the embodiments described herein, but the scope of the present disclosure should be construed to include modifications or variations that do not depart from the spirit of the present disclosure.

The terms used herein are general terms that are currently widely used as much as possible in consideration of their functions in the present disclosure. This may vary depending on the intention of those skilled in the art in the technical field to which the present disclosure belongs, precedents, or the emergence of new technologies. However, when a specific term is defined and used with an arbitrary meaning, the meaning of the term will be described separately. Therefore, the terms used in this specification should be interpreted based on the actual meaning of the term and the overall content of this specification, not just the name of the term.

The drawings attached to this specification are intended to easily explain the present disclosure. Since the shapes shown in the drawings may be exaggerated as necessary to aid understanding of the present disclosure, the present disclosure is not limited by the drawings.

When an element or layer described herein is referred to as being "on" another element or layer, it can include both cases where intervening elements or layers may be present, as well as the element or layer may be directly on another element or layer.

Throughout this specification, like reference numerals may in principle refer to like elements.

The terms "first", "second," etc., as used in the description of this specification may be understood as identification symbols to distinguish one component from another component.

The terms "module" and "unit" for components used in the description of this specification are used or mixed to facilitate preparation of the specification, and may not have distinct meanings or roles in and of themselves.

When it is determined that the detailed description of the known configuration or function related to the present disclosure in this specification may obscure the gist of the present disclosure, detailed explanations regarding this will be omitted as necessary.

According to an embodiment of the present disclosure, a method for manufacturing a LiDAR (Light Detection And Ranging) device comprising a laser emitting module, a laser detecting module, an emitting optic module and a detecting optic module, the method comprising: providing a LiDAR module comprising the laser emitting module and the laser detecting module on a target area; positioning the detecting optic module on the laser detecting module; adjusting a relative position of the detecting optic module with respect to the laser detecting module based on a first detecting data obtained from the laser detecting module, wherein the first detecting data is generated based on light having a predetermined pattern; fixing the detecting optic module so that the adjusted relative position of the detecting optic module with respect to the laser detecting module is maintained; positioning the emitting optic module on the laser emitting module; adjusting a relative position of the emitting optic module with respect to the laser emitting module based on an image data obtained from at least one of image sensors, wherein the image data is generated for laser emitted from the laser emitting module; shifting the adjusted relative position of the emitting optic module with respect to the laser emitting module based on a second detecting data obtained from the laser detecting module, wherein the second detecting data is generated based on laser emitted from the laser emitting module; and fixing the emitting optic module so that the shifted relative position of the emitting optic module to the laser emitting module is maintained.

Herein, the LiDAR module further includes an emitting optic holder and detecting optic holder.

Herein, the positioning the emitting optic module on the laser emitting module comprises: inserting the emitting optic module into the emitting optic holder.

Herein, the positioning the detecting optic module on the laser detecting module comprises: inserting the detecting optic module into the detecting optic holder.

Herein, the manufacturing method further comprising: applying an adhesive material around the emitting optic holder; wherein the fixing the emitting optic module comprises: curing the adhesive material applied around the emitting optic holder.

Herein, the manufacturing method further comprising: applying an adhesive material around the detecting optic holder; wherein the fixing the detecting optic module comprises: curing the adhesive material applied around the detecting optic holder.

Herein, the image data includes a first image data and a second image data, wherein the first image data is generated for laser emitted from the laser emitting module when the emitting optic module is in a first position, wherein the second image data is generated for laser emitted from the laser emitting module when the emitting optic module is in a second position.

Herein, the second position of the emitting optic module is a position that is moved in parallel with respect to a first axis from the first position of the emitting optic module, wherein a direction of the first axis is a direction in which the laser emitting module and the emitting optic module are positioned.

Herein, the image data includes a first image data obtained from a first image sensor and a second image data obtained from a second image sensor.

Herein, the first image data is generated for laser emitted from a first emitting unit group of the laser emitting module, and wherein the second image data is generated for laser emitted from a second emitting unit group of the laser emitting module.

Herein, the first emitting unit group and the second emitting unit group include at least one of emitting unit.

Herein, the first emitting unit group and the second emitting unit group are disposed on different areas.

Herein, the first detecting data includes a detecting data generated based on light having the predetermined pattern when the detecting optic module is in a first position and a detecting data generated based on light having the predetermined pattern when the detecting optic module is in a second position.

Herein, the second position of the detecting optic module is a position that is moved in parallel with respect to a first axis from the first position of the detecting optic module, wherein a direction of the first axis is a direction in which the laser detecting module and the detecting optic module are positioned.

Herein, a wavelength range of the light having the predetermined pattern overlaps at least partially with a wavelength range of laser emitted from the laser emitting module.

According to another embodiment of the present disclosure, a method of manufacturing a LiDAR device including a laser emitting module, a laser detecting module, an emitting optic holder, a detecting optic holder, an emitting optic module, and a detecting optic module may be provided, the method including providing a LiDAR module including the laser emitting module, the laser detecting module, the emitting optic holder, and the detecting optic holder to a target region, applying an adhesive material around the emitting optic holder, positioning the emitting optic module on the laser emitting module, adjusting the relative position of the emitting optic module with respect to the laser emitting module based on image data obtained from at least one image sensor, the image data being generated for the laser emitted from the laser emitting module, curing the adhesive material applied around the emitting optic holder to fix the emitting optic module so that the adjusted relative position of the emitting optic module with respect to the laser emitting module is maintained, applying adhesive material around the detecting optic holder, positioning the detecting optic module on the laser detecting module, adjusting the relative position of the detecting optic module with respect to the laser detecting module based on the first detecting data obtained from the laser detecting module, the first detecting data being generated based on light with a predetermined pattern, shifting the adjusted relative position of the detecting optic module with respect to the laser detecting module on the basis of second detecting data obtained from the laser detecting module, the second detecting data being generated based on the laser emitted from the laser emitting module, and curing the adhesive material applied around the detecting optic holder to fix the detecting optic module so that the shifted relative position of the detecting optic module with respect to the laser detecting module is maintained.

According to another embodiment of the present disclosure, a method of manufacturing a LiDAR device including a laser emitting module, a laser detecting module, an emitting optic module, and a detecting optic module may be provided, the method including providing a LiDAR module including the laser emitting module and the laser detecting module to the target region, positioning the detecting optic module on the laser detecting module, adjusting the relative position of the detecting optic module with respect to the laser detecting module based on the first detecting data obtained from the laser detecting module, the first detecting data being generated based on light with a predetermined pattern, fixing the detecting optic module so that the adjusted relative position of the detecting optic module with respect to the laser detecting module is maintained, positioning the emitting optic module on the laser emitting module, adjusting the relative position of the emitting optic module with respect to the laser emitting module based on image data obtained from at least one image sensor, the image data being generated for the laser emitted from the laser emitting module, shifting the adjusted relative position of the emitting optic module with respect to the laser emitting module on the basis of second detecting data obtained from the laser detecting module, the second detecting data being generated based on the laser emitted from the laser emitting module, and fixing the emitting optic module so that the shifted relative position of the emitting optic module with respect to the laser emitting module is maintained.

According to another embodiment of the present disclosure, a method of operating an active alignment device including a carrier module for carrying a target LiDAR module, a first optic module including an image sensor for obtaining a laser emitted from the laser emitting module, a second optic module including an illuminating unit for emitting light, a position adjustment module for adjusting the position of at least one component included in the target LiDAR module, and an adhesive material curing module is provided, the method including moving the carrier module to provide a LiDAR module including a laser emitting module and a laser detecting module to a target region; operating the position adjustment module to position an emitting optic module on the laser emitting module; operating the position adjustment module to adjust the relative position of the emitting optic module with respect to the laser emitting module on the basis of image data obtained from an image sensor included in the first optic module, the image data being generated for the laser emitted from the laser emitting module; operating the adhesive material curing module to fix the emitting optic module so that the adjusted relative position of the emitting optic module relative to the laser emitting module is maintained; moving the carrier module to position a detecting optic module on the laser detecting module; operating the position adjustment module to adjust the relative position of the detecting optic module with respect to the laser detecting module on the basis of first detecting data obtained from the laser detecting module, the first detecting data being generated based on light with a predetermined pattern emitted from the second optic module; operating the position adjustment module to shift the adjusted relative position of the detecting optic module on the basis of second detecting data obtained from the laser detecting module, the second detecting data being generated based on the laser emitted from the laser emitting module; and operating the adhesive material curing module to fix the detecting optic module so that the shifted relative position of the detecting optic module with respect to the laser detecting module is maintained.

According to another embodiment of the present disclosure, an active alignment device that is provided with a LiDAR device including a laser emitting module, a laser detecting module, an emitting optic module, and a detecting optic module to perform active alignment for the LiDAR device is provided, the active alignment device including a carrier module for carrying the target LiDAR module; a first optic module including an image sensor for obtaining a laser emitted from the laser emitting module; a second optic module including an illuminating unit for emitting light; a position adjustment module for adjusting the position of at least one component included in the target LiDAR module; and a controller for controlling the carrier module, the first optic module, the second optic module, and the position adjustment module, in which the controller delivers the carrier module equipped with a LiDAR module including a laser emitting module and a laser detecting module to the target region, operates the position adjustment module to position the emitting optic module on the laser emitting module, obtains image data from the first optic module, the image data being generated for the laser emitted from the laser emitting module, operates the position adjustment module to adjust the position of the emitting optic module based on the image data, operates the position adjustment module to position the detecting optic module on the laser detecting module, operates the second optic module to emit light with a predetermined pattern, obtains first detecting data from the laser detecting array, the first detecting data being generated based on light having the predetermined pattern, operates the position adjustment module to adjust the position of the detecting optic module based on the first detecting data, obtains second detecting data from the laser detecting array, the second detecting data being generated based on the laser emitted from the laser emitting module, and operates the position adjustment module to shift the position of the detecting optic module based on the second detecting data.

Hereinafter, the LiDAR device according to the present disclosure will be described.

It should be noted that the LiDAR device herein may be understood as a concept that includes various devices, such as, but is not limited to, a Light Detection And Ranging (LiDAR), Time-of-Flight sensor (TOF sensor), etc. that measure distance using a laser.

1. Light Detection and Ranging Device (LiDAR Device)

A LiDAR device is a device that detects the distance to a target object and the position of the target object using a laser. For example, the LiDAR device may output laser and, when the output laser is reflected from the target object, receive the reflected laser and measure the distance between the target object and the LiDAR device and the position of the target object. Herein, the distance and position of the target object may be expressed through a coordinate system. For example, the distance and position of the target object may be expressed in a spherical coordinate system $(r, \theta, \phi)$, but are not limited thereto, and may be expressed in a rectangular coordinate system (X, Y, Z) or a cylindrical coordinate system $(r, \theta, z)$.

In addition, although the target object may refer to at least one object, it may refer to, but is not limited to, a part of an object for reflecting at least a portion of the laser output from the LiDAR device.

In addition, the LiDAR device according to an embodiment may use a laser that is output from the LiDAR device to be reflected from the target object in order to measure the distance to the target object.

For example, the LiDAR device according to an embodiment may use the time of flight (TOF) of the laser taken until the laser is output and then detected, in order to measure the distance to the target object.

More specifically, for example, the LiDAR device according to an embodiment may measure the distance to the target object, by using the difference between a time value based on the output time of the output laser and a time value based on the detected time of the laser reflected and detected by the target object.

Herein, the time value based on the output time of the laser may be obtained based on a control unit included in the LiDAR device according to an embodiment.

For example, the time value based on the output time of the laser may be obtained based on the generation time of a trigger signal generated by the control unit included in the LiDAR device according to an embodiment, but is not limited thereto.

In addition, the time value based on the output time of the laser may be obtained based on the laser emitting unit included in the LiDAR device according to an embodiment.

For example, the time value based on the output time of the laser may be obtained by detecting the operation of the laser emitting unit included in the LiDAR device according to an embodiment, but is not limited thereto.

Herein, the detection of the operation of the laser emitting unit may refer to detection of flow of electric current, change in electric field, etc. in the laser emitting unit, but is not limited thereto.

In addition, the time value based on the output time of the laser may be obtained based on the detector unit included in the LiDAR device according to an embodiment.

For example, the time value based on the laser output time may be obtained based on a time value when the detector unit included in the LiDAR device according to an embodiment detects the laser that is not reflected from the target object, but is not limited thereto.

Herein, a reference optical path may be provided in which the laser output from the laser emitting unit is received by the detector unit, but is not limited thereto.

In addition, a time value based on the detected time of the laser reflected and detected by the target object may be obtained based on the detector unit included in the LiDAR device according to an embodiment.

For example, the time value based on the detected time of the laser reflected and detected by the target object may be obtained based on the time value of detecting the laser reflected from the target object, in the detector unit included in the LiDAR device according to an embodiment, but is not limited thereto.

In addition, the LiDAR device according to an embodiment may use a triangulation method, an interferometry method, a phase shift measurement, etc., in addition to Time of Flight, to measure the distance to the target object, but is not limited thereto.

FIG. 1 is a diagram illustrating a LiDAR device according to an embodiment.

Referring to FIG. 1, a LiDAR device 1000 according to an embodiment may include a laser emitting unit 100.

Herein, a laser emitting unit 100 according to an embodiment may generate or output a laser.

In addition, the laser emitting unit 100 according to an embodiment may include one or more laser output elements.

For example, the laser emitting unit 100 according to an embodiment may include a single laser output element, and may also include a plurality of laser output elements.

In addition, the laser emitting unit 100 according to an embodiment may be implemented as an array in which a plurality of laser output elements are arranged in an array, but is not limited thereto.

For example, the laser emitting unit 100 according to an embodiment may be implemented as a VCSEL array in which a plurality of vertical cavity surface emitting lasers (VCSELs) are arranged in an array, but is not limited thereto.

In addition, the laser emitting unit 100 according to an embodiment may include a laser output device, such as, but is not limited to a laser diode (LD), a solid-state laser, a high power laser, a light entitling diode (LED), a vertical cavity surface emitting laser (VCSEL), an external cavity diode laser (ECDL).

In addition, a wavelength of the laser output from the laser emitting unit 100 according to an embodiment may be located in a specific wavelength range.

For example, the wavelength of the laser output from the laser emitting unit 100 according to an embodiment may be located in the 905 nm band, may be located in the 940 nm band, and may be located in the 1550 nm band, but embodiments are not limited thereto.

Herein, the wavelength band may refer to a band within a certain range based on the center wavelength.

For example, the 905 nm band may refer to a band within a range of 10 nm around 905 nm, the 940 nm band may refer to a band within a range of 10 nm around 940 nm, and the 1550 nm band may refer to a band within a range of 10 nm around 1550 nm, but embodiments are not limited thereto.

In addition, the wavelength of the laser output from the laser emitting unit 100 according to an embodiment may be located in various wavelength ranges.

For example, the wavelength of the first laser output from the first laser output element included in the laser emitting unit 100 according to an embodiment may be located in the 905 nm band, and the wavelength of the second laser output from the second laser output element included in the laser emitting unit 100 according to an embodiment may be located in the 1550 nm band, but embodiments are not limited thereto.

In addition, the wavelengths of the laser output from the laser emitting unit 100 according to an embodiment are located within a specific wavelength range, but may be different wavelengths.

For example, when the wavelength of the first laser output from the first laser output element included in the laser emitting unit 100 according to an embodiment is located in the 940 nm band, it may be a 939 nm wavelength, when the wavelength of the second laser output from the second laser output element included in the laser emitting unit 100 according to an embodiment is located in the 940 nm band, it may be a 943 nm wavelength, and so on.

Referring again to FIG. 1, the LiDAR device 1000 according to an embodiment may include an optic unit 200.

Here, the optic unit may be variously expressed as a steering unit, a scanning unit, etc. to describe the present disclosure, but is not limited thereto.

An optic unit 200 according to an embodiment may function to change a path of flight of the laser.

For example, the optic unit 200 according to an embodiment may function to change the path of flight of the laser output from the laser emitting unit 100 and, when the laser output from the laser emitting unit 100 is reflected from the target object, may function to change the path of flight of the laser reflected from the target object, but embodiments are not limited thereto.

In addition, the optic unit 200 according to an embodiment may function to change the path of flight of the laser by reflecting the laser.

For example, the optic unit 200 according to an embodiment may function to change the path of flight by reflecting the laser output from the laser emitting unit 100 and, when the laser output from the laser emitting unit 100 is reflected from the target object, may function to change the path of flight by reflecting the laser reflected from the target object, but embodiments are not limited thereto.

Herein, the optic unit 200 according to an embodiment may include at least one optical means of various optical means for reflecting the laser.

For example, the optic unit 200 according to an embodiment may include at least one optical means of optical means, including, but not limited to, mirror, resonance scanner, MEMS mirror, voice coil motor (VCM), polygonal mirror, rotating mirror, galvano mirror, etc.

In addition, the optic unit 200 according to an embodiment may change the path of flight of the laser by refracting the laser.

For example, the optic unit 200 according to an embodiment may function to change the path of flight by refracting the laser output from the laser emitting unit 100 and, when the laser output from the laser emitting unit 100 is reflected from the target object, may function to change the flight path by refracting the laser reflected from the target object, but embodiments are not limited thereto.

Herein, the optic unit 200 according to an embodiment may include at least one optical means of various optical means for refracting the laser.

For example, the optic unit 200 according to an embodiment may include at least one optical means of optical means, including, but not limited to, Lenses, prisms, micro lenses, microfluidic lenses, metasurfaces, and the like.

In addition, the optic unit 200 according to an embodiment may change the path of flight of the laser by changing the phase of the laser.

For example, the optic unit 200 according to an embodiment may function to change the flight path by changing the phase of the laser output from the laser emitting unit 100 and, when the laser output from the laser emitting unit 100 is reflected from the target object, may function to change the flight path by changing the phase of the laser reflected from the target object, but embodiments are not limited thereto.

Herein, the optic unit 200 according to an embodiment may include at least one optical means of various optical means for changing the phase of the laser.

For example, the optic unit 200 according to an embodiment may include at least one optical means of optical means, including, but not limited to, an optical phased array (OPA), a metalens, a metasurface, and the like.

In addition, the optic unit 200 according to an embodiment may include two or more optic units.

For example, the optic unit 200 according to an embodiment may include a transmitting optic unit for emitting the laser output from the laser emitting unit 100 according to an embodiment on the scan area of the LiDAR device, and a receiving optic unit for transmitting the laser reflected from the target object to a detector unit 300, but is not limited thereto.

In addition, for example, the optic unit 200 according to an embodiment may include a first optic unit for changing the path of flight of the laser output from the laser emitting unit 100 according to an embodiment to the direction of the first group, and a second optic unit for changing the path of flight of the laser output from the laser emitting unit 100 according to an embodiment to the direction of the second group, but is not limited thereto.

In addition to the examples described above, the optic unit 200 according to an embodiment may be provided in a combination of various configurations, in order to expand the scan area of the LiDAR device using the laser output from the laser emitting unit 100 according to an embodiment and transmit the laser reflected from the target object to the detector unit 300.

Referring again to FIG. 1, the LiDAR device 100 according to an embodiment may include a detector unit 300.

Herein, in order to describe the present disclosure, the detector unit may be variously expressed as a light receiving unit, a receiving unit, a sensor unit, etc., but is not limited thereto.

A detector unit 300 according to an embodiment may function to detect a laser.

For example, the detector unit 300 according to an embodiment may detect a laser reflected from a target object located within the scan area of the LiDAR device 100 according to an embodiment.

In addition, the detector unit 300 according to an embodiment may be arranged to receive a laser, and may function to generate an electrical signal based on the received laser.

For example, the detector unit 300 according to an embodiment may be arranged to receive the laser reflected from the target object located within the scan area of the LiDAR device 100 according to an embodiment, and may generate an electrical signal based on the received laser.

Herein, the detector unit 300 according to an embodiment may be arranged to receive the laser reflected from the target object located within the scan area of the LiDAR device 100 according to an embodiment through at least one optical means, in which the at least one optical means may be included in the above-described optical unit and may include, but is not limited to, an optical filter, etc.

In addition, the detector unit 300 according to an embodiment may generate laser detection information based on the generated electrical signal.

For example, the detector unit 300 according to an embodiment may generate the laser detection information by comparing a predetermined threshold value with a rising edge and a falling edge of the generated electrical signal, or a median value of the rising edge and the falling edge, but is not limited thereto.

In addition, for example, the detector unit 300 according to an embodiment may generate histogram data corresponding to laser detection information on the basis of the generated electrical signal, but is not limited thereto.

In addition, the detector unit 300 according to an embodiment may determine a laser detection time based on the generated laser detection information.

For example, the detector unit 300 according to an embodiment may determine the laser detection time on the basis of the detection information of the laser generated based on the rising edge of the generated electrical signal, determine the laser detection time on the basis of the detection information of the laser generated based on the falling edge of the generated electrical signal, and determine the laser detection time on the basis of the laser detection information generated based on the rising edge of the generated electrical signal and the laser detection information generated based on the falling edge, but embodiments are not limited thereto.

In addition, for example, the detector unit 300 according to an embodiment may determine the laser detection time on the basis of histogram data generated based on the generated electrical signal, but is not limited thereto.

More specifically, for example, the detector unit 300 according to an embodiment may determine the laser detection time on the basis of the peak of the generated histogram data, determination of rising edge and falling edge based on predetermined values, etc., but is not limited thereto.

Herein, the histogram data may be generated based on an electrical signal generated from the detector unit 300 according to an embodiment, during at least one scan cycle.

In addition, the detector unit 300 according to an embodiment may include at least one detector element of various detector elements.

For example, the detector unit 300 according to an embodiment may include at least one detector element of detector elements, including, but not limited to, PN photodiode, phototransistor, PIN photodiode, avalanche photodiode (APD), single-photon avalanche diode (SPAD), silicon photomultipliers (SiPM), comparator, complementary metal-oxide-semiconductor (CMOS), charge coupled device (CCD), and the like.

In addition, the detector unit 300 according to an embodiment may include one or more detector elements.

For example, the detector unit 300 according to an embodiment may include a single detector element, and may also include a plurality of detector elements.

In addition, the detector unit 300 according to an embodiment may be configured as an array in which a plurality of detector elements arranged in an array form, but is not limited thereto.

For example, the detector unit 300 according to an embodiment may be implemented as a SPAD array in which a plurality of single photon avalanche diodes (SPADs) are arranged in an array form, but is not limited thereto.

Referring again to FIG. 1, the LiDAR device 1000 according to an embodiment may include a control unit 400.

Herein, the control unit may be expressed in various ways as a controller, etc. when describing the present disclosure, but is not limited thereto.

A control unit 400 according to an embodiment may control operations of the laser emitting unit 100, the optic unit 200, or the detector unit 300.

In addition, the control unit 400 according to an embodiment may control the operation of the laser emitting unit 100.

For example, the control unit 400 may control a output time of the laser output from the laser emitting unit 100. In addition, the control unit 400 may control the power of the laser output from the laser emitting unit 100. In addition, the control unit 400 may control the pulse width of the laser output from the laser emitting unit 100. In addition, the control unit 400 may control the cycle of the laser output from the laser emitting unit 100. In addition, when the laser emitting unit 100 includes a plurality of laser output elements, the control unit 400 may control the laser emitting unit 100 to allow some of the plurality of laser output elements to be operated.

In addition, the control unit 400 according to an embodiment may control the operation of the optic unit 200.

For example, the control unit 400 may control the operating speed of the optic unit 200. Specifically, when the optic unit 200 includes a rotating mirror, the rotation speed of the rotating mirror may be controlled, and when the optic unit 200 includes a MEMS mirror, the repetition period of the MEMS mirror may be controlled, but embodiments are not limited thereto.

In addition, for example, the control unit 400 may control the degree of operation of the optic unit 200. Specifically, when the optic unit 200 includes a MEMS mirror, the operating angle of the MEMS mirror may be controlled, but is not limited thereto.

In addition, the control unit 400 according to an embodiment may control the operation of the detector unit 300.

For example, the control unit 400 may control the sensitivity of the detector unit 300. Specifically, the control unit 400 may control the sensitivity of the detector unit 300 by adjusting a predetermined threshold value, but is not limited thereto.

In addition, for example, the control unit 400 may control the operation of the detector unit 300. Specifically, the control unit 400 may control on/Off of the detector unit 300 and, when the control unit 300 includes a plurality of sensor elements, may control the operation of the detector unit 300 so that some sensor elements of the plurality of sensor elements are operated.

In addition, the control unit 400 according to an embodiment may generate laser detection information based on an electrical signal generated from the detector unit 300.

For example, the control unit 400 according to an embodiment generates laser detection information by comparing a predetermined threshold value with a rising edge or a falling edge of the electrical signal generated from the detector unit 300, or the median value between the rising edge and the falling edge, but embodiments are not limited thereto.

In addition, for example, the control unit 400 according to an embodiment may generate histogram data corresponding to the detection information of the laser based on the electrical signal generated from the detector unit 300, but is not limited thereto.

In addition, the control unit 400 according to an embodiment may determine the laser detection time based on the laser detection information generated from the detector unit 300.

For example, the control unit 400 according to an embodiment may determine the laser detection time on the basis of the laser detection information generated based on the rising edge of the electrical signal generated from the detector unit 300, determine the timing of laser detection on the basis of the laser detection information generated based on the falling edge of the generated electrical signal, and determine the laser detection time on the basis of the laser detection information generated based on the rising edge of the generated electrical signal and the laser detection information generated based on the falling edge, embodiments are not limited thereto.

In addition, for example, the control unit 400 according to an embodiment determines the laser detection time on the basis of histogram data generated based on the electrical signal generated from the detector unit 300, but is not limited thereto.

More specifically, for example, the control unit 400 according to an embodiment may determine the laser detection time on the basis of the peak of the histogram data generated from the detector unit 300, determination of the rising edge and the falling edge based on a predetermined value, and the like, but is not limited thereto.

Herein, the histogram data may be generated based on an electrical signal generated from the detector unit 300 according to an embodiment, during at least one scan cycle.

In addition, the control unit 400 according to an embodiment may obtain information on the distance to the target object on the basis of the determined laser detection time.

For example, the control unit 400 according to an embodiment may obtain the information on the distance to the target object on the basis of the determined laser output time and the determined laser detection time, but is not limited thereto.

Figure 2:
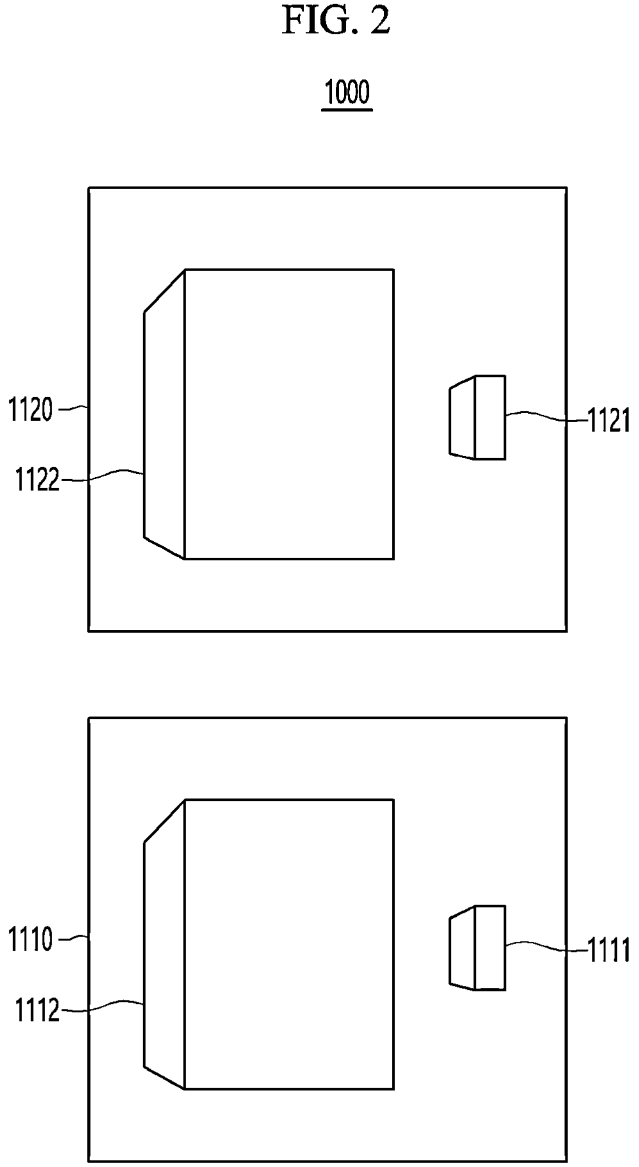
FIG. 2 is a diagram illustrating a LiDAR device according to an embodiment.

FIG. 2 is a diagram illustrating a LiDAR device according to an embodiment.

Referring to FIG. 2, the LiDAR device 1100 according to an embodiment may include a transmission module 1110 and a reception module 1120.

In addition, the transmission module 1110 may include a laser emitting array 1111 and an emitting optic module 1112, but is not limited thereto.

Herein, since the above-described contents of the laser emitting unit may be applied to the laser emitting array 1111, a redundant description will be omitted.

In addition, the laser emitting array 1111 may output at least one laser. For example, the laser emitting array 1111 may output a plurality of lasers, but is not limited thereto.

In addition, the laser emitting array 1111 may output at least one laser at a first wavelength. For example, the laser emitting array 1111 may output at least one laser at a wavelength of 940 nm, and output the plurality of lasers at a wavelength of 940 nm, but embodiments are not limited thereto.

Herein, the first wavelength may be a wavelength range including an error range. For example, although the first wavelength is a wavelength of 940 nm with an error range of 5 nm, which may refer to a wavelength range from 935 nm to 945 nm, embodiments are not limited thereto.

In addition, the laser emitting array 1111 may output at least one laser at the same time point. For example, the laser emitting array 1111 may output at least one laser at the same time, such as outputting a first laser at a first time point, outputting first and second lasers at a second time point, and so on.

In addition, the emitting optic module 1112 may include at least two lens layers. For example, the emitting optic module 1112 may include at least four lens layers, but is not limited thereto.

In addition, the emitting optic module 1112 may collimate the laser output from the laser emitting array 1111. For example, the emitting optic module 1112 may change the divergence of the first laser by collimating the first laser output from the laser emitting array 1111, but is not limited thereto.

In addition, the emitting optic module 1112 may steer the laser output from the laser emitting array 1111. For example, the emitting optic module 1112 may steer the first laser output from the laser emitting array 1111 in a first direction, and may steer the second laser output from the laser emitting array 1111 in a second direction, but embodiments are not limited thereto.

In addition, the emitting optic module 1112 may steer the plurality of lasers in order to emit a plurality of lasers output from the laser emitting array 1111 at different angles within a range of (x) degrees to (y) degrees. For example, the emitting optic module 1112 may steer the first laser in a first direction to emit the first laser output from the laser emitting array 1111 at (x) degree, and may steer the second laser in the second direction to emit the second laser output from the laser emitting array 1111 in (y) degree, but embodiments are not limited thereto.

In addition, the reception module 1120 may include a laser detecting array 1121 and a detecting optic module 1122, but is not limited thereto.

Herein, since the above-described contents of the detector unit may be applied to the laser detecting array 1121, a redundant description will be omitted.

In addition, the laser detecting array 1121 may detect at least one laser. For example, the laser detecting array 1121 may detect a plurality of lasers.

In addition, the laser detecting array 1121 may include a plurality of detectors. For example, the laser detecting array 1121 may include a first detector and a second detector, but is not limited thereto.

In addition, each of the plurality of detectors included in the laser detecting array 1121 may receive different lasers from each other. For example, the first detector included in the laser detecting array 1121 may receive a first laser beam received in a first direction, and the second detector may receive a second laser beam received in a second direction, but embodiments are not limited thereto.

In addition, the laser detecting array 1121 may detect at least a portion of the laser emitted from the transmission module 1110. For example, the laser detecting array 1121 may detect at least a portion of the first laser and at least a portion of the second laser, which are emitted from the transmission module 1110, but is limited thereto.

In addition, the detecting optic module 1122 may transmit the laser emitted from the transmission module 1110 to the laser detecting array 1121. For example, the detecting optic module 1122 may transmit the first laser to the laser detecting array 1121 when the first laser emitted from the transmission module 1110 in the first direction is reflected from the target object located in the first direction, and may transmit the second laser to the laser detecting array 1121 when the second laser emitted in the second direction is reflected from the target object located in the second direction, but embodiments are not limited thereto.

In addition, the detecting optic module 1122 may distribute the laser emitted from the transmission module 1110 into at least two different detectors. For example, the detecting optic module 1122 may distribute the first laser into the first detector included in the laser detecting array 1121 when the first laser emitted from the transmission module 1110 in the first direction is reflected from the target object located in the first direction, and distribute the second laser into the second detector included in the laser detecting array 1121 when the second laser emitted in the second direction is reflected from the target object located in the second direction, but embodiments are not limited thereto.

In addition, at least a portion of the laser emitting array 1111 and the laser detecting array 1121 may be optically coupled. For example, the first laser output from the first laser emitting element included in the laser emitting array 1111 may be detected by the first detector included in the laser detecting array 1121, and the second laser output from the second laser emitting element included in the laser emitting array 1111 may be detected by the second detector included in the laser detecting array 1121, but embodiments are not limited thereto.

Figure 3:
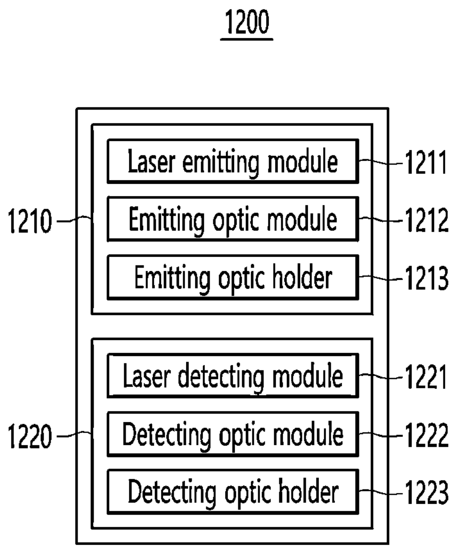
FIGS. 3 and 4 are diagrams illustrating a LiDAR device according to an embodiment.
Figure 4:
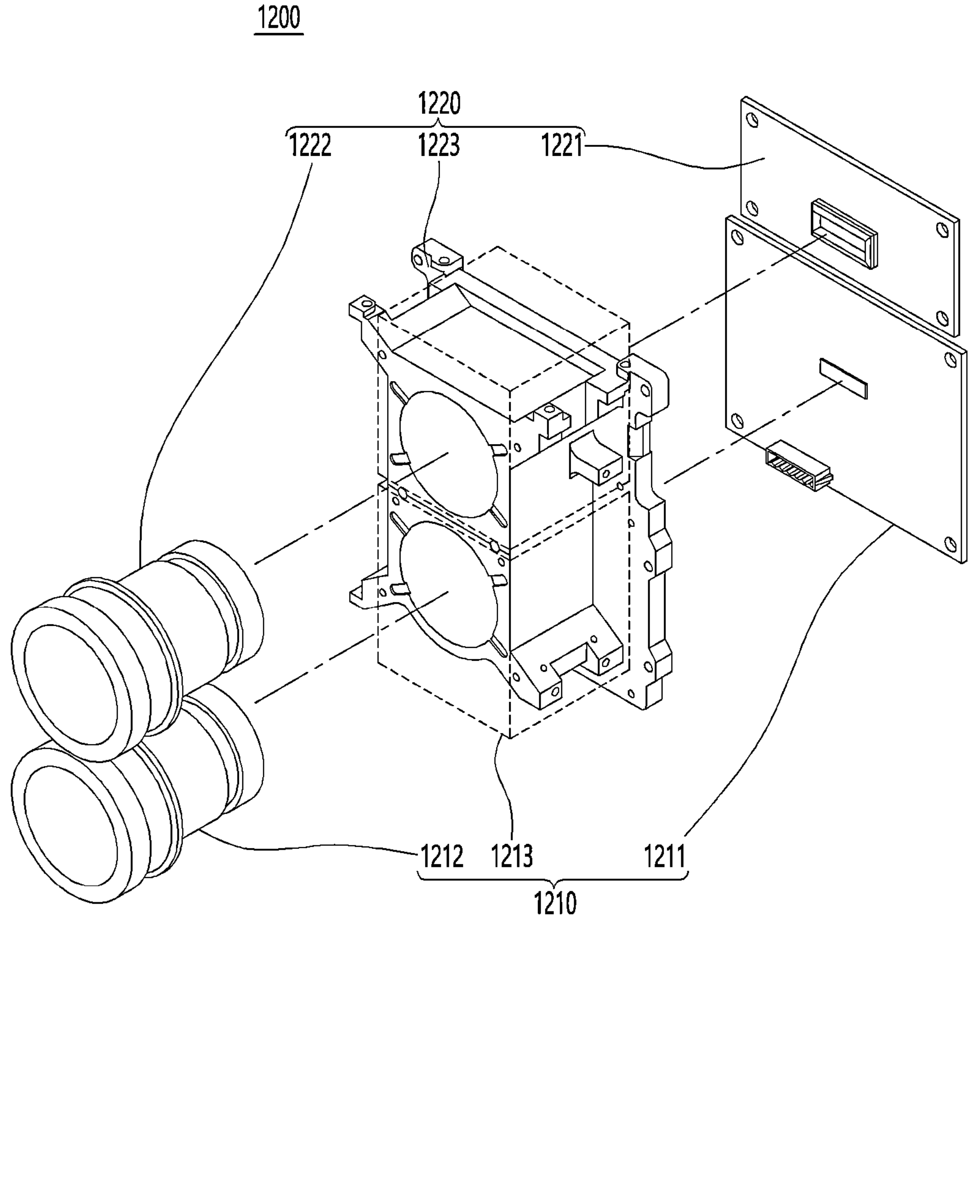

FIGS. 3 and 4 are diagrams illustrating a LiDAR device according to an embodiment.

Referring to FIGS. 3 and 4, the LiDAR device 1200 according to an embodiment may include a transmission module 1210 and a reception module 1220.

In addition, referring to FIGS. 3 and 4, the transmission module 1210 may include a laser emitting module 1211, an emitting optic module 1212, and an emitting optic holder 1213.

Herein, the laser emitting module 1211 may include a laser emitting array. Since the above-described contents may be applied to the laser emitting array, a redundant description will be omitted.

In addition, the emitting optic module 1212 may include a lens assembly. Since the above-described contents of the emitting optic module, etc. may be applied to the lens assembly, a redundant description will be omitted.

In addition, the emitting optic holder 1213 may be located between the laser emitting module 1211 and the emitting optic module 1212.

For example, the emitting optic holder 1213 may be located between the laser emitting module 1211 and the emitting optic module 1212 in order to fix the relative positional relationship between the laser emitting module 1211 and the emitting optic module 1212, but is not limited thereto.

In addition, the emitting optic holder 1213 may be formed to fix the movement of the emitting optic module 1212.

For example, the emitting optic holder 1213 may be formed to include a hole into which at least a portion of the emitting optic module 1212 is inserted so that the movement of the emitting optic module 1212 is restricted, but is not limited thereto.

In addition, referring to FIGS. 3 and 4, the reception module 1220 according to an embodiment may include a laser detecting module 1221, a detecting optic module 1222, and a detecting optic holder 1223.

Herein, the laser detecting module 1221 may include a laser detecting array. Since the above-mentioned contents may be applied to the laser detecting array, a redundant description will be omitted.

In addition, the detecting optic module 1222 may include a lens assembly. Since the contents of the above-described detecting optic module, etc. may be applied to the lens assembly, a redundant description will be omitted.

In addition, the detecting optic holder 1223 may be located between the laser detecting module 1221 and the detecting optic module 1222.

For example, the detecting optic holder 1223 may be located between the laser detecting module 1221 and the detecting optic module 1222 to fix the relative positional relationship between the laser detecting module 1221 and the detecting optic module 1222, but is not limited thereto.

In addition, the detecting optic holder 1223 may be formed to fix the movement of the detecting optic module 1222.

For example, the detecting optic holder 1223 may be formed to include a hole into which at least a portion of the detecting optic module 1222 is inserted so that the movement of the detecting optic module 1222 is restricted, but is not limited thereto.

In addition, the emitting optic holder 1213 and the detecting optic holder 1223 may be formed integrally.

For example, the emitting optic holder 1213 and the detecting optic holder 1223 are formed integrally so that at least a portion of the emitting optic module 1212 and the detecting optic module 1222 are inserted into each of two holes of one optic holder, but are not limited thereto.

In addition, the emitting optic holder 1213 and the detecting optic holder 1223 may not be physically distinguished, and may conceptually refer to the first part and the second part of one optic holder respectively, but embodiments are not limited thereto.

In addition, FIG. 4 is a diagram illustrating an embodiment of the LiDAR device of FIG. 3, and the contents described herein referring to FIG. 3 are not limited to the shape shown in FIG. 4.

Figure 5:
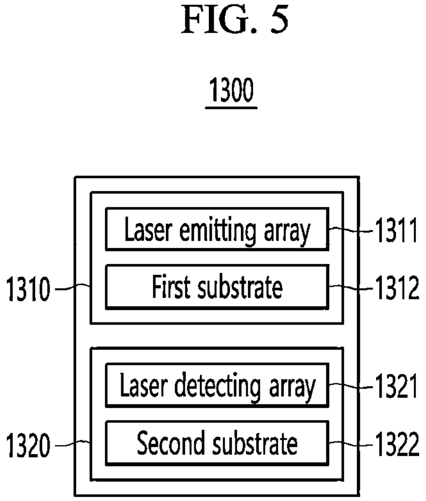
FIGS. 5 and 6 are diagrams illustrating a laser emitting module and a laser detecting module according to an embodiment.
Figure 6:
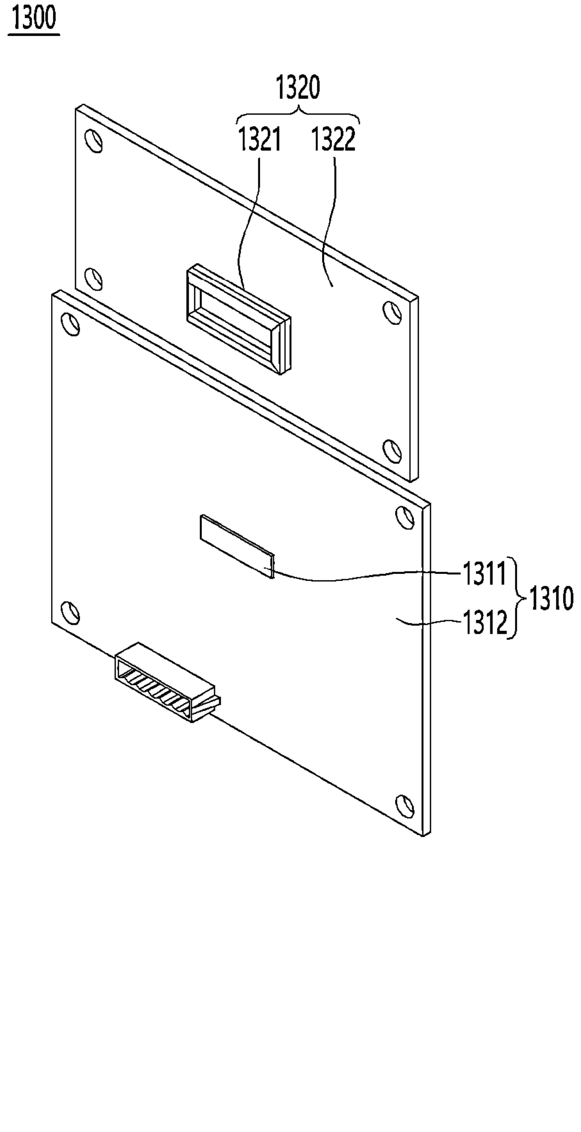

FIGS. 5 and 6 are diagrams illustrating a laser emitting module and a laser detecting module according to an embodiment.

Referring to FIGS. 5 and 6, a LiDAR device 1300 according to an embodiment may include a laser emitting module 1310 and a laser detecting module 1320.

In addition, referring to FIGS. 5 and 6, the laser emitting module 1310 according to an embodiment may include a laser emitting array 1311 and a first substrate 1312.

Herein, since the above-described contents may be applied to the laser emitting array 1311, a redundant description will be omitted.

The laser emitting array 1311 according to an embodiment may be provided in the form of a chip in which a plurality of laser emitting units are arranged in an array form, but is not limited thereto.

For example, the laser emitting array 1311 may be provided in the form of a laser emitting chip, but is not limited thereto.

In addition, the laser emitting array 1311 may be located on the first substrate 1312, but is not limited thereto.

In addition, the first substrate 1312 may include a laser emitting driver for controlling the operation of the laser emitting array 1311, but is not limited thereto.

In addition, referring to FIGS. 5 and 6, the laser detecting module 1320 according to an embodiment may include a laser detecting array 1321 and a second substrate 1322.

Herein, since the above-described contents may be applied to the laser detecting array 1321, a redundant description will be omitted.

The laser detecting array 1321 according to an embodiment may be provided in the form of a chip in which a plurality of laser detecting units are arranged in an array form, but is not limited thereto.

For example, the laser detecting array 1321 may be provided in the form of a laser detecting chip, but is not limited thereto.

In addition, the laser detecting array 1321 may be located on the second substrate 1322, but is not limited thereto.

In addition, the second substrate 1322 may include a laser detecting driver for controlling the operation of the laser detecting array 1321, but is not limited thereto.

In addition, the first substrate 1312 and the second substrate 1322 may be provided separately from each other as shown in FIG. 6, but is not limited thereto and may be provided as one substrate.

In addition, FIG. 6 is a diagram illustrating an embodiment of the LiDAR device of FIG. 5, and the contents described herein referring to FIG. 5 are not limited by the shape shown in FIG. 6.

Figure 7:
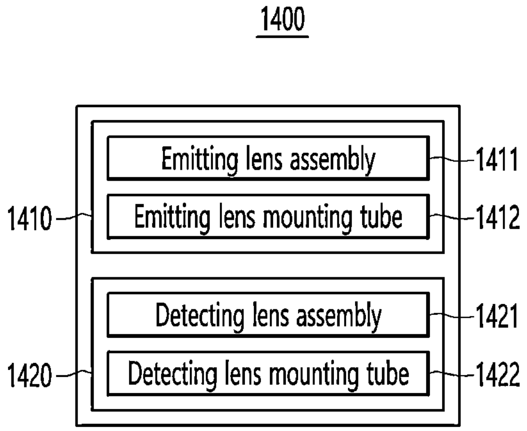
FIGS. 7 and 8 are diagrams illustrating an emitting lens module and a detecting lens module according to an embodiment.
Figure 8:
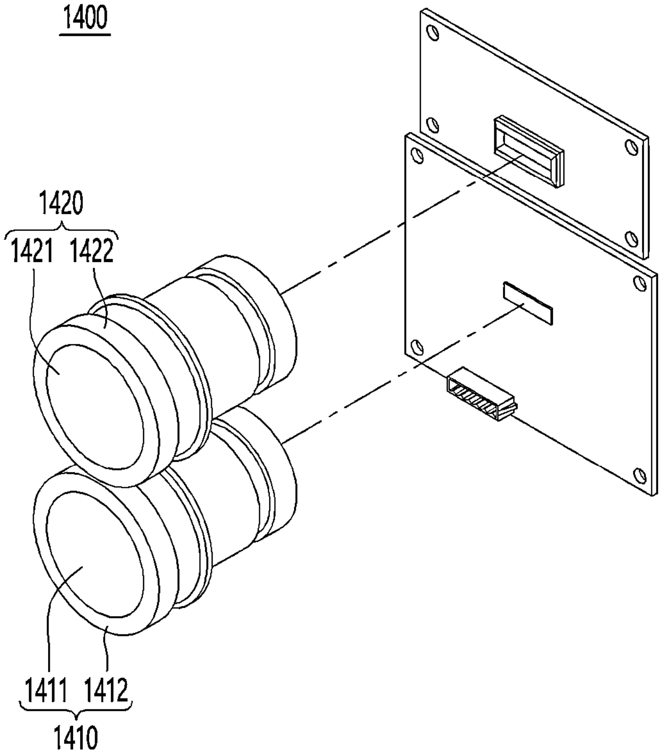

FIGS. 7 and 8 are diagrams illustrating an emitting lens module and a detecting lens module according to an embodiment.

Referring to FIGS. 7 and 8, the LiDAR device 1400 according to an embodiment may include an emitting lens module 1410 and a detecting lens module 1420.

In addition, referring to FIGS. 7 and 8, the emitting lens module 1410 according to an embodiment may include an emitting lens assembly 1411 and an emitting lens mounting tube 1412.

Herein, since the above-described contents may be applied to the emitting lens assembly 1411, a redundant description will be omitted.

The emitting lens assembly 1411 according to an embodiment may be disposed within the emitting lens mounting tube 1412.

In addition, the emitting lens mounting tube 1412 may refer to a barrel surrounding the emitting lens assembly 1411, but is not limited thereto.

In addition, referring to FIGS. 7 and 8, the detecting lens module 1420 according to an embodiment may include a detecting lens assembly 1421 and a detecting lens mounting tube 1422.

Herein, since the above-described contents may be applied to the detecting lens assembly 1421, a redundant description will be omitted.

The detecting lens assembly 1421 according to an embodiment may be disposed within the detecting lens mounting tube 1422.

In addition, the detecting lens mounting tube 1422 may refer to a barrel surrounding the detecting lens assembly 1421, but is not limited thereto.

In addition, referring to FIG. 8, the emitting optic module 1410 may be arranged to be aligned with the laser emitting module described above.

Herein, the fact that the emitting optic module 1410 is arranged to be aligned with the laser emitting module described above may mean that it is physically arranged to have a predetermined relative positional relationship and it is aligned to allow the laser to be optically emitted at a target angle, but embodiments are not limited thereto.

In addition, referring to FIG. 8, the detecting optic module 1420 may be arranged to be aligned with the laser detecting module described above.

Herein, the fact that the detecting optic module 1420 is arranged to be aligned with the laser detecting module described above may mean that it is physically arranged to have a predetermined relative positional relationship and mean that it is aligned to allow the laser optically received at a target angle to be detected, but embodiments are not limited thereto.

In addition, FIG. 8 is a diagram illustrating an embodiment of the LiDAR device of FIG. 7, and the contents described herein referring to FIG. 7 are not limited by the shape shown in FIG. 8.

2. Active Alignment for a LiDAR Device

2.1. Concept of Active Alignment

Active alignment described in this specification may include the concepts of adjusting alignment of at least one component included in the LiDAR device and fixing the relative position thereof.

In addition, the active alignment described herein may include the concepts of providing a plurality of components included in a LiDAR device, adjusting alignment between the plurality of components, and fixing the relative positions thereof.

In addition, the active alignment described herein may include the concepts of providing a plurality of components included in the LiDAR device to derive relative positions for obtaining alignment between the plurality of components, adjusting the position of at least one component so that the plurality of components are aligned, and fixing the relative position thereof in the adjusted position.

In addition, the active alignment described herein may include the concept of automating at least part of the above-described contents.

In addition, the active alignment described herein is not limited to the concepts described above, and may include concepts of the active alignment as understood by a person skilled in the art.

2.2. Device and Method for Active Alignment for a LiDAR Device 2.2.1. Device for Active Alignment for a LiDAR Device FIGS. 9 and 10 are diagrams illustrating a device for active alignment for a LiDAR device according to an embodiment.

Figure 9:
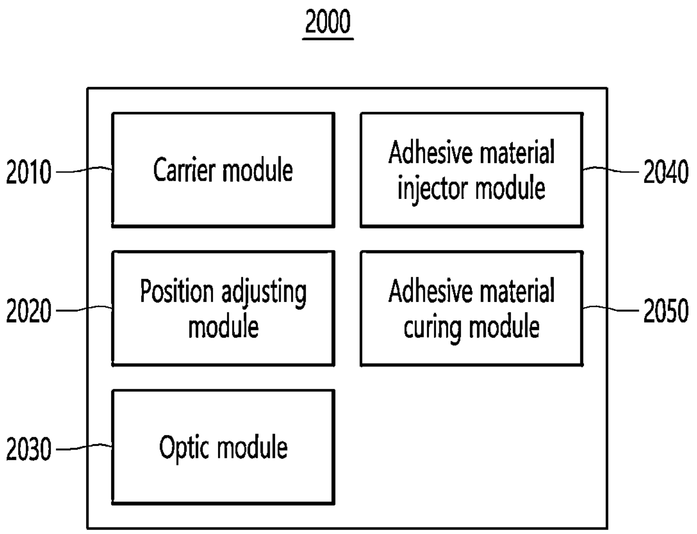
FIGS. 9 and 10 are diagrams illustrating an active alignment device for a LiDAR device according to an embodiment.
Figure 10:
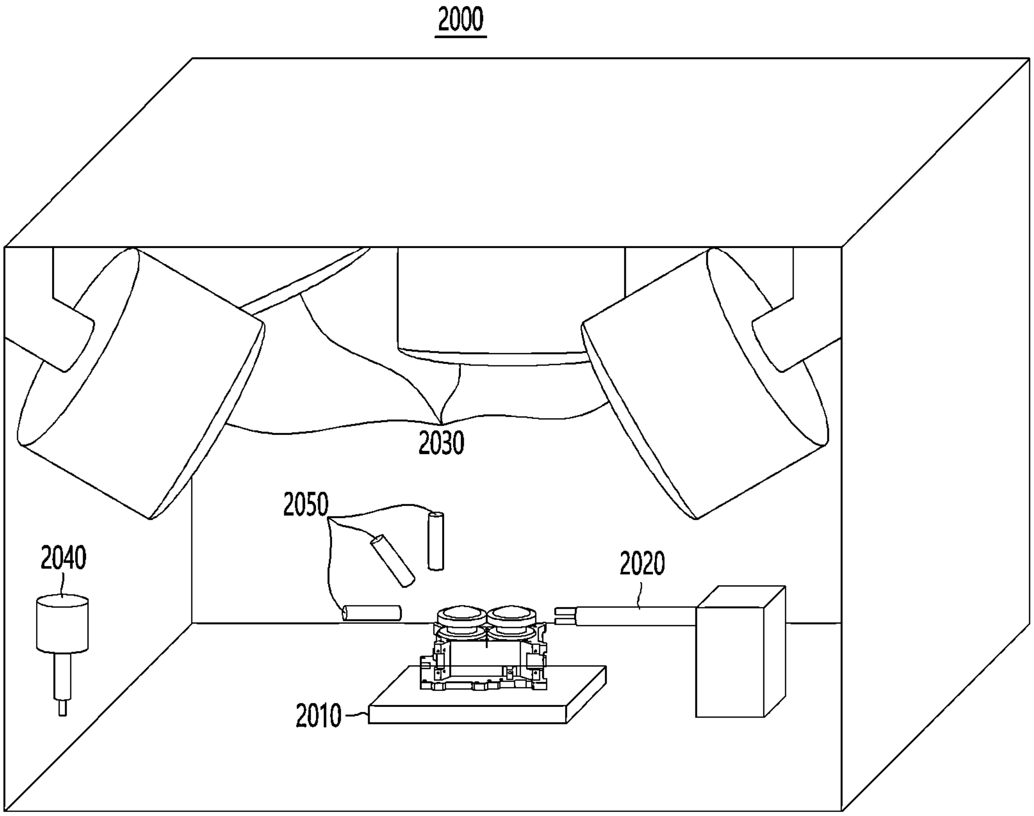

Referring to FIGS. 9 and 10, an active alignment device 2000 according to an embodiment may include at least one module of a carrier module 2010, a position adjusting module 2020, an alignment optic module 2030, an adhesive material injector module 2040, and an adhesive material curing module 2050.

The carrier module 2010 according to an embodiment may be a module for moving at least one component included in the LiDAR device.

For example, the carrier module 2010 according to an embodiment may be a module for moving the laser emitting module included in the LiDAR device, but is not limited thereto.

In addition, for example, the carrier module 2010 according to an embodiment may be a module for moving the emitting optic module included in the LiDAR device, but is not limited thereto.

In addition, for example, the carrier module 2010 according to an embodiment may be a module for moving the laser detecting module included in the LiDAR device, but is not limited thereto.

In addition, for example, the carrier module 2010 according to an embodiment may be a module for moving the detecting optic module included in the LiDAR device, but is not limited thereto.

In addition, for example, the carrier module 2010 according to an embodiment may be a module for moving the transmission module included in the LiDAR device, but is not limited thereto.

In addition, for example, the carrier module 2010 according to an embodiment may be a module for moving the reception module included in the LiDAR device, but is not limited thereto.

In addition, for example, the carrier module 2010 according to an embodiment may be a module for moving the LiDAR device, but is not limited thereto.

The carrier module 2010 according to an embodiment may be a module for moving at least one component included in the LiDAR device to an appropriate position according to assembly steps of the LiDAR device.

For example, the carrier module 2010 according to an embodiment may move the laser emitting module to the first area in order to apply adhesive material for fixing the relative position between the laser emitting module and the emitting optic module included in the LiDAR device, but is not limited thereto.

Herein, the first area may refer to, but is not limited to, a target region for applying the adhesive material around the laser emitting module.

In addition, for example, the carrier module 2010 according to an embodiment may move the emitting optic holder to the first area in order to apply the adhesive material for fixing the relative position between the laser emitting module and the emitting optic module included in the LiDAR device, but is not limited thereto.

Herein, the first area may refer to, but is not limited to, a target region for applying the adhesive material around the emitting optic holder.

In addition, for example, the carrier module 2010 according to an embodiment may move the laser emitting module to the second area in order to derive the relative positional relationship for alignment between the laser emitting module and the emitting optic module included in the LiDAR device, but is not limited thereto.

Herein, the second area may refer to, but is not limited to, a target region for deriving the relative positional relationship for obtaining alignment between the laser emitting module and the emitting optic module.

In addition, for example, the carrier module 2010 according to an embodiment may move the laser detecting module to a third area in order to apply the adhesive material for fixing the relative position between the laser detecting module and the detecting optic module included in the LiDAR device, but is not limited thereto.

Herein, the third area may refer to, but is not limited to, a target region for applying the adhesive material around the laser detecting module.

In addition, for example, the carrier module 2010 according to an embodiment may move the detecting optic holder to the third area in order to apply the adhesive material for fixing the relative position between the laser detecting module and the detecting optic module included in the LiDAR device, but not limited thereto.

Herein, the third area may refer to, but is not limited to, a target region to apply the adhesive material around the detecting optic holder.

In addition, for example, the carrier module 2010 according to an embodiment may move the laser detecting module to a fourth area in order to derive the relative positional relationship for alignment between the laser detecting module and the detecting optic module included in the LiDAR device, but is not limited thereto.

Herein, the fourth area may refer to a target region for deriving the relative positional relationship for obtaining alignment between the laser detecting module and the detecting optic module, but is not limited thereto.

In addition, for example, the carrier module 2010 according to an embodiment may move the LiDAR device to the fifth area in order to derive the relative positional relationship for alignment between the transmission module and reception module included in the LiDAR device, but is not limited thereto.

Herein, the fifth area may refer to, but is not limited to, a target region to derive the relative positional relationship for obtaining alignment between the transmission module and the reception module.

The position adjustment module 2020 according to an embodiment may be a module for adjusting the position of at least one component included in the LiDAR device to ensure alignment between the components included in the LiDAR device.

For example, the position adjustment module 2020 according to an embodiment may be a module for adjusting the position of the emitting optic module to ensure alignment between the laser emitting module and the emitting optic module included in the LiDAR device, but is not limited thereto.

In addition, for example, the position adjustment module 2020 according to an embodiment may be a module for adjusting the position of the laser emitting module to ensure alignment between the laser emitting module and the emitting optic module included in the LiDAR device, but is not limited thereto.

In addition, for example, the position adjustment module 2020 according to an embodiment may be a module for adjusting the position of the detecting optic module to ensure alignment between the laser detecting module and the detecting optic module included in the LiDAR device, but is not limited thereto.

In addition, for example, the position adjustment module 2020 according to an embodiment may be a module for adjusting the position of the laser detecting module to ensure alignment between the laser detecting module and the detecting optic module included in the LiDAR device, but is not limited thereto.

In addition, for example, the position adjustment module 2020 according to an embodiment may be a module for adjusting the position of at least one component of the laser emitting module, the emitting optic module, the radar detecting module, and the detecting optic module to ensure alignment between the transmission module and reception module included in the LiDAR device, but is not limited thereto.

In addition, the position adjustment module 2020 according to an embodiment may cause the position of an adjustment target component to be moved in parallel or rotated about at least one axis, in order to adjust the adjustment target component.

For example, the position adjustment module 2020 according to an embodiment may cause the position of the laser emitting module included in the LiDAR device to be moved in parallel or rotated about at least one axis, but is not limited thereto.

More specifically, for example, the position adjustment module 2020 according to an embodiment cause the position of the laser emitting module included in the LiDAR device to be moved in parallel with respect to the X, Y, and Z axes, and be rotated about the X, Y, and Z axes, but embodiments are not limited thereto.

In addition, for example, the position adjustment module 2020 according to an embodiment may cause the position of the emitting optic module included in the LiDAR device to be moved in parallel or rotated about at least one axis, but is not limited thereto.

More specifically, for example, the position adjustment module 2020 according to an embodiment may cause the position of the emitting optic module included in the LiDAR device to be moved in parallel with respect to the X, Y, and Z axes, or to be rotated about the X, Y, and Z axes, but is not limited thereto.

In addition, for example, the position adjustment module 2020 according to an embodiment may cause the position of the laser detecting module included in the LiDAR device to be moved in parallel or rotated about at least one axis, but is not limited thereto.

More specifically, for example, the position adjustment module 2020 according to an embodiment may cause the position of the laser detecting module included in the LiDAR device to be moved in parallel with respect to the X, Y, and Z axes, or rotated about the X, Y, and Z axes, but embodiments are not limited thereto.

In addition, for example, the position adjustment module 2020 according to an embodiment may cause the position of the detecting optic module included in the LiDAR device to be moved in parallel or rotated about at least one axis, but is not limited thereto.

More specifically, for example, the position adjustment module 2020 according to an embodiment may cause the position of the detecting optic module included in the LiDAR device to be moved in parallel with respect to the X, Y, and Z axes, or rotated about the X, Y, and Z axes, but embodiments are not limited thereto.

In addition, the position adjustment module 2020 according to an embodiment may cause components of the LiDAR device to be moved in a specific direction according to the alignment step of the LiDAR device.

For example, the position adjustment module 2020 according to an embodiment may cause the position of the laser emitting module to be moved in parallel with respect to Z axis or be rotated about the X, Y, and Z axes, to ensure alignment between the laser emitting module and emitting optic module included in the LiDAR device, but is not limited thereto.

In addition, for example, the position adjustment module 2020 according to an embodiment may cause the position of the emitting optic module to be moved in parallel with respect to the Z axis or be rotated about the X, Y, and Z axes, to ensure alignment between the laser emitting module and the emitting optic module included in the LiDAR device, but is not limited thereto.

In addition, for example, the position adjustment module 2020 according to an embodiment may cause the position of the laser detecting module to be moved in parallel with respect to the Z axis or be rotated about the X, Y, and Z axes, to ensure alignment between the laser detecting module and detecting optic module included in the LiDAR device, but is not limited thereto.

In addition, for example, the position adjustment module 2020 according to an embodiment may cause the position of the detecting optic module to be moved in parallel with respect to the Z axis or rotated about the X, Y, and Z axes, to ensure alignment between the laser detecting module and detecting optic module included in the LiDAR device, but is not limited thereto.

In addition, for example, the position adjustment module 2020 according to an embodiment may cause the position of any one component of the laser emitting module, the emitting optic module, the laser detecting module, and the detecting optic module to be moved in parallel with respect to the X and Y axes, to ensure alignment between the transmission module and reception module included in the LiDAR device, but is not limited thereto.

In addition, as described above, the position adjustment module 2020 according to an embodiment may be provided in various shapes to adjust the position of at least one component included in the LiDAR device.

For example, the position adjustment module 2020 according to an embodiment may be provided in a gripper shape, plate shape, and the like, but is not limited thereto, and may be provided in various shapes to achieve the above-described purpose.

In addition, the position adjustment module (2020) according to an embodiment may be connected to the above-described carrier module to be integrally provided, but is not limited thereto, and may be provided independently without being connected to the carrier module described above.

The alignment optic module 2030 according to an embodiment may refer to an optic module used to derive the relative positional relationship between the components included in the LiDAR device to ensure alignment between the components included in the LiDAR device.

For example, the alignment optic module 2030 according to an embodiment is an optic module used to derive the relative positional relationship between the laser emitting module and the emitting optic module to ensure alignment between the laser emitting module and the emitting optic module included in the LiDAR device, but is not limited thereto.

In addition, for example, the alignment optic module 2030 according to an embodiment may refer to an optic module used to derive the relative position relationship between the laser detecting module and the detecting optic module to ensure alignment between the laser detecting module and the detecting optic module included in the LiDAR device, but is not limited thereto.

In addition, for example, the alignment optic module 2030 according to an embodiment may refer to an optic module used to derive the relative positional relationship between the transmission module and the reception module to ensure alignment between the transmission module and the reception module included in the LiDAR device, but is not limited thereto.

In addition, for example, the alignment optic module 2030 according to an embodiment may refer to an optic module used to derive the relative positional relationship between the laser emitting module and the emitting optic module or the relative positional relationship between the laser detecting module and the detecting optic module to ensure alignment between the transmission module and reception module included in the LiDAR device, but is not limited thereto.

In addition, the alignment optic module 2030 according to an embodiment may include a Tx alignment optic module, an Rx alignment optic module, and a matching alignment optic module.

Herein, the Tx alignment optic module may refer to an optic module used to derive the relative positional relationship between the laser emitting module and the emitting optic module to ensure alignment between the laser emitting module and the emitting optic module in the LiDAR device.

For example, the Tx alignment optic module may be a module that obtains at least a portion of the laser emitted from the laser emitting module and provides at least one image, in order to derive the relative positional relationship between the laser emitting module and the emitting optic module, which ensures alignment between the laser emitting module and the emitting optic module, but is not limited thereto.

Herein, the Rx alignment optic module may refer to an optic module used to derive the relative positional relationship between the laser detecting module and the detecting optic module to ensure alignment between the laser detecting module and the detecting optic module in the LiDAR device.

For example, the Rx alignment optic module may refer to a module that provides light for generating at least one signal from the laser detecting module to derive the relative position relationship between the laser detecting module and the detecting optic module, which ensures alignment between the laser detecting module and the detecting optic module of the LiDAR device, but is not limited thereto.

Herein, the matching alignment optic module may refer to an optic module used to derive the relative positional relationship between the laser emitting module and the emitting optic module or the relative positional relationship between the laser detecting module and the detecting optic module to ensure alignment between the transmission module and reception module in the LiDAR device.

For example, the matching alignment optic module may refer to an optic module used to form an optical path through which at least a portion of the laser emitted from the laser emitting module may be obtained from the laser detecting module, to derive the relative positional relationship between the laser emitting module and the emitting optic module or the relative positional relationship between the laser detecting module and the detecting optic module, which ensures alignment between the transmission module and the reception module of the LiDAR device, but embodiments are not limited thereto.

Herein, the Tx alignment optic module, the Rx alignment optic module, and the matching alignment optic module may refer to modules that are capable of being functionally distinguished, in which these modules may be provided independently from each other, and at least two or more modules may be provided as one optic module.

For example, according to an embodiment, the Tx alignment optic module and the Rx alignment optic module are provided as one optic module, in which the matching alignment optic module may be provided to be physically separated from the Tx alignment optic module and the Rx alignment optic module, but is not limited thereto.

In addition, the alignment optic module 2030 according to an embodiment may include at least one collimation lens to derive the relative positional relationship at which the components included in the LiDAR device are aligned based on the target distance.

Herein, the collimation lens may change the position and size of the laser in a specific area, which is used to derive the relative positional relationship between components by changing the divergence or optical path of the laser that passes through, but is not limited thereto.

In addition, according to an embodiment, a plurality of alignment optic modules 2030 may be provided.

For example, according to an embodiment, five alignment optic modules 2030 may be provided, but embodiments are not limited thereto.

In addition, the alignment optic module 2030 according to an embodiment may be provided in different numbers depending on the function.

For example, at least five Tx alignment optic modules are provided, at least five Rx alignment optic modules are provided, and at least two matching alignment optic modules are provided in the alignment optic module 2030 according to an embodiment, but embodiments are not limited thereto.

The specific configuration of the alignment optic module and its use method will be described in more detail using other drawings.

The adhesive material injection module 2040 according to an embodiment may be used to apply an adhesive material to at least some of the components included in the LiDAR device.

For example, the adhesive material injection module 2040 according to an embodiment may be used to apply the adhesive material around the laser emitting module included in the LiDAR device, but is not limited thereto.

In addition, for example, the adhesive material injection module 2040 according to an embodiment may be used to apply the adhesive material around the emitting optic module included in the LiDAR device, but is not limited thereto.

In addition, for example, the adhesive material injection module 2040 according to an embodiment may be used to apply the adhesive material around then emitting optic holder included in the LiDAR device, but is not limited thereto.

In addition, for example, the adhesive material injection module 2040 according to an embodiment may be used to apply the adhesive material around the laser detecting module included in the LiDAR device, but is not limited thereto.

In addition, for example, the adhesive material injection module 2040 according to an embodiment may be used to apply the adhesive material around the detecting optic module included in the LiDAR device, but is not limited thereto.

In addition, for example, the adhesive material injection module 2040 according to an embodiment may be used to apply the adhesive material around the detecting optic holder included in the LiDAR device, but is not limited thereto.

In addition, the adhesive material output from the adhesive material injection module 2040 according to an embodiment may include adhesive materials capable of being cured by ultraviolet light.

For example, the adhesive material output from the adhesive material injection module 2040 according to an embodiment may include epoxy, but is not limited thereto.

In addition, the adhesive material output from the adhesive material injection module 2040 according to an embodiment may include adhesive materials used in various fields in various ways, in addition to the examples described above.

The adhesive material curing module 2050 according to an embodiment may be used to cure the adhesive material applied to at least a portion of the components included in the LiDAR device through the adhesive material injection module 2040 described above.

For example, the adhesive material curing module 2050 according to an embodiment may be used to cure the adhesive material which is applied around the laser emitting module included in the LiDAR device through the adhesive material injection module 2040 described above, but is not limited thereto.

In addition, for example, the adhesive material curing module 2050 according to an embodiment may be used to cure the adhesive material applied around the emitting optic module included in the LiDAR device through the adhesive material injection module 2040 described above, but is not limited thereto.

In addition, for example, the adhesive material curing module 2050 according to an embodiment may be used to cure the adhesive material which is applied around the emitting optic holder included in the LiDAR device through the adhesive material injection module 2040 described above, but is not limited thereto.

For example, the adhesive material curing module 2050 according to an embodiment may be used to cure the adhesive material which is applied around the laser detecting module included in the LiDAR device through the adhesive material injection module 2040 described above, but is not limited thereto.

In addition, for example, the adhesive material curing module 2050 according to an embodiment may be used to cure the adhesive material which is applied around the detecting optic module included in the LiDAR device through the adhesive material injection module 2040 described above, but is not limited thereto.

In addition, for example, the adhesive material curing module 2050 according to an embodiment may be used to cure the adhesive material which is applied around the detecting optic holder included in the LiDAR device through the adhesive material injection module 2040 described above, but is not limited thereto.

In addition, the adhesive material curing module 2050 according to an embodiment may include at least one module for curing the adhesive material which is applied to at least a portion of the components included in the LiDAR device.

For example, when the adhesive material applied to at least a portion of the components included in the LiDAR device is epoxy, the adhesive material curing module 2050 according to an embodiment may include an ultraviolet light generating module for curing the epoxy, but is not limited thereto.

2.2.2. Active Alignment Device and Method for a Reception Module of a LiDAR Device Before explaining in detail, since the above-described information may be applied to an active alignment device and method for a reception module of a LiDAR device, a redundant description will be omitted.

Figure 11:
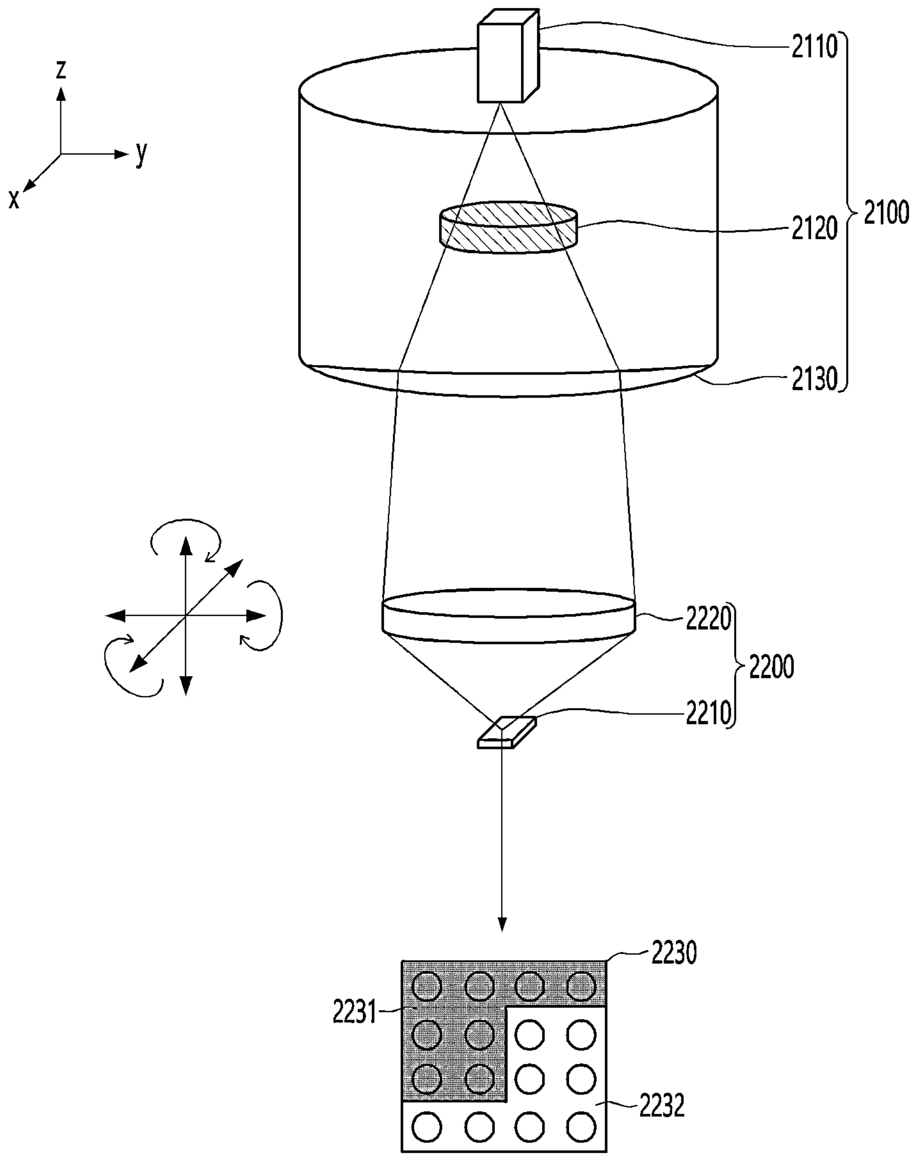
FIG. 11 is a diagram illustrating an Rx alignment optic module and an active alignment method for the reception module of the LiDAR device using the Rx alignment optic module according to an embodiment.

FIG. 11 is a diagram illustrating an Rx alignment optic module and an active alignment method for a reception module of a LiDAR device using the Rx alignment optic module according to an embodiment.

Referring to FIG. 11, the Rx alignment optic module 2100 according to an embodiment may include an illuminating unit 2110, a chart unit 2120, and a collimation unit 2130.

Herein, the Rx alignment optic module 2100 may be used to derive the relative position relationship between the laser detecting module 2210 and the detecting optic module 2220 for allowing the reception module 2200 included in the LiDAR device to be aligned.

The illuminating unit 2110 included in the Rx alignment optic module 2100 according to an embodiment may be configured to emit light.

For example, the illuminating unit 2110 included in the Rx alignment optic module 2100 according to an embodiment may be configured to emit light in the near-infrared (NIR) wavelength band, but is not limited thereto.

In addition, the illuminating unit 2110 included in the Rx alignment optic module 2100 according to an embodiment is configured to emit light in a wavelength band capable of being detected by the laser detecting module 2210 included in the LiDAR device.

For example, when the wavelength band capable of being detected by the laser detecting module included in the LiDAR device is 940 nm, the illuminating unit 2110 included in the Rx alignment optic module 2100 according to an embodiment may be configured to emit light in the 940 nm wavelength band, but is not limited thereto.

In addition, the illuminating unit 2110 included in the Rx alignment optic module 2100 according to an embodiment may be configured to emit light in the wavelength band of the laser output from a laser emitting module (not shown) included in the LiDAR device.

For example, when the wavelength band of the laser emitted from the laser emitting module included in the LiDAR device is 940 nm, the illuminating unit 2110 included in the Rx alignment optic module 2100 according to an embodiment may be configured to emit light in the 940 nm wavelength band, but is not limited thereto.

In addition, the chart unit 2120 included in the Rx alignment optic module 2100 according to an embodiment may be configured to create the light output from the illuminating unit 2110 into patterned light.

For example, the chart unit 2120 included in the Rx alignment optic module 2100 according to an embodiment is configured to create the patterned light by blocking a part of the light output from the illuminating unit 2110 and passing the other part, but is not limited thereto.

Herein, the patterned light may refer to light emitted in the shape of a predetermined pattern, but is not limited thereto, and may include various concepts that is capable of being generally understood as patterned light or pattern beam.

In addition, the patterned light may include a pattern in which the light is emitted onto some parts but not onto the other parts as shown in FIG. 11, but is not limited thereto, and may include various patterns such as a grid pattern.

In addition, the collimation unit 2130 included in the Rx alignment optic module 2100 according to an embodiment may be configured to change the divergence of light output from the illuminating unit 2110.

For example, the collimation unit 2130 included in the Rx alignment optic module 2100 according to an embodiment may be configured to reduce the divergence of light output from the illuminating unit 2110, but is not limited thereto.

In addition, the collimation unit 2130 included in the Rx alignment optic module 2100 according to an embodiment may be configured to change the divergence of light output from the illuminating unit 2110 so that the light output from the illuminating unit 2110 may simulate the laser reflected at the target distance.

For example, when the target distance of the LiDAR device is 200 m, the collimation unit 2130 included in the Rx alignment optic module 2100 according to an embodiment may change the light output from the illuminating unit 2110, so that the first part of the light output from the illuminating unit 2110 is reflected at a distance of 200 m to have an optical path and divergence similar to those of the laser received by the first detecting unit included in the laser detecting module, and the second part of the light output from the illuminating unit 2110 is reflected at a distance of 200 m to have an optical path and divergence similar to those of the laser received by the second detecting unit included in the laser detecting module, but embodiments are not limited thereto.

In addition, referring to FIG. 11, light output from the illuminating unit 2110 included in the Rx alignment optic module 2100 according to an embodiment may reach the laser detecting module 2210 through the detecting optic module 2220.

For example, the light output from the illuminating unit 2110 included in the Rx alignment optic module 2100 according to an embodiment may reach the first detecting unit group 2230 included in the laser detecting module 2210 through the detecting optic module 2220, but is not limited thereto.

In addition, referring to FIG. 11, the Rx alignment optic module 2100 according to an embodiment is arranged so that the light output from the illuminating unit 2110 reaches a specific area of the laser detecting module 2210 through the detecting optic module 2220.

For example, the Rx alignment optic module 2100 according to an embodiment is arranged so that the light output from the illuminating unit 2110 reaches the first detecting unit group 2230 of the laser detecting module 2210 through the detecting optic module 2220, but is not limited thereto.

Herein, the fact that the light output from the illuminating unit 2110 reaches the specific area of the laser detecting module 2210 may mean that the light output from the illuminating unit 2110 reaches a specific area of the laser detecting module 2210 when the laser detecting module and the detecting optic module included in the reception module 2200 are aligned with each other.

Herein, the above-described first detecting unit group 2230 may refer to a set of detecting units disposed in a specific area of the laser detecting module 2210.

In addition, according to an embodiment, the laser detecting module 2210 may detect light output from the illuminating unit 2110 to output at least one signal.

In addition, according to an embodiment, a resolution value may be derived based on at least one signal output from the laser detecting module 2210.

For example, when the Rx alignment optic module 2100 according to an embodiment is arranged so that the light output from the illuminating unit 2110 reaches the first detecting unit group 2230 of the laser detecting module 2210, the resolution value may be derived based on signals output from detecting units located in the first area 2231 designed to allow the light patterned by the chart unit 2120 to arrive, and signals output from detecting units located in the second area 2232 designed to allow light patterned by the chart unit 2120 not to arrive, but embodiment are not limited thereto.

In addition, according to an embodiment, the relative positional relationship between the laser detecting module 2210 and the detecting optic module 2220 included in the reception module 2200 may be derived based on at least one signal output from the laser detecting module 2210.

This will be explained in more detail below.

Figure 12:
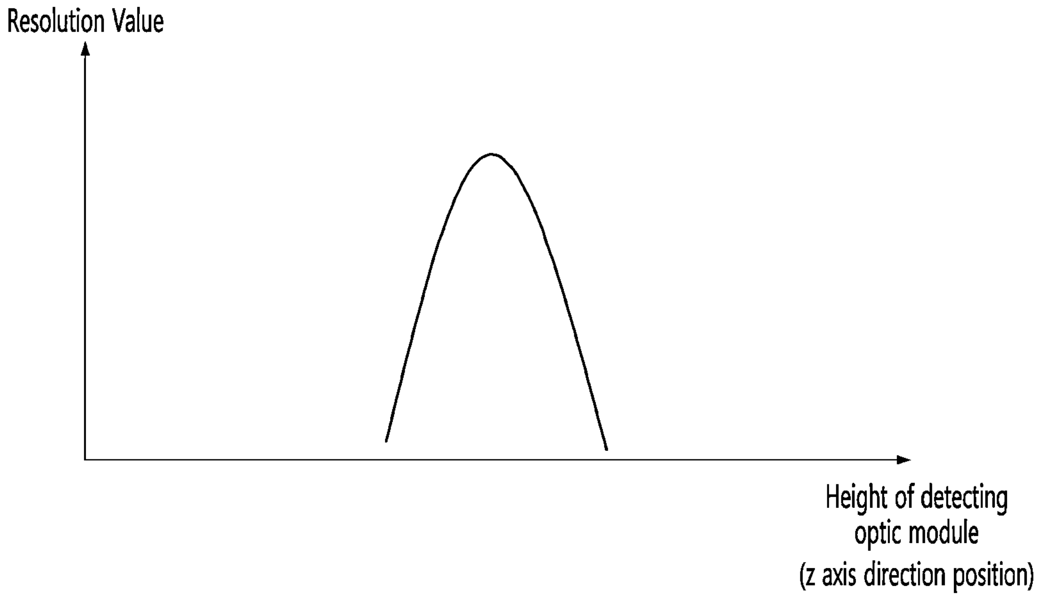
FIG. 12 is a graph illustrating the relationship between a resolution value and a height of the detecting optic module according to an embodiment.

FIG. 12 is a graph illustrating the relationship between a resolution value and a height of the detecting optic module according to an embodiment.

In order to derive the relative positional relationship between the laser detecting module and the detecting optic module included in the reception module 2200 according to the information described above with reference to FIG. 11, the resolution value may be measured according to the position of the above-described detecting optic module 2220.

For example, as shown in FIG. 12, when the detecting optic module 2220 is located at the height (Z axis direction position), the laser detecting module 2210 may detect the light output from the illuminating unit 2110 to output at least one signal, and the resolution value may be measured based on the output signal, but embodiments are not limited thereto.

Herein, the resolution value depending on the height of the detecting optic module 2220 may increase and then decrease as the height of the detecting optic module 2220 increases, as shown in FIG. 12, but embodiments are not limited thereto.

Of course, since the graph shown in FIG. 12 is only a graph briefly showing the overall trend, the actual measurement graph may appear differently from the graph shown in FIG. 12.

In addition, according to an embodiment, the relative positional relationship between the laser detecting module and the detecting optic module included in the reception module 2200 may be determined based on the measured resolution value.

For example, according to an embodiment, the relative positional relationship between the laser detecting module and the detecting optic module included in the reception module 2200 may be determined by the height of the detecting optic module with the largest measured resolution value, but is not limited thereto.

More precisely, a plurality of Rx alignment optic modules may be used to derive the relative positional relationship at which the laser detecting module and detecting optic module included in the reception module 2200 are aligned with each other, which will be explained in more detail below.

FIGS. 13A-14B are diagrams illustrating an active alignment method for a reception module of a LiDAR device using a plurality of Rx alignment optic modules according to an embodiment.

Figure 13A:
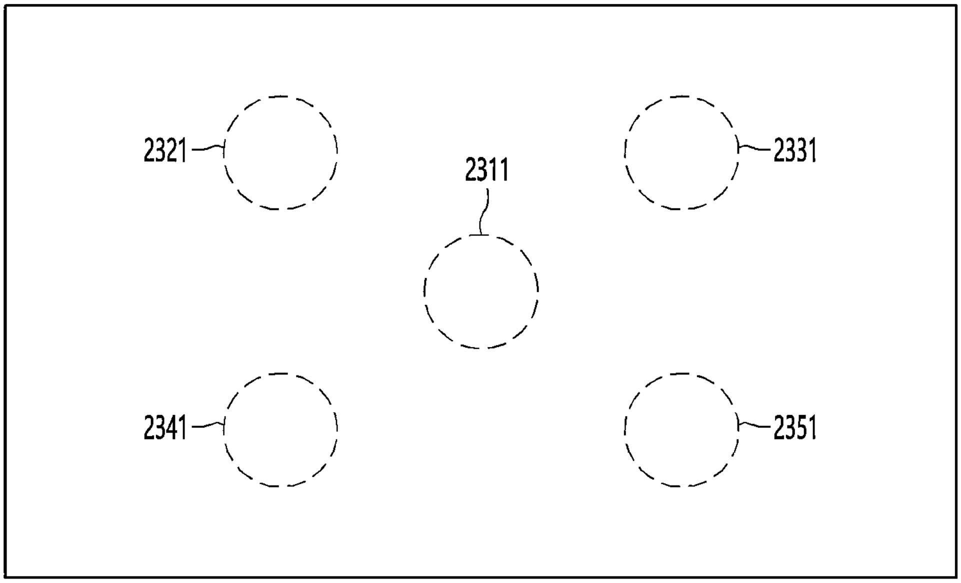
FIGS. 13A-14B are diagrams illustrating an active alignment method for a reception module of a LiDAR device using a plurality of Rx alignment optic modules according to an embodiment.
Figure 13B:
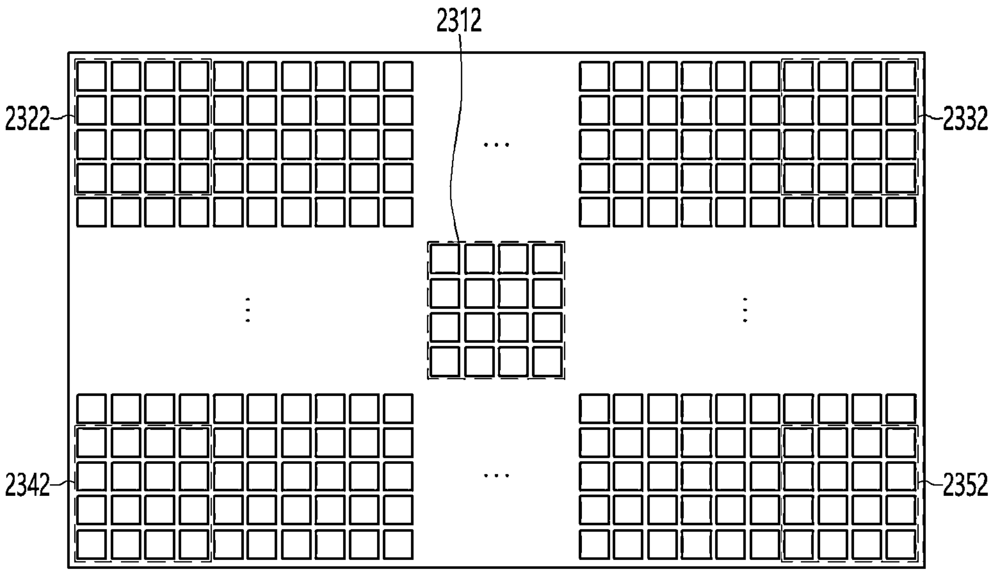

FIG. 13A briefly illustrates an active alignment device according to an embodiment, and FIG. 13B briefly illustrates a laser detecting module according to an embodiment.

Referring to FIGS. 13A and 13B, the active alignment device according to an embodiment may include a plurality of Rx alignment optic modules.

For example, as shown in FIGS. 13A and 13B, the active alignment device according to an embodiment may include, but is not limited to, a first Rx alignment optic module 2311, a second Rx alignment optic module 2321, a third Rx alignment optic module 2331, a fourth Rx an alignment optic module 2341, and a fifth Rx alignment optic module 2351.

In addition, the first to fifth Rx alignment optic modules 2311, 2321, 2331, 2341, and 2351 according to an embodiment may be arranged to correspond to the first detecting unit group 2312, the second detecting unit group 2322, the third detecting unit group 2332, the fourth detecting unit group 2342, and the fifth detecting unit group texting unit group 2352 included in the laser detecting module, respectively.

Herein, the fact that the first to fifth Rx alignment optic modules 2311, 2321, 2331, 2341, and 2351 according to an embodiment are arranged to correspond to the first detecting unit group 2312 and a second detecting unit group 2322, the third detection unit group 2332, the fourth detection unit group 2342, and the fifth detection unit group 2352 included in the laser detecting module, respectively, may mean that the light output from the illuminating unit included in each of the first to fifth Rx alignment optic modules 2311, 2321, 2331, 2341, and 2351 may reach the first detecting unit group 2312, the second detecting unit group 2322, the third detecting unit group 2332, the fourth detecting unit group 2342, and the fifth detecting unit group 2352 included in the laser detecting module, respectively, but embodiments are not limited thereto.

In addition, according to an embodiment, when a plurality of Rx alignment optic modules are used to derive the relative positional relationship between the laser detecting module and the detecting optic module included in the reception module of the LiDAR device, the relative positional relationship between the laser detecting module and the detecting optic module may be derived based on signals obtained from the corresponding plurality of detecting unit groups.

This will be described in more detail below.

FIG. 14 is a graph illustrating the relationship between the height of the detecting optic module and a resolution value based on signals obtained from a plurality of detecting unit groups according to an embodiment.

Figure 14A:
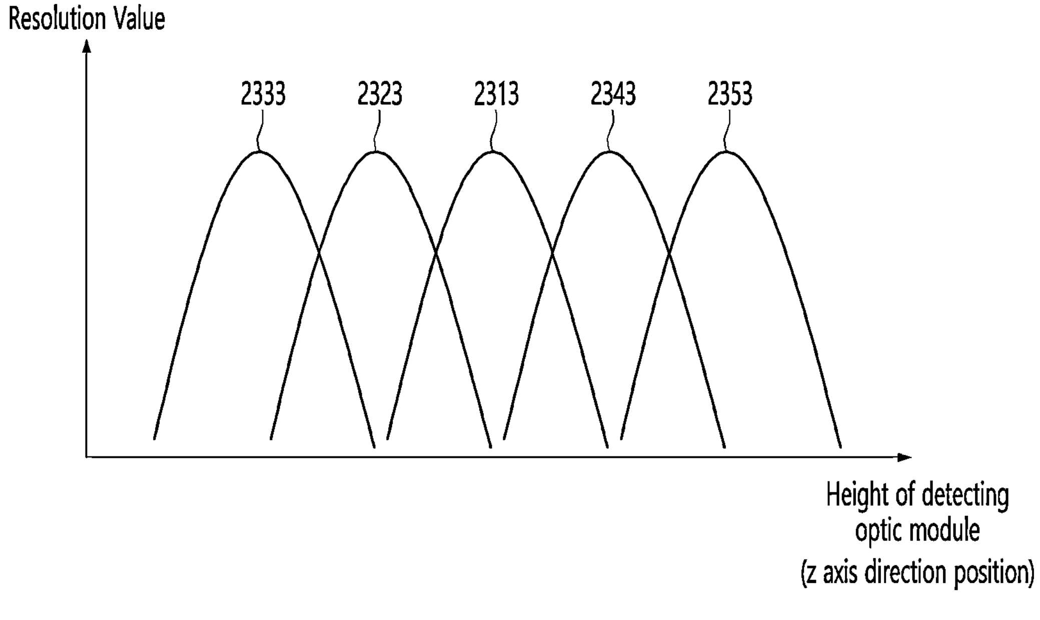
Figure 14B:
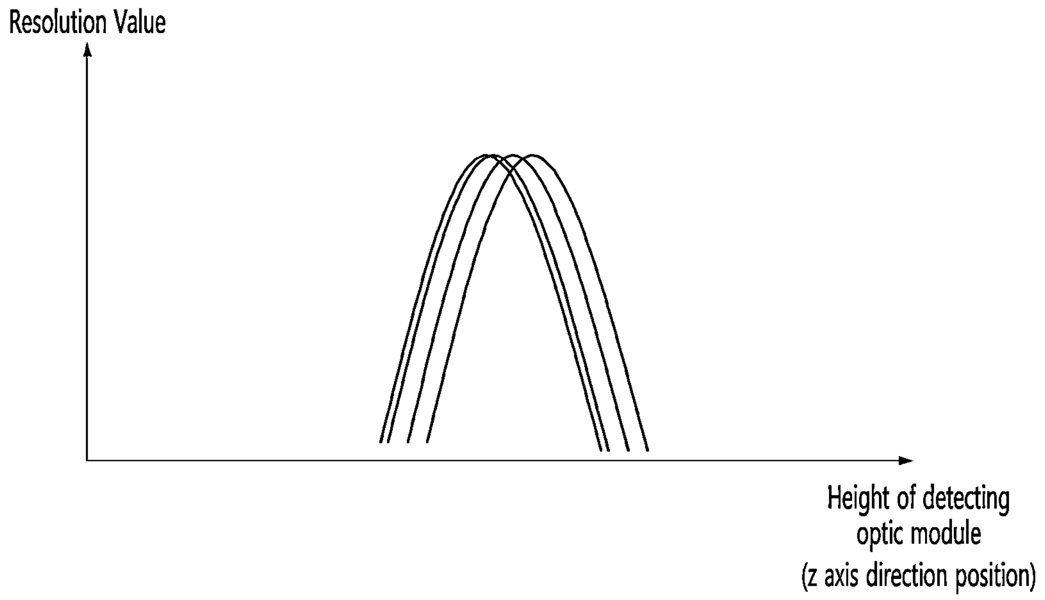

More specifically, FIG. 14A is a graph primarily illustrating the relationship between the height of the detecting optic module and the resolution value based on signals obtained from a plurality of detecting unit groups according to an embodiment, and FIG. 14B is a graph illustrating the relationship between the height of a detecting optic module and the resolution value based on signals obtained from a plurality of detecting unit groups according to an embodiment, after causing the detecting optic module to be rotated about at least one axis on the basis of the values obtained in FIG. 14A.

Herein, as shown in FIG. 14A, the first graph 2313 is a graph showing the relationship between the height of the detecting optic module and resolution based on the signal obtained from the first detecting unit group 2312, the second graph 2323 is a graph showing the relationship between the height of the detecting optic module and resolution based on the signal obtained from the second detecting unit group 2322, the third graph 2333 is a graph showing the relationship between the height of the detecting optic module and resolution based on the signal obtained from the third detecting unit group 2332, the fourth graph 2343 is a graph showing the relationship between the height of the detecting optic module and resolution based on the signal obtained from the fourth detecting unit group 2342, and the fifth graph 2353 is a graph showing the relationship between the height of the detecting optic module and resolution based on the signal obtained from the fifth detecting unit group 2352.

According to an embodiment, as shown in FIG. 14A, the height of the detecting optic module with the optimal resolution value for each of the detecting unit groups may be different from each other, and in this case, when deriving the height of a detecting optic module based on any one optimal resolution value, it may be difficult to ensure alignment between the laser detecting module and the detecting optic module included in the LiDAR device.

Therefore, according to an embodiment, a rotational movement value about at least one axis for the component included in the LiDAR device may be derived based on signals obtained from the plurality of detecting unit groups.

For example, according to an embodiment, the rotational movement value about at least one axis for the laser detecting module may be derived based on signals obtained from the plurality of detecting unit groups, but is not limited thereto.

In addition, for example, according to an embodiment, the rotational movement value about at least one axis for the detecting optic module may be derived based on signals obtained from a plurality of detecting unit groups, but is not limited thereto.

Herein, the rotational movement value about at least one axis may be determined based on peak values, order of peaks, intervals, etc. of the first to fifth graphs 2313, 2323, 2333, 2343, and 2353 shown in FIG. 14A, but is not limited thereto.

After causing the components included in the LiDAR device to be rotated on the basis of the rotational movement value derived as described above, the relationship between the height of the detecting optic module and the resolution value based on the signals obtained from the plurality of detecting unit groups may be displayed as shown in FIG. 14B.

Referring to FIG. 14B, after the components included in the LiDAR device are rotated according to an embodiment, the spacing between the graphs for the plurality of detecting unit groups may be narrower than before the rotation.

Herein, the spacing between the graphs may refer to, but is not limited to, the similarity between the graphs, the gap between peaks, etc.

According to an embodiment, the relative positional relationship between the laser detecting module and the detecting optic module included in the reception module may be determined based on the measured resolution value.

For example, according to an embodiment, the relative positional relationship between the laser detecting module and detecting optic module included in the reception module may be determined based on an average value of the height of the detecting optic module at which the resolution value measured from the plurality of detecting unit groups have the peak, but is not limited thereto.

In addition, for example, according to an embodiment, the relative positional relationship between the laser detecting module and the detecting optic module included in the reception module may be determined based on the height of the detecting optic module at which the resolution value measured from the first detecting unit group 2321 disposed at the center of the laser detecting module among the resolution values measured from the plurality of detecting unit groups has the peak value, but is not limited thereto.

In addition, for example, according to an embodiment, the relative positional relationship between the laser detecting module and the detecting optic module included in the reception module may be determined based on an average value of the height of the detecting optic module at which the resolution value measured from the second to fifth detecting unit groups 2322, 2332, 2342, and 2352 arranged on the outside of the laser detecting module among the resolution values measured from a plurality of detecting unit groups has the peak value, but is not limited thereto.

Figure 15:
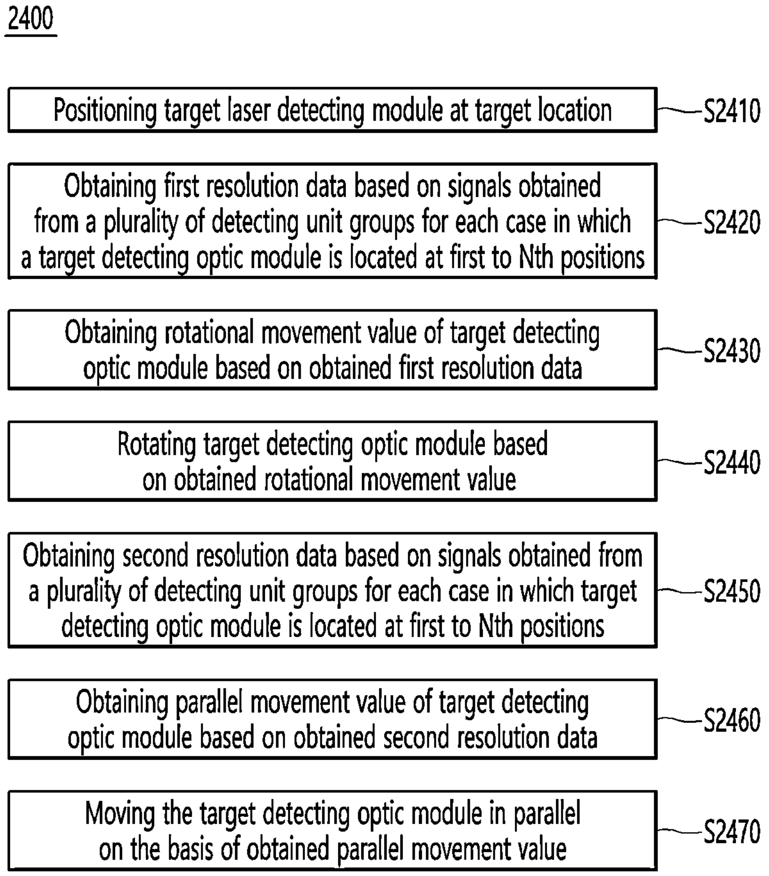
FIG. 15 is a diagram illustrating an active alignment method for a reception module of a LiDAR device according to an embodiment.

FIG. 15 is a diagram illustrating an active alignment method for a reception module of a LiDAR device according to an embodiment.

Referring to FIG. 15, the active alignment method 2400 for the reception module of the LiDAR device according to an embodiment may include positioning the target laser detecting module at a target location (S2410), obtaining first resolution data based on signals obtained from a plurality of detecting unit groups for each case in which a target detecting optic module is located at the first to Nth positions (S2420), obtaining a rotational movement value of the target detecting optic module based on the obtained first resolution data (S2430), rotating the target detecting optic module based on the obtained rotational movement value (S2440), obtaining second resolution data based on signals obtained from a plurality of detecting unit groups for each case in which the target detecting optic module is located at the first to Nth positions (S2450), obtaining a parallel movement value of the target detecting optic module based on the obtained second resolution data (S2460), and moving the target detecting optic module in parallel on the basis of the obtained parallel movement value (S2470).

Herein, in the step (S2410) of positioning the target laser detecting module at the target location according to an embodiment, the target location may be a predetermined location.

For example, in the step (S2410) of positioning the target laser detecting module at the target location according to an embodiment, the target location may be a predetermined location to obtain active alignment of the reception module of the target LiDAR device.

In addition, in the step (S2410) of positioning the target laser detecting module at the target location according to an embodiment, although it may be the target detecting optic module that is disposed at the target location, it has been described in this specification for convenience of explanation that the target laser detecting module is disposed at the target location.

However, the technical idea of the invention described in this specification is not limited thereto, and it should be noted that matters that may be changed when the target detecting optic module is located at the target location are also included in the spirit of the invention described in this specification.

In addition, since the above-mentioned contents may be applied to the step (S2420) of obtaining the first resolution data based on the signals obtained from the plurality of detecting unit groups for each case in which the target detecting optic module is located at the first to Nth positions according to an embodiment, a redundant description will be omitted.

In addition, in the step (S2420) of obtaining first resolution data based on the signals obtained from the plurality of detecting unit groups for each case in which the target detecting optic module according to an embodiment is located at the first to Nth positions, the first to Nth positions may be calculated based on the initial position.

For example, in the step of obtaining (S2420) the first resolution data based on the signals obtained from the plurality of detecting unit groups for each case in which the target detecting optic module according to an embodiment is located at the first to Nth positions, the first to Nth positions correspond to −M, −2M, −3M, −4M, −5M, +0, +M, +2M, +3M, +4M, +5M based on the initial position, but is not limited thereto.

Herein, the above-described M may refer to, but is not limited to, the minimum movement unit.

In addition, in the step (S2420) of obtaining the first resolution data based on the signals obtained from the plurality of detecting unit groups for each case in which the target detecting optic module according to an embodiment is located at the first to Nth positions, the first to Nth positions may be moved with respect to one axis.

For example, in the step (S2420) of obtaining the first resolution data based on the signals obtained from the plurality of detecting unit groups for each case in which the target detecting optic module according to an embodiment is located at the first to Nth positions, the first to Nth positions may be moved with respect to the Z axis, but are not limited thereto.

In addition, in the step (S2420) of obtaining the first resolution data based on the signals obtained from the plurality of detecting unit groups for each case in which the target detecting optic module according to an embodiment is located at the first to Nth positions, the number of the plurality of detecting unit groups may be equal to the number of Rx alignment optic modules used for active alignment.

For example, in the step (S2420) of obtaining the first resolution data based on the signals obtained from the plurality of detecting unit groups for each case in which the target detecting optic module according to an embodiment is located at the first to Nth positions, when the number of Rx alignment optic modules used for active alignment is 5, the number of the plurality of detection unit groups may be 5, but is not limited thereto.

In addition, in the step (S2420) of obtaining first resolution data based on signals obtained from a plurality of detecting unit groups for each case in which the target detecting optic module according to an embodiment is located at the first to Nth positions, the first resolution data may include resolution values obtained from each detecting unit group according to the location of the target detecting optic module.

In addition, in the step (S2420) of obtaining the first resolution data based on the signals obtained from the plurality of detecting unit groups for each case in which the target detecting optic module according to an embodiment is located at the first to Nth positions, although it may be the laser detecting module that is located at the first to Nth positions, it has been described in the specification for convenience of explanation that the target detecting optic module is located at the first to Nth positions.

However, it should be noted that the technical idea of the invention described in this specification is not limited thereto, and the matters capable of being changed when the target laser detecting module is located at the first to Nth positions are also included in the spirit of the invention described in this specification.

In addition, since the above-mentioned contents may be applied to the step (S2430) of obtaining the rotational movement value of the target detecting optic module based on the obtained first resolution data according to an embodiment, a redundant description will be omitted.

In addition, in the step (S2430) of obtaining the rotational movement value of the target detecting optic module based on the obtained first resolution data according to an embodiment, the rotational movement value of the target detecting optic module may be a rotational movement value with respect to at least one axis.

For example, in the step (S2430) of obtaining the rotational movement value of the target detecting optic module based on the obtained first resolution data according to an embodiment, the rotational movement value of the target detecting optic module may be a rotational movement value with respect to the X-axis or Y-axis, but is not limited thereto.

In addition, in the step (S2430) of obtaining the rotational movement value of the target detecting optic module based on the obtained first resolution data according to an embodiment, the rotational movement value of the target detecting optic module may be rotational movement value with respect to an axis different from an axis that serves as a movement reference for the above-mentioned first to Nth positions.

For example, in the step (S2430) of obtaining the rotational movement value of the target detecting optic module based on the obtained first resolution data according to an embodiment, when the axis that serves as a movement reference for the above-mentioned first to Nth positions is the Z axis, the rotational movement value of the target detecting optic module may be a rotational movement value with respect to the X axis or Y axis, but is not limited thereto.

In addition, in the step (S2430) of obtaining the rotational movement value of the target detecting optic module based on the obtained first resolution data according to an embodiment, although it may be the target laser detecting module that is subject to rotation movement value calculation, it has been described in this specification for convenience of explanation that the target detecting optic module is subject to rotation movement value calculation.

However, it should be noted that the technical idea of the invention described in this specification is not limited thereto, and matters capable of being changed when the target laser detecting module is subject to rotation movement value calculation is also included in the spirit of the invention described in this specification.

In addition, since the above-described information may be applied to the step (S2440) of rotating the target detecting optic module based on the obtained rotational movement value according to an embodiment, a redundant description will be omitted.

In addition, the step (S2440) of rotating the target detecting optic module based on the obtained rotational movement value according to an embodiment may be implemented by the above-described position adjustment module included in the active alignment device, but is not limited thereto.

In addition, in the step (S2440) of rotating the target detecting optic module based on the obtained rotational movement value according to an embodiment, although it may be the target laser detecting module that is subject to rotational movement, it has been described in this specification for convenience of explanation that the target detecting optic module is subject to rotational movement.

However, the technical idea of the invention described in this specification is not limited thereto, and it should be noted that matters capable of being changed when the target laser detecting module is subject to rotational movement are also included in the spirit of the invention described in this specification.

In addition, since the above-mentioned contents may be applied to the step (S2450) of obtaining the second resolution data based on the signals obtained from the plurality of detecting unit groups for each case where the target detecting optic module is located at the first to Nth positions according to an embodiment, a redundant description will be omitted.

In addition, although the first to Nth positions in the step (S2450) of obtaining the second resolution data based on the signals obtained from the plurality of detecting unit groups for each case in which the target detecting optic module is located in the first to Nth positions according to an embodiment use the same terms as in the step (S2420) of obtaining the first resolution data for convenience of explanation, the location at each stage may be different from each other.

In addition, in the step (S2450) of obtaining the second resolution data based on the signals obtained from the plurality of detecting unit groups for each case where the target detecting optic module is located at the first to Nth positions according to an embodiment, although it may be the laser detecting module that is located at the first to Nth positions, it has been described in this specification for convenience of explanation that the target detecting optic module is located at the first to Nth positions.

However, it should be noted that the technical idea of the invention described in this specification is not limited thereto, and matters capable of being changed when the target laser detecting module is located at the first to Nth positions are included in the spirit of the invention described in this specification.

In addition, since the above-mentioned contents may be applied to the step (S2460) of obtaining the parallel movement value of the target detecting optic module based on the obtained second resolution data according to an embodiment, a redundant description will be omitted.

In addition, in the step (S2460) of obtaining the parallel movement value of the target detecting optic module based on the obtained second resolution data according to an embodiment, the parallel movement value of the target detecting optic module may be a parallel movement value with respect to one axis.

For example, in the step (S2460) of obtaining the parallel movement value of the target detecting optic module based on the obtained second resolution data according to an embodiment, although the parallel movement value of the target detecting optic module may be a parallel movement value with respect to the Z axis, it is not limited thereto.

In addition, in the step (S2460) of obtaining the parallel movement value of the target detecting optic module based on the obtained second resolution data according to an embodiment, the parallel movement value of the target detecting optic module may be a parallel movement value with respect to the same axis as an axis that serves as a movement reference for the above-mentioned first to Nth positions.

For example, in the step (S2460) of obtaining the parallel movement value of the target detecting optic module based on the obtained second resolution data according to an embodiment, when the axis that serves as a reference for movement to the above-mentioned first to Nth positions is the Z axis, although the parallel movement value of the target detecting optic module may be a parallel movement value with respect to the Z axis, it is not limited thereto.

In addition, in the step (S2460) of obtaining the parallel movement value of the target detecting optic module based on the obtained second resolution data according to an embodiment, although it may be the target laser detecting module that is subject to parallel movement value calculation, it has been described in this specification for convenience of explanation that the target detecting optic module is subject to the parallel movement value calculation.

However, it should be noted that the technical idea of the invention described in this specification is not limited thereto, and matters capable of being changed when the target laser detecting module is subject to parallel movement value calculation are also included in the spirit of the invention described in this specification.

In addition, since the above-mentioned contents may be applied to the step (S2470) of moving the target detecting optic module in parallel on the basis of the obtained parallel movement value according to an embodiment, a redundant description will be omitted.

In addition, the step (S2470) of moving the target detecting optic module in parallel on the basis of the obtained parallel movement value according to an embodiment may be implemented by the above-described position adjustment module included in the active alignment device, but is not limited thereto.

In addition, in the step (S2470) of moving the target detecting optic module in parallel on the basis of the obtained parallel movement value according to an embodiment, although it may be the target laser detecting module that is subject to parallel movement, it has been described in this specification for convenience of explanation that the target detecting optic module is subject to parallel movement.

However, it should be noted that the technical idea of the invention described in this specification is not limited thereto, and matters capable of being changed when the target laser detecting module is subject to parallel movement are also included in the spirit of the invention described in this specification.

2.2.3. Active Alignment Device and Method for a Transmission Module of a LiDAR Device Before explaining in detail, since the above-mentioned contents may be applied to an active alignment device and method for a transmission module of a LiDAR device, a redundant description will be omitted.

Figure 16:
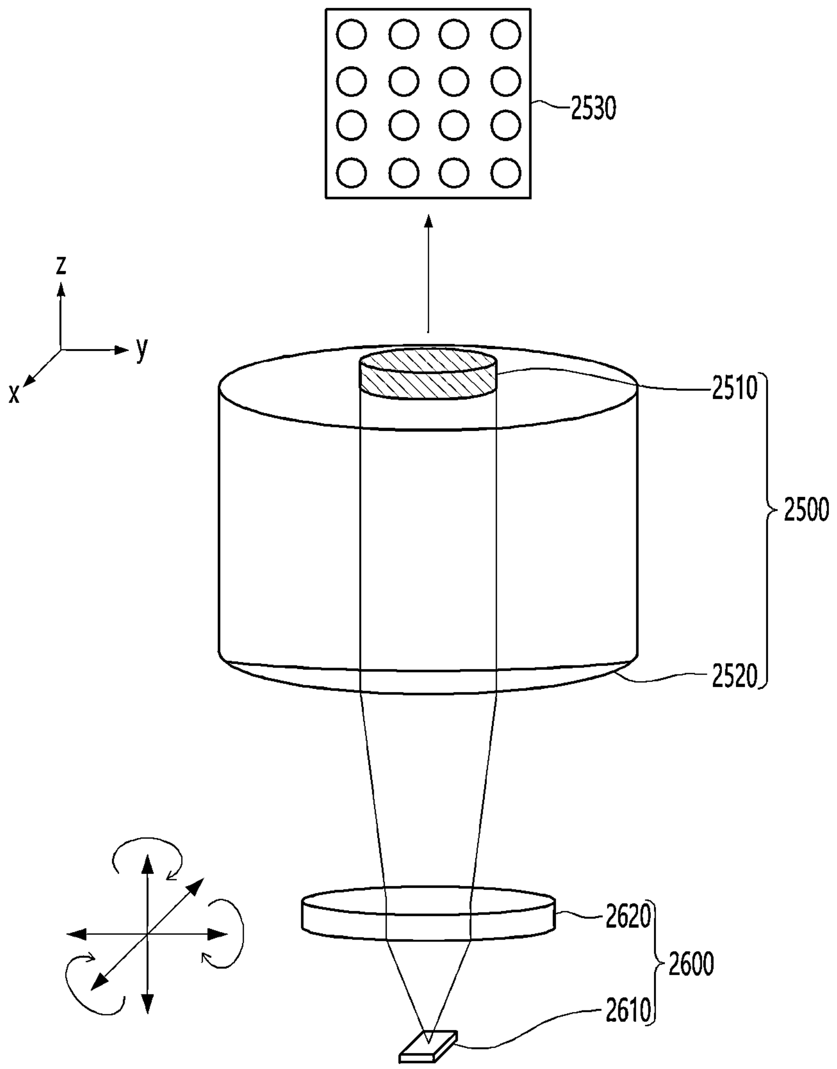
FIG. 16 is a diagram illustrating a Tx alignment optic module and an active alignment method for a transmission module of a LiDAR device using the Tx alignment optic module according to an embodiment.

FIG. 16 is a diagram illustrating a Tx alignment optic module and an active alignment method for a transmission module of a LiDAR device using the Tx alignment optic module according to an embodiment.

Referring to FIG. 16, the Tx alignment optic module 2500 according to an embodiment may include an image sensor 2510 and a collimation unit 2520.

Herein, the Tx alignment optic module 2500 may be used to derive the relative position relationship between a laser emitting module 2610 and an emitting optic module 2620 for allowing the transmission module 2600 included in the LiDAR device to be aligned.

The image sensor 2510 included in the Tx alignment optic module 2500 according to an embodiment may be configured to detect a laser emitted from the laser emitting module 2610.

For example, the image sensor 2510 included in the Tx alignment optic module 2500 according to an embodiment may be configured to detect light in the near-infrared (NIR) wavelength band, but is not limited thereto.

In addition, the image sensor 2510 included in the Tx alignment optic module 2500 according to an embodiment may be configured to detect the laser in a wavelength band that is emitted from the laser emitting module 2610 included in the LiDAR device.

For example, when the wavelength band of the laser emitted from the laser emitting module 2610 included in the LiDAR device is 940 nm, the image sensor 2510 included in the Tx alignment optic module 2500 according to an embodiment may be configured to detect light in the 940 nm wavelength band, but is not limited thereto.

In addition, the image sensor 2510 included in the Tx alignment optic module 2500 according to an embodiment may be configured to obtain at least one image for the laser emitted from the laser emitting module 2610.

In addition, the collimation unit 2520 included in the Tx alignment optic module 2500 according to an embodiment may be configured to change the optical path and divergence of the laser that is emitted from the laser emitting module 2610 and then passes through the emitting optic module 2620.

For example, the collimation unit 2520 included in the Tx alignment optic module 2500 according to an embodiment may be configured to reduce the divergence of the laser emitted from the laser emitting module 2610, but is not limited thereto.

In addition, the collimation unit 2520 included in the Tx alignment optic module 2500 according to an embodiment may be configured to change the divergence of the laser emitted from the laser emitting module 2610 so that the laser emitted from the laser emitting module 2610 is output at the target distance to simulate the obtained laser.

For example, when the target distance of the LiDAR device is 200 m, the collimation unit 2520 included in the Tx alignment optic module 2500 according to an embodiment may be configured to change the optical path and divergence of the laser emitted from the laser emitting module 2610, so that the laser output from the first laser emitting unit included in the laser emitting module 2610 reaches the first imaging area of the image sensor 2510 corresponding to the first area at a distance of 200 m, and the laser output from the second laser emitting unit reaches the second imaging area of the image sensor 2510 corresponding to the second area at a distance of 200 m, but embodiments are not limited thereto.

In addition, referring to FIG. 16, the Tx alignment optic module 2500 according to an embodiment may be disposed so that the laser emitted from the laser emitting module 2610 reaches a specific area of the image sensor 2510 through the emitting optic module 2620.

For example, the Tx alignment optic module 2500 according to an embodiment may be disposed so that the laser emitted from the laser emitting module 2610 reaches the first imaging area 2530 of the image sensor 2510 through the emitting optic module 2620, but is not limited thereto.

Herein, the fact that the laser emitted from the laser emitting module 2610 reaches the specific area of the image sensor 2510 may mean that the laser emitted from the laser emitting module 2610 reaches the specific area of the image sensor 2510 when the laser emitting module and the emitting optic module included in the transmission module 2600 are aligned.

In addition, according to an embodiment, a resolution value may be derived based on at least one image obtained from the image sensor 2510.

In addition, according to an embodiment, a relative positional relationship between the laser emitting module 2610 and the emitting optic module 2620 included in the transmission module 2600 may be derived based on at least one image obtained from the image sensor 2510.

This will be described in more detail below.

Figure 17:
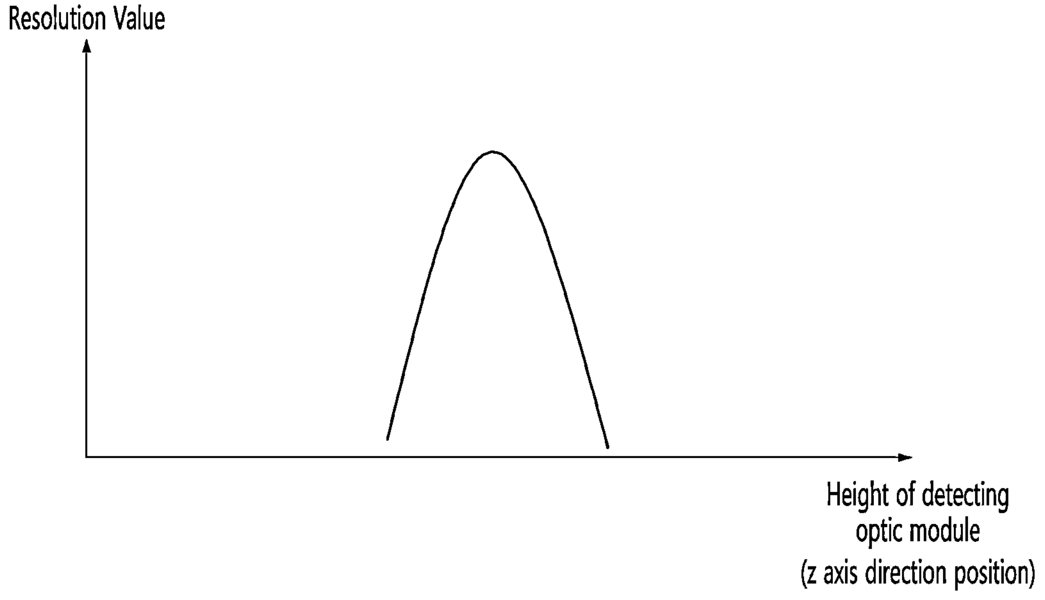
FIG. 17 is a graph illustrating the relationship between the height of the emitting optic module and the resolution value according to an embodiment.

FIG. 17 is a graph illustrating the relationship between a height of an emitting optic module and a resolution value according to an embodiment.

The resolution value may be measured based on the location of the emitting optic module 2620 described above, in order to derive the relative positional relationship between the laser emitting module 2610 and the emitting optic module 2620 included in the transmission module 2600 according to the content described above with reference to FIG. 16.

For example, as shown in FIG. 17, when the emitting optic module 2620 is located at the height (Z axis direction position), the image sensor 2510 may obtain at least one image of the laser emitted from the laser emitting module 2610, and the resolution value may be measured based on the obtained image, but embodiments are not limited thereto.

Herein, the resolution value according to the height of the emitting optic module 2620 may increase and then decrease as the height of the emitting optic module 2620 increases, as shown in FIG. 17, but is not limited thereto.

Of course, the graph shown in FIG. 17 is only a graph briefly showing the overall trend and may appear different from the actual measurement graph.

In addition, according to an embodiment, the relative positional relationship between the laser emitting module 2610 and the emitting optic module 2620 included in the transmission module 2600 may be determined based on the measured resolution value.

For example, according to an embodiment, the relative positional relationship between the laser emitting module 2610 and the emitting optic module 2620 included in the transmission module 2600 may be determined based on the height of the emitting optic module 2620 with the largest measured resolution value, but is not limited thereto.

In addition, more precisely, in order to derive the relative positional relationship at which the laser emitting module 2610 and the emitting optic module 2620 included in the transmission module 2600 are aligned, a plurality of Tx alignment optic modules may be used. This will be explained in more detail below.

FIGS. 18A-19B are diagrams illustrating an active alignment method for a transmission module of a LiDAR device using a plurality of Tx alignment optic modules according to an embodiment.

Figure 18A:
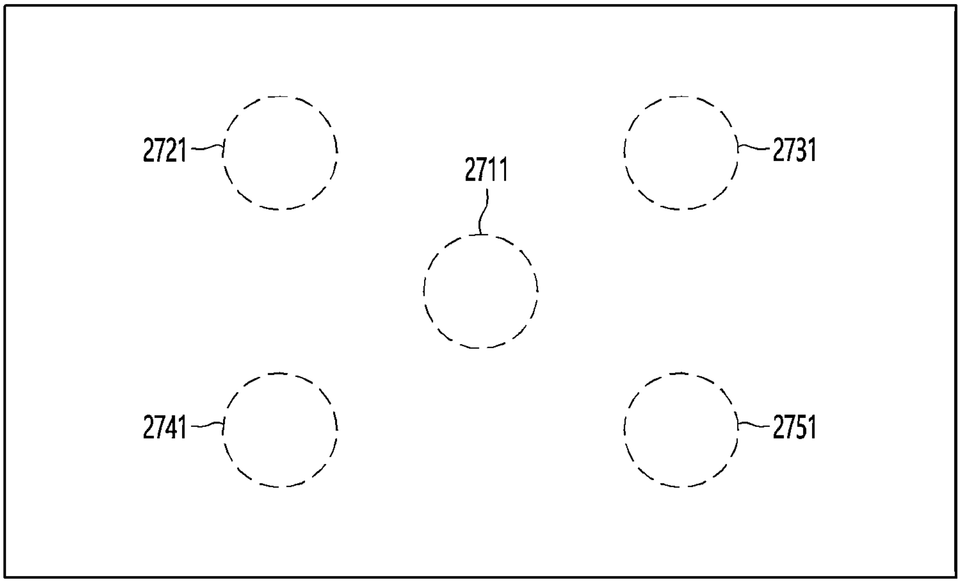
FIGS. 18A-19B are diagrams illustrating an active alignment method for a transmission module of a LiDAR device using a plurality of Tx alignment optic modules according to an embodiment.
Figure 18B:
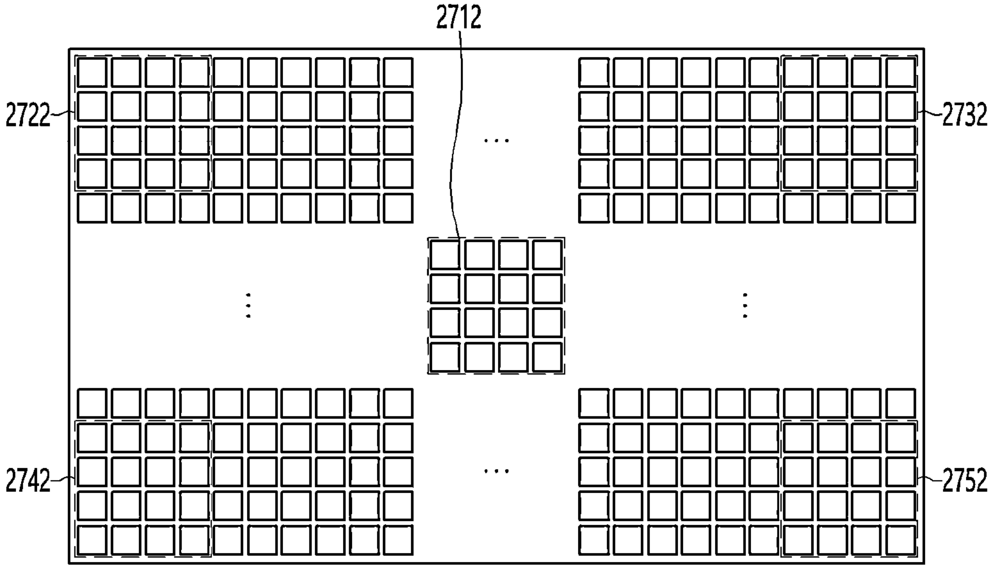

FIG. 18A is a diagram briefly showing an active alignment device according to an embodiment, and FIG. 18B is a diagram briefly showing a laser emitting module according to an embodiment.

Referring to FIGS. 18A and 18B, the active alignment device according to an embodiment may include a plurality of Tx alignment optic modules.

For example, as shown in FIGS. 18A and 18B, the active alignment device according to an embodiment may include a first Tx alignment optic module 2711, a second Tx alignment optic module 2721, a third Tx alignment optic module 2731, a fourth Tx alignment optic module 2741, and May include a fifth Tx alignment optic module 2751, but is not limited thereto.

In addition, the first to fifth Tx alignment optic modules 2711, 2721, 2731, 2741, and 2751 according to an embodiment are arranged to correspond to the first emitting unit group 2712, the second emitting unit group 2722, the third emitting unit group 2732, the fourth emitting unit group 2742, and the fifth emitting unit group 2752 included in each laser emitting module, respectively.

Herein, the fact that the first to fifth Tx alignment optic modules 2711, 2721, 2731, 2741, and 2751 according to an embodiment are arranged to correspond to the first emitting unit group 2712, the second emitting unit group 2722, the third emitting unit group 2732, the fourth emitting unit group 2742, and the fifth emitting unit group 2752 included in the laser emitting module, respectively, may mean that the laser output from each of the first emitting unit group 2712, the second emitting unit group 2722, the third emitting unit group 2732, the fourth emitting unit group 2742, and the fifth emitting unit group 2752 may be arranged to reach the image sensor included in each of the first to fifth Tx alignment optic modules 2711, 2721, 2731, 2741, and 2751, but embodiments are not limited thereto.

In addition, according to an embodiment, when the plurality of Tx alignment optic modules are used to derive the relative positional relationship between the laser emitting module and the emitting optic module included in the transmission module of the LiDAR device, the relative positional relationship between the laser emitting module and the emitting optic module may be derived based on at least one image obtained from a plurality of image sensors corresponding thereto.

This will be described in more detail below.

FIG. 19 is a graph illustrating the relationship between a height of an emitting optic module and a resolution values based on images obtained from a plurality of image sensors according to an embodiment.

Figure 19A:
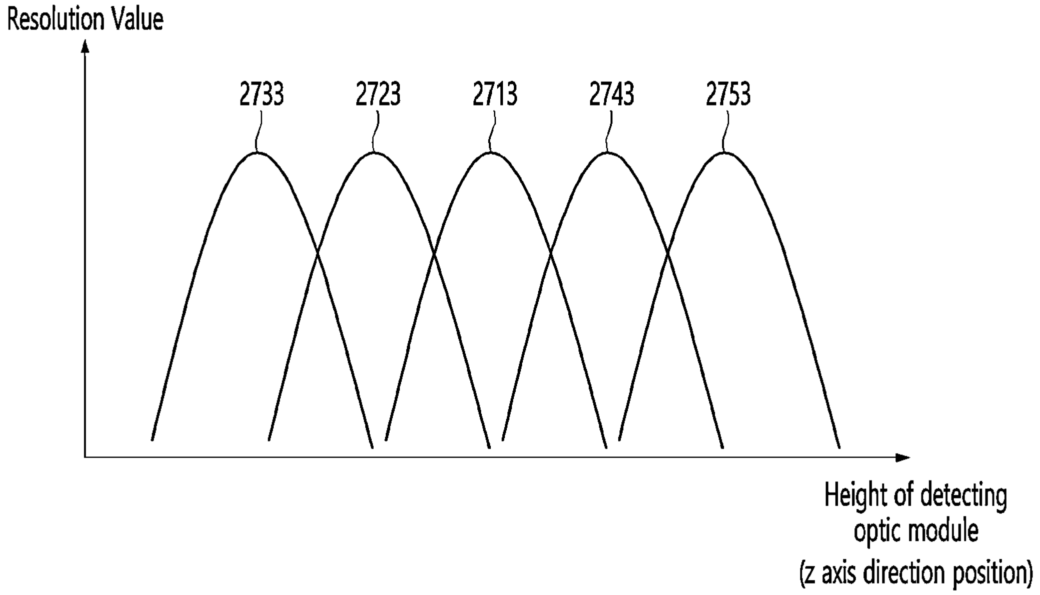

More specifically, FIG. 19A is primarily a graph showing the relationship between the height of the emitting optic module and the resolution value based on at least one image obtained from a plurality of image sensors according to an embodiment, and FIG. 19A is a graph showing the relationship between the height of the emitting optic module and the resolution value based on images obtained from a plurality of image sensors according to an embodiment after causing the emitting optic module to be rotated about at least one axis on the basis of the values obtained in FIG. 19A.

Herein, the first graph 2713 shown in FIG. 19A is a graph showing the relationship between the height of the emitting optic module and resolution based on the image obtained from the first image sensor for the laser output from the first emitting unit group 2712; the second graph 2723 is a graph showing the relationship between the height of the emitting optic module and resolution based on the image obtained from the second image sensor for the laser output from the second emitting unit group 2722; the third graph 2733 is a graph showing the relationship between the height of the emitting optic module and resolution based on the image obtained from the third image sensor for the laser output from the third emitting unit group 2732; the fourth graph 2743 is a graph showing the relationship between the height of the emitting optic module and resolution based on the image obtained from the fourth image sensor for the laser output from the fourth emitting unit group 2742; and the fifth graph 2753 is a graph showing the relationship between the height of the emitting optic module and resolution based on the image obtained from the fifth image sensor for the laser output from the fifth emitting unit group 2752.

According to an embodiment, as shown in FIG. 19A, the height of the emitting optic module at which the images obtained from each image sensor have the optimal resolution value may be different, and in this case, when the height of the emitting optic module is derived based on one optimal resolution value, it may be difficult to obtain alignment between the laser emitting module and the emitting optic module included in the LiDAR device.

Therefore, according to an embodiment, a rotational movement value about at least one axis for components included in the LiDAR device may be derived based on images obtained from the plurality of image sensors.

For example, according to an embodiment, a rotational movement value about at least one axis for the laser emitting module may be derived based on signals obtained from a plurality of image sensors, but is not limited thereto.

In addition, for example, according to an embodiment, a rotational movement value about at least one axis for the emitting optic module may be derived based on signals obtained from multiple image sensors, but is not limited thereto.

Herein, the rotational movement value about at least one axis may be determined based on the peak values, order of peaks, spacing, and the like of the first to fifth graphs 2713, 2723, 2733, 2743, and 2753 shown in FIG. 19A, but is not limited thereto.

Figure 19B:
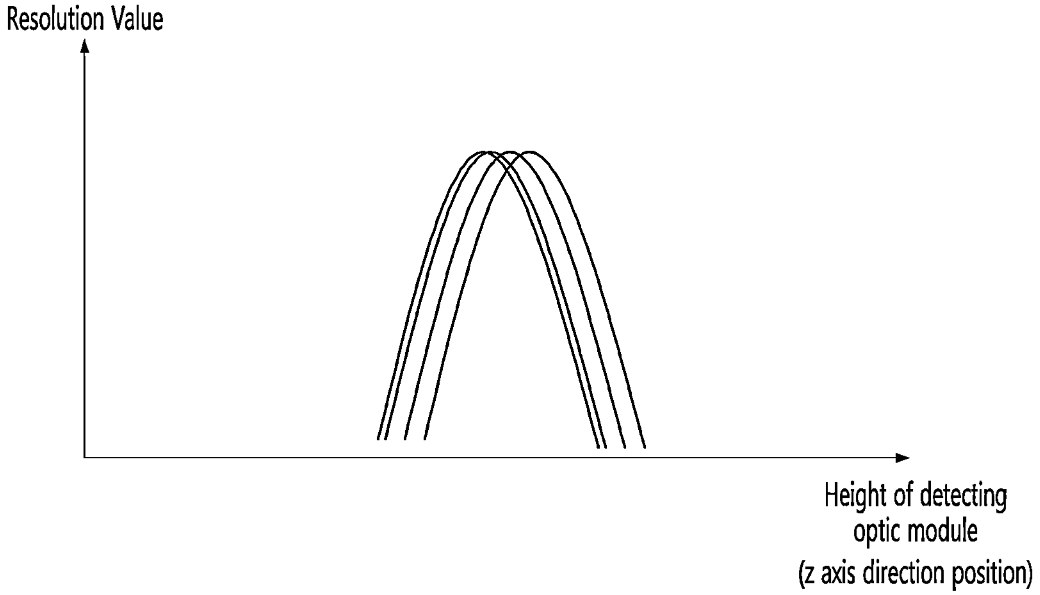

After causing the components included in the LiDAR device to be rotated based on the rotational movement value derived as described above, the relationship between the height of the emitting optic module and the resolution value may be indicated based on images obtained from a plurality of image sensors, as shown in FIG. 19B.

Referring to FIG. 19B, the spacing between graphs obtained based on images obtained from the plurality of image sensors after the components included in the LiDAR device are rotated according to an embodiment may be closer than before the rotation movement.

Herein, the spacing between graphs may refer to, but is not limited to, similarity between graphs, spacing between peaks, and the like.

According to an embodiment, the relative positional relationship between the laser emitting module and the emitting optic module included in the transmission module may be determined based on the measured resolution value.

For example, according to an embodiment, the relative positional relationship between the laser emitting module and the emitting optic module included in the transmission module may be determined based on an average value of the height of the emitting optic module at which the resolution value measured from the plurality of image sensors has the peak, but embodiments are not limited thereto.

In addition, for example, according to an embodiment, the relative positional relationship between the laser emitting module and the emitting optic module included in the transmission module may be determined based on the height of the emitting optic module at which the resolution value for the laser output from the first emitting unit group 2721 disposed in the center of the laser emitting module among the resolution values measured from multiple image sensors has the peak value, but is not limited thereto.

In addition, for example, according to an embodiment, the relative positional relationship between the laser emitting module and the emitting optic module included in the transmission module may be determined based on an average value of the height of the emitting optic module at which the resolution values for the lasers output from the second to fifth emitting unit groups 2722, 2732, 2742, and 2752 arranged on the outside of the laser emitting module among the resolution values measured from multiple image sensors has the peak value, but is not limited thereto.

FIG. 20 is a diagram illustrating an active alignment method for a transmission module of a LiDAR device according to an embodiment.

Referring to FIG. 20, the active alignment method 2800 for a transmission module of a LiDAR device according to an embodiment includes positioning a target laser emitting module at a target location (S2810), when the target emitting optic module is located at the first to Nth positions, obtaining first resolution data based on images obtained from a plurality of image sensors for each of the positions (S2820), obtaining a rotational movement value of the target emitting optic module based on the obtained first resolution data (S2830), rotating the target emitting optic module based on the obtained rotational movement value (S2840), obtaining second resolution data based on images obtained from a plurality of image sensors for each case in which the target emitting optic module is located at the first to Nth positions (S2850), obtaining a parallel movement value of the target emitting optic module based on the obtained second resolution data (S2860), and moving the target emitting optic module in parallel based on the obtained parallel movement value (S2870).

Herein, in the step (S2810) of positioning the target laser emitting module at the target position according to an embodiment, the target position may be a predetermined position.

For example, in the step (S2810) of positioning the target laser emitting module at the target location according to an embodiment, the target location may be a predetermined location to obtain active alignment of the transmission module of the target LiDAR device.

In addition, in the step (S2810) of positioning the target laser emitting module at the target location according to an embodiment, although it may be the target emitting optic module that is located at the target location is, it has been described in this specification for convenience of explanation that the target laser emitting module is located at the target location.

However, it should be noted that the technical idea of the invention described in this specification is not limited thereto, and matters that can be changed when the target emitting optic module is located at the target location are included in the spirit of the invention described in this specification.

In addition, when the target emitting optic module according to an embodiment is located at the first to Nth positions, since the above-mentioned contents may be applied to the step (S2820) of obtaining the first resolution data based on images obtained from the plurality of image sensors, a redundant description will be omitted.

In addition, in the step (S2820) of obtaining the first resolution data based on images obtained from the plurality of image sensors for each case in which the target emitting optic module according to an embodiment is located at the first to Nth positions, the first to Nth positions may be calculated based on the initial position.

For example, in the step (S2820) of obtaining the first resolution data based on images obtained from the plurality of image sensors for each case in which the target emitting optic module according to an embodiment is located at the first to Nth positions, the first to Nth positions correspond to −M, −2M, −3M, −4M, −5M, +0, +M, +2M, +3M, +4M, +5M based on the initial position, but is not limited thereto.

Herein, the above-mentioned M may refer to, but is not limited to, the minimum movement unit.

In addition, in the step (S2820) of obtaining the first resolution data based on images obtained from the plurality of image sensors for each case in which the target emitting optic module according to an embodiment is located at the first to Nth positions, the plurality of image sensors may be included in each of the plurality of Tx alignment optic modules used for active alignment.

For example, in the step (S2820) of obtaining the first resolution data based on images obtained from the plurality of image sensors for each case in which the target emitting optic module according to an embodiment is located at the first to Nth positions, when five Tx alignment optic modules are used for active alignment, an image sensor is included in each Tx alignment optic module and thus five image sensors may be provided, but is not limited thereto.

In addition, in the step (S2820) of obtaining the first resolution data based on images obtained from the plurality of image sensors for each case in which the target emitting optic module according to an embodiment is located at the first to Nth positions, the first resolution data may include resolution values calculated based on images obtained from each image sensor according to the location of the target emitting optic module.

In addition, in the step (S2820) of obtaining the first resolution data based on images obtained from the plurality of image sensors for each case in which the target emitting optic module is located at the first to Nth positions according to an embodiment, although it may be the laser emitting module that is located at the first to Nth positions, it has been described in this specification for convenience of explanation that the target emitting optic module is located at the first to Nth positions.

However, it should be noted that the technical idea of the invention described in this specification is not limited thereto, and matters that may change when the target laser emitting module is located at the first to Nth positions are also included in the spirit of the invention described in this specification.

In addition, the above-described contents may be applied to the step (S2830) of obtaining the rotational movement value of the target emitting optic module based on the obtained first resolution data according to an embodiment, a redundant description will be omitted.

In addition, in the step (S2830) of obtaining the rotational movement value of the target emitting optic module based on the obtained first resolution data according to an embodiment, the rotational movement value of the target emitting optic module may be an rotation movement value about at least one axis.

For example, in the step (S2830) of obtaining the rotational movement value of the target emitting optic module based on the obtained first resolution data according to an embodiment, the rotational movement value of the target emitting optic module may be an rotation movement value about the X-axis or Y-axis, but is not limited thereto.

In addition, in the step (S2830) of obtaining the rotational movement value of the target emitting optic module based on the obtained first resolution data according to an embodiment, the rotational movement value of the target emitting optic module may be an rotation movement value about an axis different from an axis that serves as a movement reference for the above-mentioned first to Nth positions.

For example, in the step (S2830) of obtaining the rotational movement value of the target emitting optic module based on the obtained first resolution data according to an embodiment, when the axis that serves as a movement reference for the above-mentioned first to Nth positions is the Z axis, the rotational movement value of the target emitting optic module may be an rotation movement value about the X or Y axis, embodiments are not limited thereto.

In addition, in the step (S2830) of obtaining the rotational movement value of the target emitting optic module based on the obtained first resolution data according to an embodiment, although it may be the target laser emitting module that is subject to rotation movement value calculation, it has been described in this specification for convenience of explanation that the target emitting optic module is subject to rotation movement value calculation.

However, it should be noted that the technical idea of the invention described in this specification is not limited thereto, and matters capable of being changed when the target laser emitting module is the subject of rotation movement value calculation are also included in the spirit of the invention described in this specification.

In addition, the above-described contents may be applied to the step (S2840) of rotating the target emitting optic module based on the obtained rotation movement value according to an embodiment, a redundant description will be omitted.

In addition, the step (S2840) of rotating the target emitting optic module based on the obtained rotation movement value according to an embodiment may be implemented by the above-described position adjustment module included in the active alignment device, but is not limited thereto.

In addition, in the step (S2440) of rotating the target emitting optic module based on the obtained rotational movement value according to an embodiment, although it may be the target laser emitting module that is subject to rotational movement, it has been described in this specification for convenience of explanation that the target emitting optic module is subject to rotational movement.

However, it should be noted that the technical idea of the invention described in this specification is not limited thereto, and matters that may change when the target laser emitting module is subject to rotational movement are also included in the spirit of the invention described in this specification.

In addition, since the above-described contents may be applied to the step (S2850) of obtaining the second resolution data based on images obtained from the plurality of image sensors for each case in which the target emitting optic module is located at the first to Nth positions, a redundant description will be omitted.

In addition, although the first to Nth positions in the step (S2850) of obtaining the second resolution data based on images obtained from the plurality of image sensors for each case in which the target emitting optic module is located at the first to Nth positions according to an embodiment use the same terms as in the step (S2820) of obtaining the first resolution data for convenience of explanation, the location at each stage may be different from each other.

In addition, in the step (S2850) of obtaining the second resolution data based on images obtained from the plurality of images sensors for each case in which the target emitting optic module is located at the first to Nth positions according to an embodiment, although it may be the laser emitting module that is located at the first to Nth positions, it has been described in this specification for convenience of explanation that the target emitting optic module is located at the first to Nth positions.

However, it should be noted that the technical idea of the invention described in this specification is not limited thereto, and matters capable of being changed when the target laser emitting module is located at the first to Nth positions are included in the spirit of the invention described in this specification.

In addition, since the above-mentioned contents may be applied to the step (S2860) of obtaining the parallel movement value of the target emitting optic module based on the obtained second resolution data according to an embodiment, a redundant description will be omitted.

In addition, in the step (S2860) of obtaining the parallel movement value of the target emitting optic module based on the obtained second resolution data according to an embodiment, the parallel movement value of the target emitting optic module may be a parallel movement value with respect to one axis.

For example, in the step (S2860) of obtaining the parallel movement value of the target emitting optic module based on the obtained second resolution data according to an embodiment, although the parallel movement value of the target emitting optic module may be a parallel movement value with respect to the Z axis, it is not limited thereto.

In addition, in the step (S2860) of obtaining the parallel movement value of the target emitting optic module based on the obtained second resolution data according to an embodiment, the parallel movement value of the target detecting optic module may be a parallel movement value with respect to the same axis as an axis that serves as a movement reference for the above-mentioned first to Nth positions.

For example, in the step (S2860) of obtaining the parallel movement value of the target emitting optic module based on the obtained second resolution data according to an embodiment, when the axis that serves as a movement reference for the above-mentioned first to Nth positions is the Z axis, although the parallel movement value of the target emitting optic module may be a parallel movement value with respect to the Z axis, it is not limited thereto.

In addition, in the step (S2860) of obtaining the parallel movement value of the target emitting optic module based on the obtained second resolution data according to an embodiment, although it may be the target laser emitting module that is subject to parallel movement value calculation, it has been described in this specification for convenience of explanation that the target emitting optic module is subject to parallel movement value calculation.

However, it should be noted that the technical idea of the invention described in this specification is not limited thereto, and matters capable of being changed when the target laser emitting module is subject to parallel movement value calculation are also included in the spirit of the invention described in this specification.

In addition, since the above-mentioned contents may be applied to the step (S2870) of moving the target emitting optic module in parallel based on the obtained parallel movement value according to an embodiment, a redundant description will be omitted.

In addition, the step (S2870) of moving the target emitting optic module in parallel based on the obtained parallel movement value according to an embodiment may be implemented by the above-described position adjustment module included in the active alignment device, but is not limited thereto.

In addition, in the step (S2870) of moving the target emitting optic module in parallel based on the obtained parallel movement value according to an embodiment, although it may be the target laser emitting module that is subject to parallel movement, it has been described in this specification for convenience of explanation that the target emitting optic module is subject to parallel movement.

However, it should be noted that the technical idea of the invention described in this specification is not limited thereto, and matters capable of being changed when the target laser emitting module is subject to parallel movement are also included in the spirit of the invention described in this specification.

2.2.4. Active Alignment Device and Method for a Transmission Module and Reception Module of a LiDAR Device FIG. 21 is a diagram illustrating an alignment optic module according to an embodiment.

Figure 21:
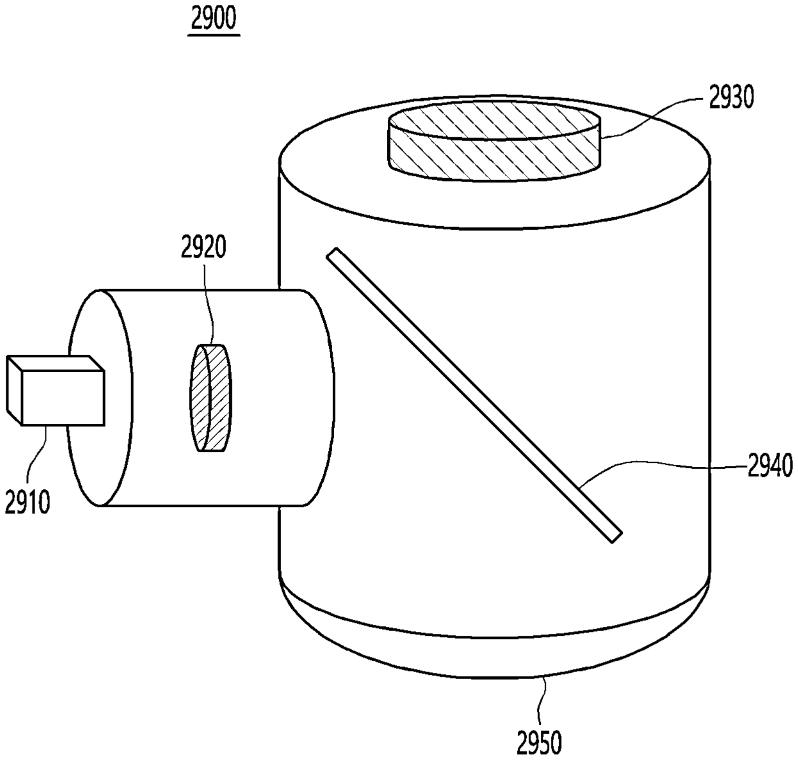
FIG. 21 is a diagram illustrating an alignment optic module according to an embodiment.

Referring to FIG. 21, the alignment optic module 2900 according to an embodiment may include an illuminating unit 2910, a chart unit 2920, an image sensor 2930, a beam splitter 2940, and a collimation unit 2950.

Herein, since the contents described referring to FIGS. 11 to 15 may be applied to the illuminating unit 2910, a redundant description will be omitted.

In addition, since the contents described referring to FIGS. 11 to 15 may be applied to the chart unit 2920, a redundant description will be omitted.

In addition, since the contents described referring to FIGS. 16 to 20 may be applied to the image sensor 2930, a redundant description will be omitted.

In addition, since the contents described referring to FIGS. 11 to 20 may be applied to the collimation unit 2950, a redundant description will be omitted.

The beam splitter 2940 according to an embodiment may reflect the light output from the illuminating unit to guide it toward the collimation unit 2950, and pass the laser light received through the collimation unit 2950 to guide it to the image sensor 2930.

According to an embodiment, the alignment optic module 2900 described referring to FIG. 21 may be used for active alignment of the reception module or transmission module of the target LiDAR device, in which the active alignment device for the target LiDAR device may be implemented using one type of alignment optic module 2900, thereby making it simpler to implement the device.

2.2. Device and Method for Alignment Between a Transmission Module and a Reception Module of a LiDAR Device Before explaining in detail, since the above-described information may be applied to the active alignment device and method for alignment between the transmission module and reception module of the LiDAR device, a redundant description will be omitted.

Figure 22:
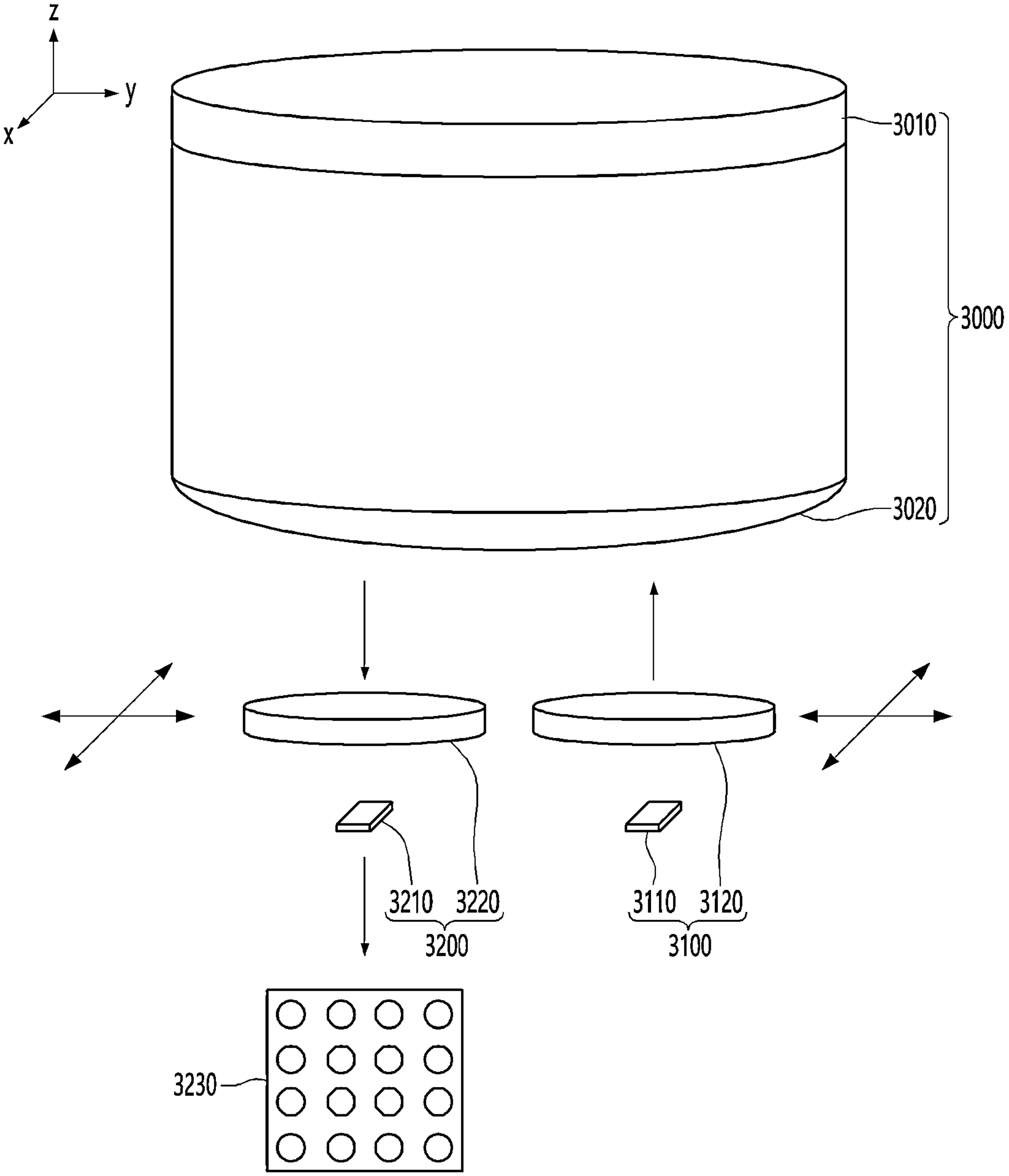
FIG. 22 is a diagram illustrating an active alignment method for alignment between a transmission module and a reception module of a LiDAR device using a matching alignment optic module and a matching alignment optic module according to an embodiment.

FIG. 22 is a diagram illustrating an active alignment method for alignment between a transmission module and a reception module of a LiDAR device using a matching alignment optic module and a matching alignment optic module according to an embodiment.

Referring to FIG. 22, the matching alignment optic module 3000 according to an embodiment may include a reflector 3010 and a collimation unit 3020.

Herein, the matching alignment optic module 3000 may be used to derive the relative positional relationship between the laser emitting module 3110 and the imaging optic module 3120 or the relative positional relationship between the laser detecting module 3210 and the detecting optic module 3220 for obtaining alignment between the transmission module 3100 and reception module 3200 included in the LiDAR device.

The reflector 3010 included in the matching alignment optic module 3000 according to an embodiment may be configured to reflect at least a portion of the laser emitted from the laser emitting module 3110 so that the laser emitted from the laser emitting module 3110 is detected by the laser detecting module 3210.

For example, the reflector 3010 included in the matching alignment optic module 3000 according to an embodiment reflects at least a portion of the laser emitted from the laser emitting module 3110 and irradiated through the emitting optic module 3120 to cause the same to be detected by the laser detecting module 3210 through the detecting optic module 3220, but is not limited thereto.

In addition, since the above-described descriptions of the collimation units may be applied to the collimation unit 3020 included in the matching alignment optic module 3000 according to an embodiment, a redundant description will be omitted.

In addition, referring to FIG. 22, the matching alignment optic module 3000 according to an embodiment may be arranged so that the laser emitted from the laser emitting module 3110 reaches a specific area of the laser detecting module 3210.

For example, the matching alignment optic module 3000 according to an embodiment is arranged so that the laser output from the first emitting unit group included in the laser emitting module 3110 is reflected from the reflector 3010 to reach the first detecting unit group 3230 included in the laser detecting module 3210, but is not limited thereto.

Herein, the fact that the laser emitted from the laser emitting module 3110 reaches a specific area of the laser detecting module 3210 may mean that the laser emitted from the laser emitting module 3110 reaches a specific area of the laser detecting module 3210, when the laser emitting module 3110 and the emitting optic module 3120 included in the transmission module 3100 are aligned, and the laser detecting module 3210 and the detecting optic module 3220 included in the reception module 3200 are aligned.

In addition, herein, the above-described first emitting unit group may refer to a set of emitting units arranged in a specific area of the laser emitting module 3110, and the above-described first detecting unit group 3230 may refer to a set of detecting units disposed in a specific area of the laser detecting module 3210.

In addition, according to an embodiment, the relative positional relationship between the laser emitting module 3110 and the emitting optic module 3120 included in the transmission module 3100 may be derived, or the relative positional relationship between the laser detecting module 3210 and the detecting optic module 3220 included in the reception module 3200 may be derived, based on at least one signal output from the laser detecting module 3230.

In addition, according to an embodiment, a parallel movement value based on at least one axis for a component included in the target LiDAR device may be derived based on at least one signal output from the laser detecting module.

For example, according to an embodiment, as a result of detecting the laser emitted from the laser emitting module 3110, a parallel movement value based on the X-axis and/or Y-axis for the laser emitting module 3110 included in the transmission module 3100 may be derived based on at least one signal output from the laser detecting module 3210, embodiments are not limited thereto.

In addition, for example, according to an embodiment, as a result of detecting the laser emitted from the laser emitting module 3110, although a parallel movement value based on the X-axis and/or Y-axis for the emitting optic module 3120 included in the transmission module 3100 may be derived based on at least one signal output from the laser detecting module 3210, embodiments are not limited thereto.

In addition, for example, according to an embodiment, As a result of detecting the laser emitted from the laser emitting module 3110, a parallel movement value based on the X-axis and/or Y-axis for the laser detecting module 3210 included in the reception module 3200 may be derived based on at least one signal output from the laser detecting module 3210, but is not limited thereto.

In addition, for example, according to an embodiment, as a result of detecting the laser emitted from the laser emitting module 3110, a parallel movement value based on the X-axis and/or Y-axis for the detecting optic module 3220 included in the reception module 3200 may be derived Based on at least one signal output from the laser detecting module 3210, but is not limited thereto.

In addition, according to an embodiment, the position movement criteria of the components of the LiDAR device adjusted in the matching alignment step for alignment between the transmission module 3100 and reception module 3200 described above may be different from the position movement criteria of the components of the LiDAR device adjusted in the alignment step for each of the above-described transmission module 3100 or reception module 3200.

For example, although the positional movement criteria of the components of the LiDAR device adjusted in the alignment step for the transmission module 3100 are parallel movement based on the Z axis and rotational movement based on the X and Y axes; the positional movement criteria of the components of the LiDAR device adjusted in the alignment step for the reception module 3200 are parallel movement based on the Z axis and rotational movement based on the X and Y axes; and the positional movement criteria of the components of the LiDAR device adjusted in the matching alignment stage for the alignment between the transmission module 3100 and the reception module 3200 may be parallel movement based on the X and Y axes, embodiments are not limited thereto.

Figure 23:
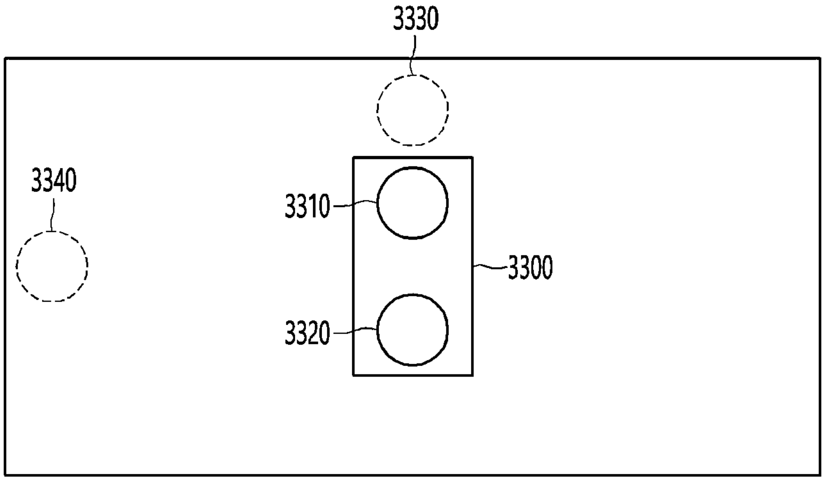
FIG. 23 is a diagram illustrating an active alignment method for alignment between a transmission module and a reception module of a LiDAR device using a plurality of matching alignment optic modules according to an embodiment.

FIG. 23 is a diagram illustrating an active alignment method for alignment between a transmission module and a reception module of a LiDAR device using a plurality of matching alignment optic modules according to an embodiment.

Referring to FIG. 23, an active alignment device according to an embodiment may include a plurality of matching alignment optic modules.

For example, as shown in FIG. 23, the active alignment device according to an embodiment may include a first matching alignment optic module 3330 and a second matching alignment optic module 3340, but is not limited thereto.

In addition, the first matching alignment optic module 3330 according to an embodiment may be arranged to correspond to the first emitting unit group included in the transmission module 3310 and the first detecting unit group included in the reception module 3320 of the target LiDAR device 3300.

Herein, the fact that the first matching alignment optic module 3330 according to an embodiment is arranged to correspond to the first emitting unit group included in the transmission module 3310 and the first detecting unit group included in the reception module 3320 of the target LiDAR device 3300 may mean that the laser output from the first emitting unit group is arranged so that it is reflected from the first reflector included in the first matching alignment optic module 3330 to reach the first detecting unit group, embodiments are not limited thereto.

In addition, the second matching alignment optic module 3340 according to an embodiment may be arranged to correspond to the second emitting unit group included in the transmission module 3310 and the second detecting unit group included in the reception module 3320 of the target LiDAR device 3330.

Herein, according to an embodiment, the second matching alignment optic module 3340 is disposed to correspond to the second emitting unit group included in the transmission module 3310 and the second detecting unit group included in the reception module 3320 of the target LiDAR device 3330 mean that the laser output from the second emitting unit group is arranged to be reflected from the second reflector tongue included in the second matching alignment optic module 3340 to reach the second detecting unit group, but embodiments are not limited thereto.

In addition, according to an embodiment, the above-described first emitting unit group may be disposed outside the laser emitting module.

For example, according to an embodiment, the above-described first emitting unit group may be disposed at the upper center of the laser emitting module, but is not limited thereto.

In addition, according to an embodiment, the above-described first detecting unit group may be disposed outside the laser detecting module.

For example, according to an embodiment, the above-described first detecting unit group may be disposed at the upper center of the laser detecting module, but is not limited thereto.

In addition, according to an embodiment, the first emitting unit group and first detecting unit group described above may be arranged to form part of the viewing angle of the target LiDAR device.

For example, according to an embodiment, the first emitting unit group and first detecting unit group described above may be arranged to form an upper central viewing angle of the target LiDAR device, but is not limited thereto.

In addition, according to an embodiment, the above-described second emitting unit group may be disposed outside the laser emitting module.

For example, according to an embodiment, the above-described second emitting unit group may be disposed at the center left of the laser emitting module, but is not limited thereto.

In addition, according to an embodiment, the above-described second detecting unit group may be disposed outside the laser detecting module.

For example, according to an embodiment, the above-described second detecting unit group may be disposed at the center left of the laser detecting module, but is not limited thereto.

In addition, according to an embodiment, the above-described second emitting unit group and second detecting unit group may be arranged to form part of the viewing angle of the target LiDAR device.

For example, according to an embodiment, the above-described second emitting unit group and second detecting unit group may be arranged to form the left central viewing angle of the target LiDAR device, but are not limited thereto.

In addition, referring to FIG. 23, the target LiDAR device 3300 may be located at the target location to perform active alignment between the transmission module 3310 and reception module 3320 of the LiDAR device 3300 using a plurality of matching alignment optic modules 3330 and 3340.

Herein, the target position may refer to a predetermined position to perform active alignment for the alignment between the transmission module 3310 and the reception module 3320 of the target LiDAR device 3300, and may be defined by a plurality of matching alignment optic modules 3330 and 3340, but embodiments are not limited thereto.

In addition, according to an embodiment, the relative positional relationship between the laser emitting module and the emitting optic module included in the transmission module 3310 is derived, or the relative positional relationship between the laser detecting module and the detecting optic module included in the reception module 3320 may be derived, based on signals obtained from the first and second detecting unit groups included in the reception module 3320 of the target LiDAR device 3300.

Since the above-mentioned contents may be applied to this, a redundant description will be omitted.

In addition, according to an embodiment, a parallel movement value based on at least one axis of a component included in the target LiDAR device 3300 may be derived based on signals obtained from the first and second detecting unit groups included in the reception module 3320 of the target LiDAR device 3300.

Since the above-mentioned contents can be applied to this, a redundant description will be omitted.

Figure 24:
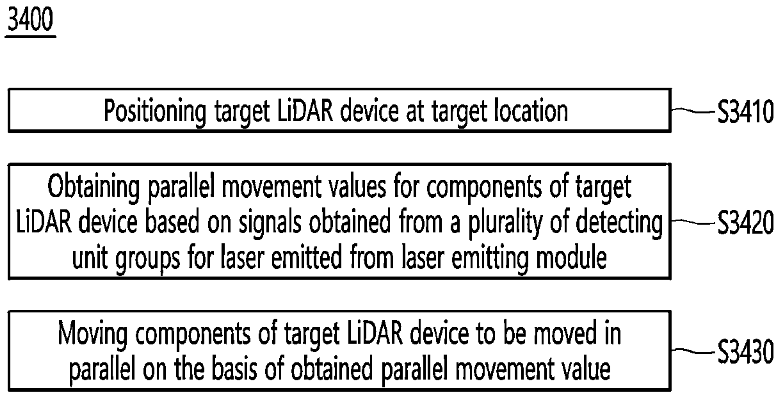
FIG. 24 is a diagram illustrating an active alignment method for alignment between a transmission module and a reception module of a LiDAR device according to an embodiment.

FIG. 24 is a diagram illustrating an active alignment method for alignment between a transmission module and a reception module of a LiDAR device according to an embodiment.

Referring to FIG. 24, the active alignment method 3400 for alignment between the transmission module and reception module of the LiDAR device according to an embodiment may include positioning the target LiDAR device at the target location (S3410), obtaining parallel movement values for components of the target LiDAR device based on signals obtained from a plurality of detecting unit groups for the laser emitted from the laser emitting module (S3420), and moving the components of the target LiDAR device in parallel on the basis of the obtained parallel movement value (S3430).

Herein, in the step (S3410) of positioning the target LiDAR device at the target location according to an embodiment, the target location may be a predetermined location.

For example, in the step (S3410) of positioning the target LiDAR device at the target location according to an embodiment, the target location may be predetermined to perform active alignment between the transmission module and the reception module of the target LiDAR device.

In addition, since the above-mentioned contents can be applied to the step (S3420) of obtaining parallel movement values for components of the target LiDAR device based on signals obtained from a plurality of detection unit groups for the laser emitted from the laser emitting module according to an embodiment, a redundant description will be omitted.

In addition, in the step (S3420) of obtaining parallel movement values for components of the target LiDAR device based on signals obtained from a plurality of detecting unit groups for the laser emitted from the laser emitting module according to an embodiment, the number of the plurality of detecting unit groups may be equal to the number of matching alignment optic modules used for active alignment.

For example, in the step (S3420) of obtaining parallel movement values for components of the target LiDAR device based on signals obtained from a plurality of detecting unit groups for the laser emitted from the laser emitting module according to an embodiment, when the number of matching alignment optic modules used for active alignment is two, the number of the plurality of detection unit groups may be two, but is not limited thereto.

In addition, the step (S3420) of obtaining parallel movement values for components of the target LiDAR device based on signals obtained from a plurality of detecting unit groups for the laser emitted from the laser emitting module according to an embodiment may include obtaining a parallel movement value for the laser emitting module of the target LiDAR device, but is not limited thereto.

In addition, the step (S3420) of obtaining parallel movement values for components of the target LiDAR device based on signals obtained from a plurality of detecting unit groups for the laser emitted from the laser emitting module according to an embodiment may include obtaining a parallel movement value for the emitting optic module of the target LiDAR device, but is not limited thereto.

In addition, the step (S3420) of obtaining parallel movement values for components of the target LiDAR device based on signals obtained from a plurality of detecting unit groups for the laser emitted from the laser emitting module according to an embodiment may include obtaining a parallel movement value for the laser detecting module of the target LiDAR device, but is not limited thereto.

In addition, the step (S3420) of obtaining parallel movement values for components of the target LiDAR device based on signals obtained from a plurality of detecting unit groups for the laser emitted from the laser emitting module according to an embodiment may include obtaining the parallel movement value for the detecting optic module of the target LiDAR device, but is not limited thereto.

In addition, in the step (S3420) of obtaining parallel movement values for components of the target LiDAR device based on signals obtained from a plurality of detecting unit groups for the laser emitted from the laser emitting module according to an embodiment, the parallel movement value for the component of the target LiDAR device may be based on at least one axis.

For example, in the step (S3420) of obtaining parallel movement values for components of the target LiDAR device based on signals obtained from a plurality of detecting unit groups for the laser emitted from the laser emitting module according to an embodiment, the parallel movement value for the components of the target LiDAR device may be based on the X and Y axes, but is not limited thereto.

In addition, since the above-described contents may be applied to the step (S3430) of moving the components of the target LiDAR device in parallel based on the obtained parallel movement value according to an embodiment, a redundant description will be omitted.

In addition, the step (S3430) of moving the components of the target LiDAR device in parallel based on the obtained parallel movement value according to an embodiment may be implemented by the above-described position adjustment module included in the active alignment device, but is not limited thereto.

In addition, the step (S3430) of moving the components of the target LiDAR device in parallel based on the obtained parallel movement value according to an embodiment may include moving the laser emitting module of the target LiDAR device in parallel, but is not limited thereto.

In addition, the step (S3430) of moving the components of the target LiDAR device in parallel based on the obtained parallel movement value according to an embodiment may include the step of causing the emitting optic module of the target LiDAR device to be moved in parallel, but is not limited thereto.

In addition, the step (S3430) of moving the components of the target LiDAR device in parallel based on the obtained parallel movement value according to an embodiment may include, but is not limited to, the step of parallel moving the laser detecting module of the target LiDAR device.

In addition, the step (S3430) of moving the components of the target LiDAR device in parallel based on the obtained parallel movement value according to an embodiment may include, the step of causing the detecting optic module of the target LiDAR device to be moved in parallel.

2.3 Various Embodiments for an Active Alignment Process for a LiDAR Device and a Method for Driving an Active Alignment Device)

Figure 25A:
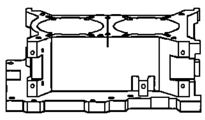
FIGS. 25A-25L and 26 are diagrams illustrating an active alignment process of a LiDAR device according to an embodiment.
Figure 25B:
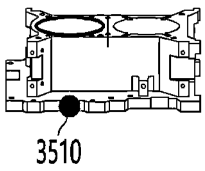
Figure 25C:
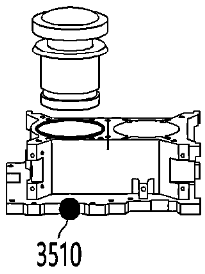
Figure 25D:
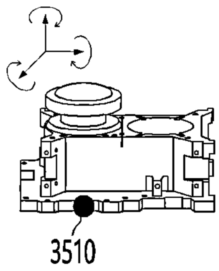
Figure 25E:
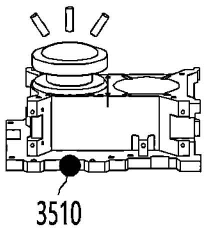
Figure 25F:
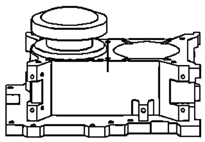
Figure 25G:
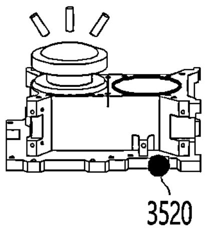
Figure 25H:
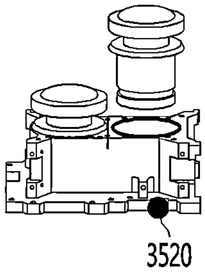
Figure 25I:
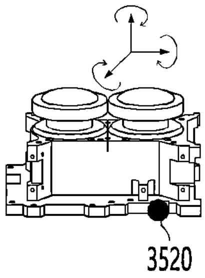
Figure 25J:
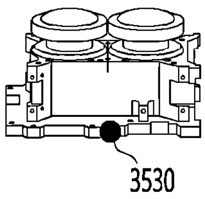
Figure 25K:
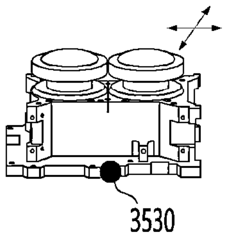
Figure 25L:
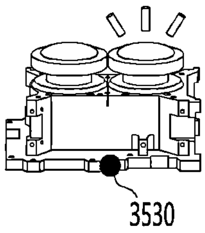
Figure 26:
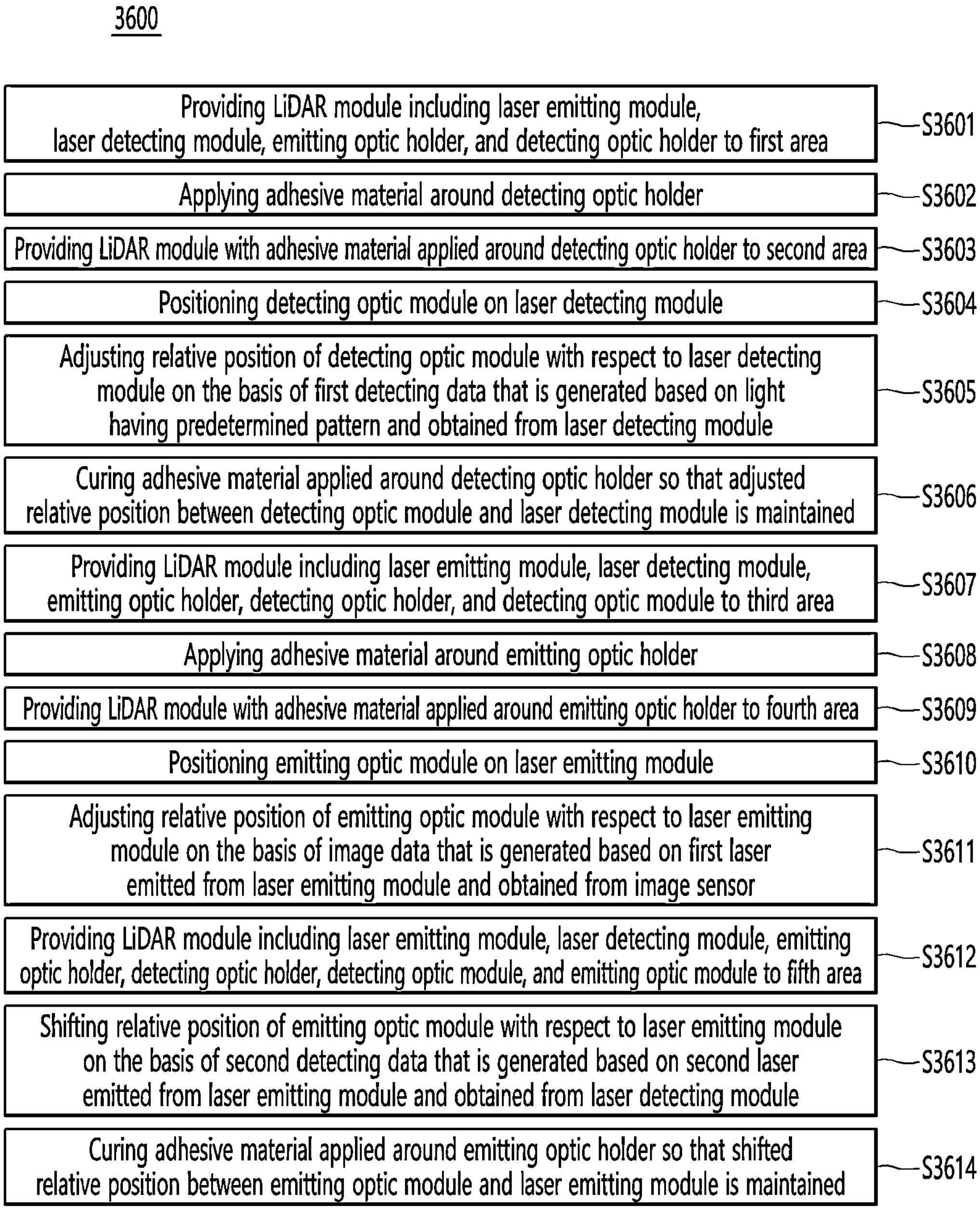

FIGS. 25A-25L and 26 are diagrams illustrating an active alignment process of a LiDAR device according to an embodiment Referring to FIG. 26, an active alignment process 3600 of a LiDAR device according to an embodiment may include providing a LiDAR module including a laser emitting module, a laser detecting module, an emitting optic holder, and a detecting optic holder to a first area (S3601), which is briefly shown in FIG. 25A.

Herein, the LiDAR module may refer to a LiDAR device in which at least some of the components of the LiDAR device are unassembled, and may refer to, but is not limited to, an assembly containing at least a portion of the LiDAR device provided as a product.

In addition, in the step (S3601) of providing the LiDAR module including the laser emitting module, the laser detecting module, the emitting optic holder, and the detecting optic holder to the first area according to an embodiment, the first area may refer to a predetermined area.

For example, in the step (S3601) of providing the LiDAR module including the laser emitting module, the laser detecting module, the emitting optic holder, and the detecting optic holder to the first area according to an embodiment, the first area may refer to, but is not limited to, a pre-designated area for applying adhesive material related to the reception module of the target LiDAR device.

More specifically, for example, in the step (S3601) of providing the LiDAR module including the laser emitting module, the laser detecting module, the emitting optic holder, and the detecting optic holder to the first area according to an embodiment, the first area may refer to, but is not limited to, a pre-designated area for applying the adhesive material around the detecting optic holder.

In addition, the step (S3601) of providing the LiDAR module including the laser emitting module, the laser detecting module, the emitting optic holder, and the detecting optic holder to the first area according to an embodiment may be implemented by a carrier module included in the active alignment device according to an embodiment.

For example, the processor according to an embodiment allows the LiDAR module including the laser emitting module, laser detecting module, emitting optic holder, and detecting optic holder to be moved to the first area by driving the carrier module included in the active alignment device according to an embodiment, but is not limited thereto.

In addition, referring to FIG. 26, the active alignment process 3600 of the LiDAR device according to an embodiment may include applying the adhesive material around the detecting optic holder (S3602).

Herein, since the above-mentioned information can be applied to the adhesive material, a redundant description will be omitted.

In addition, the step (S3602) of applying the adhesive material around the detecting optic holder according to an embodiment may be replaced by, or further include a step of applying the adhesive material around the laser detecting module, but is not limited thereto, and may further include various steps of applying adhesive material related to the reception module of the target LiDAR device.

Hereinafter, for convenience of explanation, the explanation will be made assuming that the process involves applying the adhesive material around the detecting optic holder.

In addition, the step (S3602) of applying the adhesive material around the detecting optic holder according to an embodiment may be implemented by an adhesive material injection module included in the active alignment device according to an embodiment.

For example, the processor according to an embodiment may apply the adhesive material around the detecting optic holder by driving an adhesive material injection module included in the active alignment device according to an embodiment, but is not limited thereto.

In addition, referring to FIG. 26, the active alignment process 3600 of a LiDAR device according to an embodiment may include providing the LiDAR module with the adhesive material applied around the detecting optic holder to the second area (S3603), which is briefly shown in FIG. 25B.

Herein, in the step (S3603) of providing the LiDAR module with adhesive material applied around the detecting optic holder according to an embodiment to the second area, adhesive material may not be applied around the emitting optic holder included in the LiDAR module where adhesive material is applied around the detecting optic holder.

In addition, in the step (S3603) of providing the LiDAR module with adhesive material applied around the detecting optic holder to the second area according to an embodiment, the second area may refer to a predetermined area.

For example, in the step (S3603) of providing the LiDAR module with adhesive material applied around the detecting optic holder according to an embodiment to the second area, the second area may be pre-designated for obtaining active alignment of the reception module of the target LiDAR device.

More specifically, for example, in the step (S3603) of providing the LiDAR module with adhesive material applied around the detecting optic holder according to an embodiment to the second area, the second area may be a pre-designated location for adjusting the relative positional relationship between the laser detecting module and the detecting optic module included in the reception module of the target LiDAR device, but is not limited thereto.

In addition, in the step (S3603) of providing the LiDAR module with adhesive material applied around the detecting optic holder to the second area according to an embodiment, the second area may refer to an area where the laser detecting module of the LiDAR module is located at the first target region 3510.

Herein, the first target region 3510 may refer to, but is not limited to, an area defined by Rx alignment optic modules included in the active alignment device according to an embodiment to obtain active alignment of the reception module of the target LiDAR device.

In addition, in the step (S3603) of providing the LiDAR module with adhesive material applied around the detecting optic holder according to an embodiment to the second area, the second area may be the same as the first area, but is not limited thereto and may be different from each other.

In addition, the step (S3603) of providing the LiDAR module with adhesive material applied around the detecting optic holder according to an embodiment to the second area may be implemented by a carrier module included in the active alignment device according to an embodiment.

For example, the processor according to an embodiment may drive the carrier module included in the active alignment device according to an embodiment to move, to the second area, the LiDAR module on which adhesive material is applied around the detecting optic holder, but is not limited thereto.

In addition, referring to FIG. 26, the active alignment process 3600 of the LiDAR device according to an embodiment may include the step (S3604) of positioning the detecting optic module on the laser detecting module, which is briefly shown in FIG. 25C.

Herein, the step (S3604) of positioning the detecting optic module on the laser detecting module according to an embodiment may include, but is not limited to, a step of inserting the detecting optic module into the detecting optic holder.

In addition, the step (S3604) of positioning the detecting optic module on the laser detecting module according to an embodiment may be implemented by a position adjustment module included in the active alignment device according to an embodiment.

For example, the processor according to an embodiment may allow the detecting optic module to be located on the laser detecting module by driving the position adjustment module included in the active alignment device according to an embodiment, but is not limited thereto.

In addition, referring to FIG. 26, the active alignment process 3600 of the LiDAR device according to an embodiment may include adjusting the relative position of the detecting optic module with respect to the laser detecting module on the basis of the first detecting data that is generated based on light having a predetermined pattern and obtained from the laser detecting module (S3605), which is briefly shown in FIG. 25D.

Herein, since the contents described referring to FIGS. 11 to 15 may be applied to the step (S3605) of adjusting the relative position of the detecting optic module with respect to the laser detecting module on the basis of the first detecting data that is generated based on light having a predetermined pattern and obtained from the laser detecting module according to an embodiment, a redundant description will be omitted.

In addition, in the step (S3605) of adjusting the relative position of the detecting optic module with respect to the laser detecting module on the basis of the first detecting data that is generated based on light having a predetermined pattern according to an embodiment and obtained from the laser detecting module, the first detecting data may include signals obtained from a plurality of detecting unit groups, but is not limited thereto.

In addition, in the step (S3605) of adjusting the relative position of the detecting optic module with respect to the laser detecting module on the basis of the first detecting data that is generated based on light having a predetermined pattern and obtained from the laser detecting module according to an embodiment, the first detecting data may include point data generated based on signals obtained from a plurality of detecting unit groups, but is not limited thereto.

In addition, in the step (S3605) of adjusting the relative position of the detecting optic module with respect to the laser detecting module on the basis of the first detecting data generated based on light having a predetermined pattern and obtained from the laser detecting module according to an embodiment, the first detecting data may include resolution data generated based on signals obtained from a plurality of detecting unit groups, but is not limited thereto.

In addition, in the step (S3605) of adjusting the relative position of the detecting optic module with respect to the laser detecting module on the basis of the first detecting data generated based on light having a predetermined pattern and obtained from the laser detecting module according to an embodiment, the position of the detecting optic module may be moved in parallel or rotated with respect to at least one axis.

For example, in the step (S3605) of adjusting the relative position of the detecting optic module with respect to the laser detecting module based on the first detecting data that is generated based on light having a predetermined pattern and obtained from the laser detecting module according to an embodiment, the position of the detecting optic module may be moved in parallel with respect to the Z axis or rotated about the X and Y axes, but is not limited thereto.

In addition, the step (S3605) of adjusting the relative position of the detecting optic module with respect to the laser detecting module on the basis of the detecting data that is generated based on light having a predetermined pattern and obtained from the laser detecting module according to an embodiment may be implemented by a position adjustment module included in the active alignment device according to an embodiment.

For example, the processor according to an embodiment may adjust the relative position of the detecting optic module with respect to the laser detecting module on the basis of the first detecting data that is generated based on light with a predetermined pattern and obtained from the laser detecting module by driving the position adjustment module included in the active alignment device according to an embodiment, but is not limited thereto.

In addition, referring to FIG. 26, the active alignment process 3600 of the LiDAR device according to an embodiment may include curing adhesive material applied around the detecting optic holder so that the adjusted relative position between the detecting optic module and the laser detecting module is maintained (S3606), which is briefly shown in FIG. 25E.

Herein, since the above-mentioned information for curing the adhesive material may be applied to the step (S3606) of curing the adhesive material applied around the detecting optic holder so that the adjusted relative position between the detecting optic module and the laser detecting module is maintained according to an embodiment, a redundant description will be omitted.

In addition, the step (S3606) of curing the adhesive material applied around the detecting optic holder so that the adjusted relative position between the detecting optic module and the laser detecting module is maintained according to an embodiment may be implemented by an adhesive material curing module included in the active alignment device according to an embodiment.

For example, the processor according to an embodiment may cure the adhesive material applied around the detecting optic holder so that the adjusted relative position between the detecting optic module and the laser detecting module is maintained by driving the adhesive material curing module included in the active alignment device according to an embodiment, but is not limited thereto.

In addition, referring to FIG. 26, the active alignment process 3600 of the LiDAR device according to an embodiment may include providing the LiDAR module including the laser emitting module, the laser detecting module, the emitting optic holder, the detecting optic holder, and the detecting optic module to a third area (S3607), which is briefly shown in FIG. 25F.

Herein, the LiDAR module may refer to a LiDAR device in which at least some of the components of the LiDAR device are unassembled, and may refer to, but is limited to, an assembly that includes at least a portion of the LiDAR device provided as a product.

In addition, in the step (S3607) of providing the LiDAR module including the laser emitting module, the laser detecting module, the emitting optic holder, the detecting optic holder, and the detecting optic module to the third area according to an embodiment, the third area may refer to a predetermined area.

For example, in the step (S3607) of providing the LiDAR module including the laser emitting module, the laser detecting module, the emitting optic holder, the detecting optic holder, and the detecting optic module to the third area according to an embodiment, the third area may refer to, but is not limited to, a pre-designated area for applying adhesive material related to the transmission module of the target LiDAR device.

More specifically, for example, in the step (S3607) of providing the LiDAR module including the laser emitting module, the laser detecting module, the emitting optic holder, the detecting optic holder, and the detecting optic module to the third area according to an embodiment, the third area may refer to, but is not limited to, a pre-designated area for applying adhesive material around the emitting optic holder.

In addition, in the step (S3607) of providing the LiDAR module including the laser emitting module, the laser detecting module, the emitting optic holder, the detecting optic holder, and the detecting optic module to the third area according to an embodiment, the third area may refer to the same area as either the first area or the second area, but is not limited to, and may refer to a different area from the first area and the second area.

In addition, the step (S3607) of providing the LiDAR module including the laser emitting module, the laser detecting module, the emitting optic holder, the detecting optic holder, and the detecting optic module to the third area according to an embodiment may be implemented by a carrier module included in the active alignment device according to an embodiment.

For example, the processor according to an embodiment is configured to move the LiDAR module including the laser emitting module, the laser detecting module, the emitting optic holder, the detecting optic holder, and the detecting optic module to the third area by driving the carrier module included in the active alignment device according to an embodiment, but is not limited thereto.

In addition, referring to FIG. 26, the active alignment process 3600 of a LiDAR device according to an embodiment may include applying an adhesive material around the emitting optic holder (S3608).

Herein, since the above-mentioned contents may be applied to the adhesive material, a redundant description will be omitted.

In addition, the step (S3608) of applying the adhesive material around the emitting optic holder according to an embodiment may be replaced by, or further include a step of applying adhesive material around the laser emitting module, but is not limited thereto, may include various steps of applying adhesive material related to the transmission module of the target LiDAR device.

Hereinafter, for convenience of explanation, the explanation will be made assuming that the process involves applying the adhesive material around the emitting optic holder.

In addition, the step (S3608) of applying adhesive material around the emitting optic holder according to an embodiment may be implemented by an adhesive material injection module included in the active alignment device according to an embodiment.

For example, the processor according to an embodiment may apply the adhesive material around the emitting optic holder by driving the adhesive material injection module included in the active alignment device according to an embodiment, but is not limited thereto.

In addition, referring to FIG. 26, the active alignment process 3600 of the LiDAR device according to an embodiment may include providing the LiDAR module with adhesive material applied around the emitting optic holder to a fourth area (S3609), which is briefly shown in FIG. 25G.

Herein, in the step (S3609) of providing the LiDAR module with adhesive material applied around the emitting optic holder to the fourth area according to an embodiment, although the adhesive material applied around the emitting optic holder was not cured, the adhesive material applied around the detecting optic holder may be cured, but is not limited thereto.

In addition, in the step (S3609) of providing the LiDAR module with adhesive material applied around the emitting optic holder to the fourth area according to an embodiment, the fourth area may refer to a predetermined area.

For example, in the step (S3609) of providing the LiDAR module with adhesive material applied around the emitting optic holder to the fourth area according to an embodiment, the fourth area may refer to a pre-designated location to obtain active alignment of the transmission module of the target LiDAR device.

More specifically, for example, in the step (S3609) of providing the LiDAR module with adhesive material applied around the emitting optic holder to the fourth area according to an embodiment, the fourth area may refer to, but is not limited to, a pre-designated location for adjusting the relative positional relationship between the laser emitting module and the emitting optic module included in the transmission module of the target LiDAR device.

In addition, in the step (S3609) of providing the LiDAR module with adhesive material applied around the emitting optic holder to the fourth area according to an embodiment, the fourth area may refer to an area where the laser emitting module of the LiDAR module is located at the second target region 3520.

Herein, the second target region 3520 may refer to, but is not limited to, an area defined by Tx alignment optic modules included in the active alignment device according to an embodiment to obtain active alignment of the transmission module of the target LiDAR device.

In addition, the second target region 3520 may be the same as or different from the first target region 3510.

In addition, in the step (S3609) of providing the LiDAR module with adhesive material applied around the emitting optic holder to the fourth area according to an embodiment, the fourth area may be the same as or different from at least one of the first to third areas.

In addition, the step (S3609) of providing the LiDAR module with adhesive material applied around the emitting optic holder to the fourth area according to an embodiment may be implemented by a carrier module included in the active alignment device according to an embodiment.

For example, the processor according to an embodiment may move the LiDAR module with adhesive material applied around the emitting optic holder to the fourth area by driving the carrier module included in the active alignment device according to an embodiment, but is not limited thereto.

In addition, referring to FIG. 26, the active alignment process 3600 of the LiDAR device according to an embodiment may include positioning the emitting optic module on the laser emitting module (S3610), which is briefly shown in FIG. 25H.

Herein, the step (S3610) of positioning the emitting optic module on the laser emitting module according to an embodiment may include inserting the emitting optic module into the emitting optic holder, but is not limited thereto.

In addition, the step (S3610) of positioning the emitting optic module on the laser emitting module according to an embodiment may be implemented by a position adjustment module included in the active alignment device according to an embodiment.

For example, the processor according to an embodiment may position the emitting optic module on the laser emitting module by driving the position adjustment module included in the active alignment device according to an embodiment, but is not limited thereto.

In addition, referring to FIG. 26, the active alignment process 3600 of the LiDAR device according to an embodiment may include adjusting a relative position of the emitting optic module with respect to the laser emitting module on the basis of image data that is generated based on the first laser emitted from the laser emitting module and obtained from the image sensor (S3611), which is briefly shown in FIG. 25I.

Herein, since the contents described referring to FIGS. 16 to 20 may be applied to the step (S3611) of adjusting the relative position of the emitting optic module with respect to the laser emitting module on the basis of image data that is generated based on the first laser emitted from the laser emitting module and obtained from the image sensor according to an embodiment, a redundant description will be omitted.

In addition, in the step (S3611) of adjusting the relative position of the emitting optic module with respect to the laser emitting module on the basis of image data that is generated based on the first laser emitted from the laser emitting module and obtained from the image sensor according to an embodiment, the first laser may include lasers output from a plurality of emitting unit groups, but is not limited thereto, and may include lasers output from at least one emitting unit.

In addition, in the step (S3611) of adjusting the relative position of the emitting optic module with respect to the laser emitting module on the basis of image data that is generated based on the first laser emitted from the laser emitting module and obtained from the image sensor according to an embodiment, the image data may include, but is not limited to, image data obtained from a plurality of image sensors.

In addition, in the step (S3611) of adjusting the relative position of the emitting optic module with respect to the laser emitting module on the basis of image data that is generated based on the first laser emitted from the laser emitting module and obtained from the image sensor according to an embodiment, the image data may include resolution data obtained based on image data obtained from a plurality of image sensors, but is not limited thereto.

In addition, in the step (S3611) of adjusting the relative position of the emitting optic module with respect to the laser emitting module on the basis of image data that is generated based on the first laser emitted from the laser emitting module and obtained from the image sensor according to an embodiment, the position of the emitting optic module may be moved in parallel or rotated with respect to at least one axis.

For example, in the step (S3611) of adjusting the relative position of the emitting optic module with respect to the laser emitting module on the basis of image data that is generated based on the first laser emitted from the laser emitting module and obtained from the image sensor according to an embodiment, the position of the emitting optic module may be moved in parallel with respect to the Z axis or rotated about the X and Y axes, but is not limited thereto.

In addition, the step (S3611) of adjusting the relative position of the emitting optic module with respect to the laser emitting module on the basis of image data that is generated based on the first laser emitted from the laser emitting module and obtained from the image sensor according to an embodiment may be implemented by a position adjustment module included in the active alignment device according to an embodiment.

For example, the processor according to an embodiment may adjust the relative position of the emitting optic module with respect to the laser emitting module on the basis of image data that is generated based on the first laser emitted from the laser emitting module and obtained from the image sensor by driving the position adjustment module included in the active alignment device according to an embodiment, but is not limited thereto.

In addition, referring to FIG. 26, the active alignment process 3600 of the LiDAR device according to an embodiment may include providing the LiDAR module including the laser emitting module, the laser detecting module, the emitting optic holder, the detecting optic holder, the detecting optic module, and the emitting optic module to a fifth area (S3612), which is briefly shown in FIG. 25J.

Herein, although the LiDAR module may refer to a LiDAR device in which at least some of the components of the LiDAR device are unassembled, but is not limited thereto, and it may refer to an assembly that includes at least a portion of the LiDAR device provided as a product.

In addition, in the step (S3612) of providing the LiDAR module including the laser emitting module, the laser detecting module, the emitting optic holder, the detecting optic holder, the detecting optic module, and the emitting optic module to the fifth area according to an embodiment, the fifth area may refer to a predetermined area.

For example, in the step (S3612) of providing the LiDAR module including the laser emitting module, the laser detecting module, the emitting optic holder, the detecting optic holder, the detecting optic module, and the emitting optic module to the fifth area according to an embodiment, the fifth area may refer to, but is not limited to, a pre-designated area for obtaining alignment between the transmission module and reception module of the target LiDAR device.

In addition, in the step (S3612) of providing the LiDAR module including the laser emitting module, the laser detecting module, the emitting optic holder, the detecting optic holder, the detecting optic module, and the emitting optic module to the fifth area according to an embodiment, the fifth area may refer to an area where the middle area between the laser emitting module and the laser detecting module included in the LiDAR module is located at the third target region 3530.

Herein, the third target region 3530 may refer to but is not limited to, an area defined by matching alignment optic modules included in the active alignment device according to an embodiment for obtaining alignment between the transmission module and reception module of the target LiDAR device.

In addition, the third target region 3530 may be the same as or different from any one target region of the first and second target regions 3510 and 3520.

In addition, in the step (S3612) of providing the LiDAR module including the laser emitting module, the laser detecting module, the emitting optic holder, the detecting optic holder, the detecting optic module, and the emitting optic module to the fifth area according to an embodiment, the fifth area may refer to the same area as any one of the first to fourth areas, but is not limited thereto, and may it may refer to a different area from the first to fourth areas.

In addition, in the step (S3612) of providing the LiDAR module including the laser emitting module, the laser detecting module, the emitting optic holder, the detecting optic holder, the detecting optic module, and the emitting optic module to the fifth area according to an embodiment, when the fifth area is the same as the fourth area, this step may be omitted.

In addition, the step (S3612) of providing the LiDAR module including the laser emitting module, the laser detecting module, the emitting optic holder, the detecting optic holder, the detecting optic module, and the emitting optic module to the fifth area according to an embodiment may be implemented by a carrier module included in the active alignment device according to an embodiment.

For example, the processor according to an embodiment may move the LiDAR module including the laser emitting module, laser detecting module, emitting optic holder, detecting optic holder, detecting optic module, and emitting optic module to the fifth area by driving the carrier module included in the active alignment device according to an embodiment, but is not limited thereto.

In addition, referring to FIG. 26, the active alignment process 3600 of the LiDAR device according to an embodiment may include shifting the relative position of the emitting optic module with respect to the laser emitting module on the basis of second detecting data that is generated based on the second laser emitted from the laser emitting module and obtained from the laser detecting module (S3613), which is briefly shown in FIG. 25K.

Herein, since the contents described referring to FIGS. 22 to 24 may be applied to the step (S3613) of shifting the relative position of the emitting optic module with respect to the laser emitting module on the basis of second detecting data that is generated based on the second laser emitted from the laser emitting module and obtained from the laser detecting module according to an embodiment, a redundant description will be omitted.

In addition, in the step (S3613) of shifting the relative position of the emitting optic module with respect to the laser emitting module on the basis of second detecting data that is generated based on the second laser emitted from the laser emitting module and obtained from the laser detecting module according to an embodiment, the second laser may include a laser output from a plurality of emitting unit groups, but is not limited thereto, and may include a laser output from at least one emitting unit.

In addition, in the step (S3613) of shifting the relative position of the emitting optic module with respect to the laser emitting module on the basis of second detecting data that is generated based on the second laser emitted from the laser emitting module and obtained from the laser detecting module according to an embodiment, the second detecting data may include, but is not limited to, signals obtained from a plurality of detecting unit groups.

In addition, in the step (S3613) of shifting the relative position of the emitting optic module with respect to the laser emitting module on the basis of second detecting data that is generated based on the second laser emitted from the laser emitting module and obtained from the laser detecting module according to an embodiment, the second detecting data may include, but is not limited to, point data generated based on signals obtained from a plurality of detecting unit groups.

In addition, in the step (S3613) of shifting the relative position of the emitting optic module with respect to the laser emitting module on the basis of second detecting data that is generated based on the second laser emitted from the laser emitting module and obtained from the laser detecting module according to an embodiment, the second detecting data may include, but is not limited to, resolution data generated based on signals obtained from a plurality of detecting unit groups.

In addition, in the step (S3613) of shifting the relative position of the emitting optic module with respect to the laser emitting module on the basis of second detecting data that is generated based on the second laser emitted from the laser emitting module and obtained from the laser detecting module according to an embodiment, the position of the emitting optic module may be moved in parallel with respect to at least one axis.

For example, in the step (S3613) of shifting the relative position of the emitting optic module with respect to the laser emitting module on the basis of second detecting data that is generated based on the second laser emitted from the laser emitting module and obtained from the laser detecting module according to an embodiment, the position of the emitting optic module may be moved in parallel with respect to the X-axis or Y-axis, but is not limited thereto.

In addition, the step (S3613) of shifting the relative position of the emitting optic module with respect to the laser emitting module on the basis of second detecting data that is generated based on the second laser emitted from the laser emitting module and obtained from the laser detecting module according to an embodiment may be implemented by a position adjustment module included in the active alignment device according to an embodiment.

For example, the processor according to an embodiment may shift the relative position of the emitting optic module with respect to the laser emitting module on the basis of the second detecting data that is generated based on the second laser emitted from the laser emitting module and obtained from the laser detecting module by driving the position adjustment module included in the active alignment device according to an embodiment, but is not limited thereto.

In addition, referring to FIG. 26, the active alignment process 3600 of the LiDAR device according to an embodiment may include curing the adhesive material applied around the emitting optic holder so that the shifted relative position between the emitting optic module and the laser emitting module is maintained (S3614), which is briefly shown in FIG. 25L.

Herein, since the above-mentioned information for curing the adhesive material may be applied to the step (S3614) of curing the adhesive material applied around the emitting optic holder so that the shifted relative position between the emitting optic module and the laser emitting module is maintained according to an embodiment, a redundant description will be omitted.

In addition, the step (S3614) of curing the adhesive material applied around the emitting optic holder so that the shifted relative position between the emitting optic module and the laser emitting module is maintained according to an embodiment may be implemented by an adhesive material curing module included in the active alignment device according to an embodiment.

For example, the processor according to an embodiment may cure the adhesive material applied around the emitting optic holder so that the shifted relative position between the emitting optic module and the laser emitting module is maintained by driving the adhesive material curing module included in the active alignment device according to an embodiment, but is not limited thereto.

FIGS. 27A-27L and 28 are diagrams illustrating an active alignment process of a LiDAR device according to an embodiment.

Figure 27A:
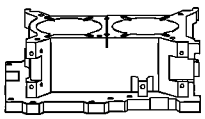
FIGS. 27A-27L and 28 are diagrams illustrating an active alignment process of a LiDAR device according to an embodiment.
Figure 28:
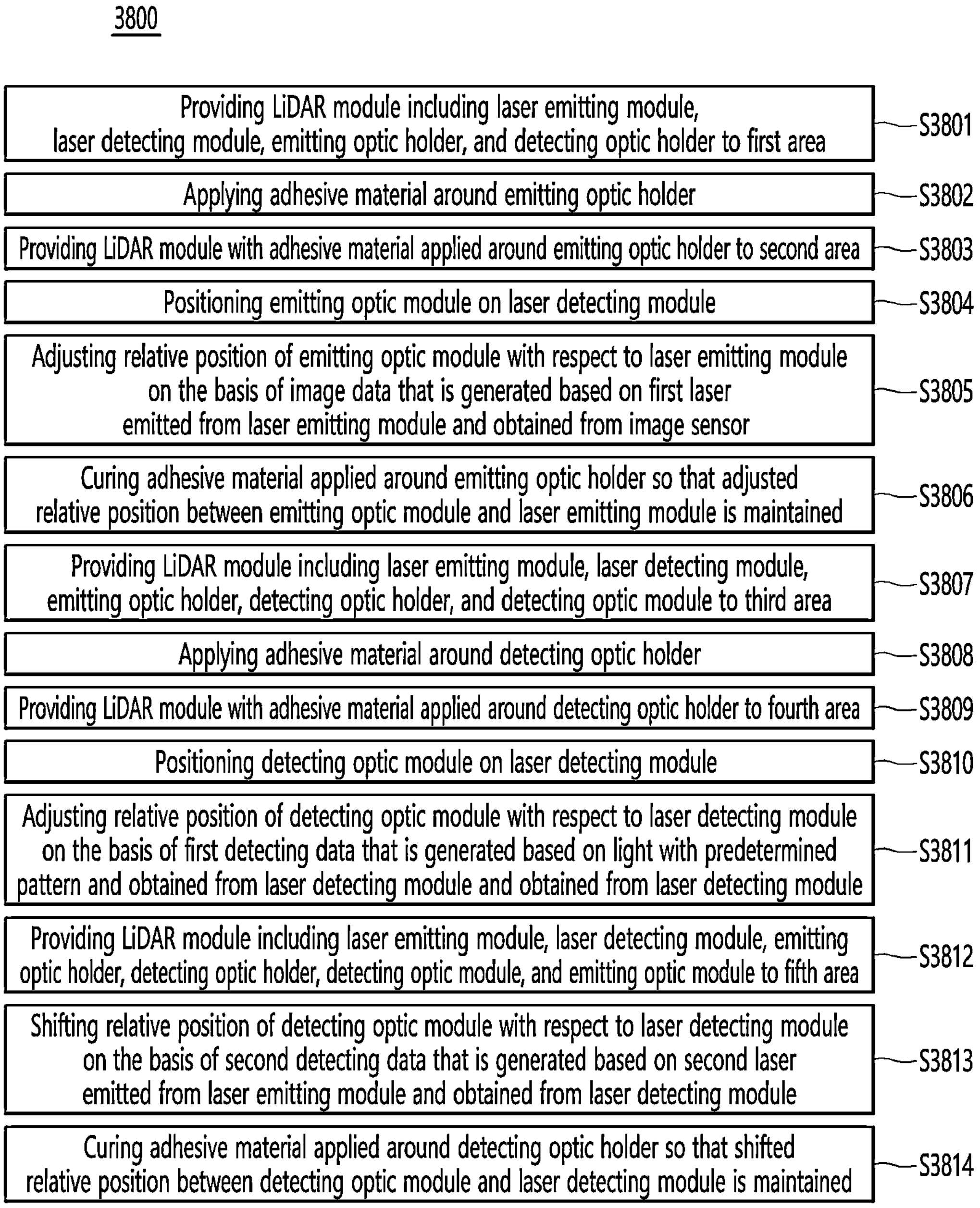

Referring to FIG. 28, an active alignment process 3800 of a LiDAR device according to an embodiment may include providing a LiDAR module including a laser emitting module, a laser detecting module, an emitting optic holder, and a detecting optic holder to a first area (S3801), which is briefly shown in FIG. 27A.

Herein, the LiDAR module may refer to a LiDAR device in which at least some of the components of the LiDAR device are unassembled, but it may refer thereto, and may refer to an assembly that includes at least a portion of the LiDAR device provided as a product.

In addition, in the step (S3801) of providing the LiDAR module including the laser emitting module, the laser detecting module, the emitting optic holder, and the detecting optic holder to the first area according to an embodiment, the first area may refer to a predetermined area.

For example, in the step (S3801) of providing the LiDAR module including the laser emitting module, the laser detecting module, the emitting optic holder, and the detecting optic holder to the first area according to an embodiment, the first area may refer to, but is not limited thereto, a pre-designated area for applying adhesive material related to the transmission module of the target LiDAR device.

More specifically, for example, in the step (S3801) of providing the LiDAR module including the laser emitting module, the laser detecting module, the emitting optic holder, and the detecting optic holder to the first area according to an embodiment, the first area may refer to, but is not limited to, a pre-designated area for applying adhesive material around the emitting optic holder.

In addition, the step (S3801) of providing the LiDAR module including the laser emitting module, the laser detecting module, the emitting optic holder, and the detecting optic holder to the first area according to an embodiment may be implemented by a carrier module included in the active alignment device according to an embodiment.

For example, the processor according to an embodiment may move the LiDAR module including the laser emitting module, the laser detecting module, the emitting optic holder, and the detecting optic holder to the first area by driving the carrier module included in the active alignment device according to an embodiment, but is not limited thereto.

In addition, referring to FIG. 28, the active alignment process 3800 of the LiDAR device according to an embodiment may include applying an adhesive material around the emitting optic holder (S3802).

Herein, since the above-described contents may be applied to the adhesive material, a redundant description will be omitted.

In addition, although the step (S3802) of applying adhesive material around the emitting optic holder according to an embodiment may be replaced by, or further include a step of applying adhesive material around the laser emitting module, but limited not thereto, and may include various steps of applying adhesive material related to the transmission module of the target LiDAR device.

Hereinafter, for convenience of explanation, the explanation will be made assuming that the process involves applying the adhesive material around the emitting optic holder.

In addition, the step (S3802) of applying adhesive material around the emitting optic holder according to an embodiment may be implemented by an adhesive material injection module included in the active alignment device according to an embodiment.

For example, the processor according to an embodiment may apply adhesive material around the emitting optic holder by driving the adhesive material injection module included in the active alignment device according to an embodiment, but is not limited thereto.

Figure 27B:
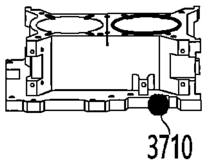

In addition, referring to FIG. 28, the active alignment process 3800 of a LiDAR device according to an embodiment may include providing the LiDAR module with adhesive material applied around the emitting optic holder to a second area (S3803), which is briefly shown in FIG. 27B.

Herein, in the step (S3803) of providing the LiDAR module with adhesive material applied around the emitting optic holder to the second area according to an embodiment, the adhesive material may not be applied around the detecting optic holder included in a LiDAR module where adhesive material is applied around the emitting optic holder.

In addition, in the step (S3803) of providing the LiDAR module with adhesive material applied around the emitting optic holder to the second area according to an embodiment, the second area may refer to a predetermined area.

For example, in the step (S3803) of providing the LiDAR module with adhesive material applied around the emitting optic holder to the second area according to an embodiment, the second area may be a pre-designated location for obtaining active alignment of the transmission module of the target LiDAR device.

More specifically, for example, in the step (S3803) of providing the LiDAR module with adhesive material applied around the emitting optic holder to the second area according to an embodiment, the second area may be a pre-designated location for adjusting the relative positional relationship between the laser emitting module and the emitting optic module included in the transmission module of the target LiDAR device, but is not limited thereto.

In addition, in the step (S3803) of providing the LiDAR module with adhesive material applied around the emitting optic holder to the second area according to an embodiment, the second area may refer to an area where the laser emitting module of the LiDAR module is located at the first target region 3710.

Herein, the first target region 3710 may refer to, but is not limited to, an area defined by Tx alignment optic modules included in the active alignment device according to an embodiment, for obtaining active alignment of the transmission module of the target LiDAR device.

In addition, in the step (S3803) of providing the LiDAR module with adhesive material applied around the emitting optic holder to the second area according to an embodiment, the second area may be the same as, or different the from first area.

In addition, the step (S3803) of providing the LiDAR module with adhesive material applied around the emitting optic holder to the second area according to an embodiment may be implemented by a carrier module included in the active alignment device according to an embodiment.

For example, the processor according to an embodiment may move the LiDAR module with adhesive material applied around the emitting optic holder to the second area by driving the carrier module included in the active alignment device according to an embodiment, but is not limited thereto.

Figure 27C:
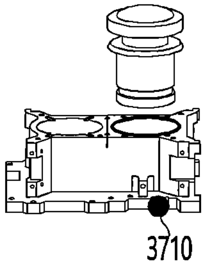

In addition, referring to FIG. 28, the active alignment process 3800 of the LiDAR device according to an embodiment may include positioning the emitting optic module on the laser emitting module (S3804), which is briefly shown in FIG. 27C.

Herein, the step (S3804) of positioning the emitting optic module on the laser emitting module according to an embodiment may include inserting the emitting optic module into the emitting optic holder, but is not limited thereto.

In addition, the step (S3804) of positioning the emitting optic module on the laser emitting module according to an embodiment may be implemented by a position adjustment module included in the active alignment device according to an embodiment.

Figure 27D:
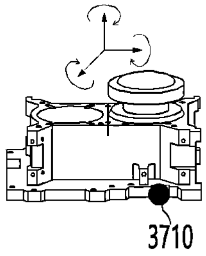

For example, the processor according to an embodiment may position the emitting optic module on the laser emitting module by driving the position adjustment module included in the active alignment device according to an embodiment, but is not limited thereto In addition, referring to FIG. 28, the active alignment process 3800 of the LiDAR device according to an embodiment may include adjusting the relative position of the emitting optic module with respect to the laser emitting module on the basis of image data that is generated based on the first laser emitted from the laser emitting module and obtained from the image sensor (S3805), which is briefly shown in FIG. 27D.

Herein, since the contents described referring to FIGS. 16 to 20 may be applied to the step (S3805) of adjusting the relative position of the emitting optic module with respect to the laser emitting module on the basis of image data that is generated based on the first laser emitted from the laser emitting module and obtained from the image sensor according to an embodiment, a redundant description will be omitted.

In addition, in the step (S3805) of adjusting the relative position of the emitting optic module with respect to the laser emitting module on the basis of image data that is generated based on the first laser emitted from the laser emitting module and obtained from the image sensor according to an embodiment, the first laser may include lasers output from a plurality of emitting unit groups, but is not limited thereto, and may include a laser output from at least one emitting unit.

In addition, in the step (S3805) of adjusting the relative position of the emitting optic module with respect to the laser emitting module on the basis of on image data that is generated based on the first laser emitted from the laser emitting module and obtained from the image sensor according to an embodiment, the image data may include, but is not limited to, image data obtained from a plurality of image sensors.

In addition, in the step (S3805) of adjusting the relative position of the emitting optic module with respect to the laser emitting module on the basis of on image data that is generated based on the first laser emitted from the laser emitting module and obtained from the image sensor according to an embodiment, the image data may include resolution data obtained based on image data obtained from a plurality of image sensors, but is not limited thereto.

In addition, in the step (S3805) of adjusting the relative position of the emitting optic module with respect to the laser emitting module on the basis of image data that is generated based on the first laser emitted from the laser emitting module and obtained from the image sensor according to an embodiment, the position of the emitting optic module may be moved in parallel or rotated with respect to at least one axis.

For example, in the step (S3805) of adjusting the relative position of the emitting optic module with respect to the laser emitting module on the basis of image data that is generated based on the first laser emitted from the laser emitting module and obtained from the image sensor according to an embodiment, the position of the emitting optic module may be moved in parallel with respect to the Z axis or rotated about the X and Y axes, but is not limited thereto.

In addition, the step (S3805) of adjusting the relative position of the emitting optic module with respect to the laser emitting module on the basis of image data that is generated based on the first laser emitted from the laser emitting module and obtained from the image sensor according to an embodiment may be implemented by a position adjustment module included in the active alignment device according to an embodiment.

For example, the processor according to an embodiment may adjust the relative position of the emitting optic module with respect to the laser emitting module on the basis of image data that is generated based on the first laser emitted from the laser emitting module and obtained from the image sensor by driving the position adjustment module included in the active alignment device according to an embodiment, but is not limited thereto.

Figure 27E:
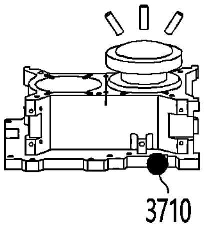

In addition, referring to FIG. 28, the active alignment process 3800 of the LiDAR device according to an embodiment may include curing the adhesive material applied around the emitting optic holder so that the adjusted relative position between the emitting optic module and the laser emitting module is maintained (S3806), which is briefly shown in FIG. 27E.

Herein, since the above-mentioned information for curing the adhesive material may be applied to the step (S3806) of curing the adhesive material applied around the emitting optic holder so that the adjusted relative position between the emitting optic module and the laser emitting module is maintained according to an embodiment, a redundant description will be omitted.

In addition, the step (S3806) of curing the adhesive material applied around the emitting optic holder so that the adjusted relative position between the emitting optic module and the laser emitting module according to an embodiment is maintained may be implemented by an adhesive material curing module included in the active alignment device according to an embodiment.

For example, the processor according to an embodiment may cure the adhesive material applied around the emitting optic holder so that the adhesive material curing module included in the active alignment device according to an embodiment is driven so that the adjusted relative position between the emitting optic module and the laser emitting module is maintained, but is not limited thereto.

Figure 27F:
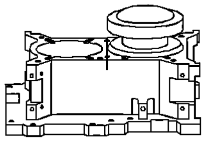

In addition, referring to FIG. 28, the active alignment process 3800 of the LiDAR device according to an embodiment may include providing the LiDAR module including the laser emitting module, the laser detecting module, the emitting optic holder, the detecting optic holder, and the emitting optic module to a third area (S3807), which is briefly shown in FIG. 27F.

Herein, the LiDAR module may refer to a LiDAR device in which at least some of the components of the LiDAR device are unassembled, but is not limited thereto, and may refer to an assembly that includes at least a portion of the LiDAR device provided as a product.

In addition, in the step (S3807) of providing a LiDAR module including the laser emitting module, the laser detecting module, the emitting optic holder, the detecting optic holder, and the emitting optic module to the third area according to an embodiment, the third area may refer to a predetermined area.

For example, in the step (S3807) of providing a LiDAR module including the laser emitting module, the laser detecting module, the emitting optic holder, the detecting optic holder, and the emitting optic module to the third area according to an embodiment, the third area may refer to, but is not limited to, a pre-designated area for applying adhesive material related to the reception module of the target LiDAR device.

More specifically, for example, in the step (S3807) of providing a LiDAR module including the laser emitting module, the laser detecting module, the emitting optic holder, the detecting optic holder, and the emitting optic module to the third area according to an embodiment, the third area may refer to, but is not limited to, a pre-designated area for applying adhesive material around the detecting optic holder.

In addition, in the step (S3807) of providing the LiDAR module including the laser emitting module, the laser detecting module, the emitting optic holder, the detecting optic holder, and the emitting optic module to the third area according to an embodiment, the third area may refer to the same area as either the first area or the second area, but is not limited thereto, and may refer to a different area from the first area and the second area.

In addition, the step (S3807) of providing a LiDAR module including the laser emitting module, the laser detecting module, the emitting optic holder, the detecting optic holder, and the emitting optic module to the third area according to an embodiment may be implemented by a carrier module included in the active alignment device according to an embodiment.

For example, a processor according to an embodiment may move the LiDAR module including the laser emitting module, laser detecting module, emitting optic holder, detecting optic holder, and emitting optic module to the third area by driving the carrier module included in the active alignment device according to an embodiment, but is not limited thereto.

In addition, referring to FIG. 28, the active alignment process 3800 of the LiDAR device according to an embodiment may include applying adhesive material around the detecting optic holder (S3808).

Herein, since the above-described contents may be applied to the adhesive material, a redundant description will be omitted.

In addition, the step (S3808) of applying adhesive material around the detecting optic holder according to an embodiment may be replaced by, or further include a step of applying adhesive material around the laser detecting module, but is not limited thereto, and may further include various steps of applying adhesive material related to the reception module of the target LiDAR device.

Hereinafter, for convenience of explanation, the explanation will be made assuming that the process involves applying the adhesive material around the detecting optic holder.

In addition, the step (S3808) of applying adhesive material around the detecting optic holder according to an embodiment may be implemented by an adhesive material injection module included in the active alignment device according to an embodiment.

For example, the processor according to an embodiment may apply adhesive material around the detecting optic holder by driving an adhesive material injection module included in the active alignment device according to an embodiment, but is not limited thereto.

Figure 27G:
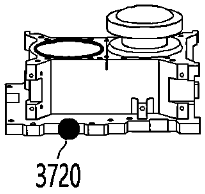

In addition, referring to FIG. 26, the active alignment process 3800 of the LiDAR device according to an embodiment may include providing the LiDAR module with adhesive material applied around the detecting optic holder to a fourth area (S3809), which is briefly shown in FIG. 27G.

Herein, in the step (S3809) of providing the LiDAR module with adhesive material applied around the detecting optic holder to the fourth area according to an embodiment, although the adhesive material applied around the detecting optic holder may not have been cured, the adhesive material applied around the emitting optic holder may have been cured, but is not limited thereto.

In addition, in the step (S3809) of providing the LiDAR module with adhesive material applied around the detecting optic holder to the fourth area according to an embodiment, the fourth area may refer to a predetermined area.

For example, in the step (S3809) of providing the LiDAR module with adhesive material applied around the detecting optic holder to the fourth area according to an embodiment, the fourth area may be a pre-designated location for obtaining active alignment of the reception module of the target LiDAR device.

More specifically, for example, in the step (S3809) of providing the LiDAR module with adhesive material applied around the detecting optic holder to the fourth area according to an embodiment, the fourth area may be a pre-designated location for adjusting the relative positional relationship between the laser detecting module and the detecting optic module included in the reception module of the target LiDAR device, but is not limited thereto.

In addition, in the step (S3809) of providing the LiDAR module with adhesive material applied around the detecting optic holder to the fourth area according to an embodiment, the fourth area may refer to an area where the laser detecting module of the LiDAR module is located at the second target region 3720.

Herein, the second target region 3720 may refer to an area defined by Rx alignment optic modules included in the active alignment device according to an embodiment to obtain active alignment of the reception module of the target LiDAR device, but is not limited thereto.

In addition, the second target region 3720 may be the same as or different from the first target region 3710.

In addition, in the step (S3809) of providing the LiDAR module with adhesive material applied around the detecting optic holder to the fourth area according to an embodiment, the fourth area may be the same as or different from at least one of the first to third areas.

In addition, the step (S3809) of providing a LiDAR module with adhesive material applied around the detecting optic holder to the fourth area according to an embodiment may be implemented by a carrier module included in the active alignment device according to an embodiment.

For example, the processor according to an embodiment may move the LiDAR module with adhesive material applied around the detecting optic holder to the fourth area by driving the carrier module included in the active alignment device according to an embodiment, but is not limited thereto.

Figure 27H:
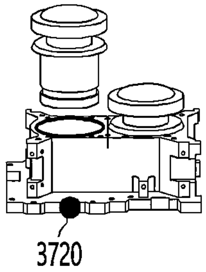

In addition, referring to FIG. 28, the active alignment process 3800 of the LiDAR device according to an embodiment may include positioning the detecting optic module on the laser detecting module (S3810), which is briefly shown in FIG. 27H.

Herein, the step (S3810) of positioning the detecting optic module on the laser detecting module according to an embodiment may include inserting the detecting optic module into the detecting optic holder, but is not limited thereto.

In addition, the step (S3810) of positioning the detecting optic module on the laser detecting module according to an embodiment may be implemented by a position adjustment module included in the active alignment device according to an embodiment.

For example, the processor according to an embodiment may position the detecting optic module on the laser detecting module by driving the position adjustment module included in the active alignment device according to an embodiment, but is not limited thereto.

Figure 27I:
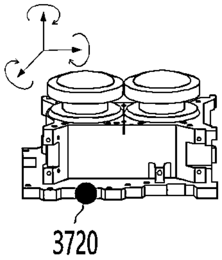

In addition, referring to FIG. 28, the active alignment process 3800 of the LiDAR device according to an embodiment may include adjusting the relative position of the detecting optic module with respect to the laser detecting module on the basis of the first detecting data that is generated based on light with a predetermined pattern and obtained from the laser detecting module (S3811), which is briefly shown in FIG. 27I.

Herein, since the contents described referring to FIGS. 11 to 15 may applied to the step (S3811) of adjusting the relative position of the detecting optic module with respect to the laser detecting module on the basis of the first detecting data that is generated based on light with a predetermined pattern and obtained from the laser detecting module and obtained from the laser detecting module according to an embodiment, a redundant description will be omitted.

In addition, in the step (S3811) of adjusting the relative position of the detecting optic module with respect to the laser detecting module on the basis of the first detecting data that is generated based on light with a predetermined pattern and obtained from the laser detecting module and obtained from the laser detecting module according to an embodiment, the first detecting data may include signals obtained from a plurality of detecting unit groups, but is not limited thereto.

In addition, in the step (S3811) of adjusting the relative position of the detecting optic module with respect to the laser detecting module on the basis of the first detecting data that is generated based on light with a predetermined pattern and obtained from the laser detecting module and obtained from the laser detecting module according to an embodiment, the first detecting data may include point data generated based on signals obtained from a plurality of detecting unit groups, but is not limited thereto.

In addition, in the step (S3811) of adjusting the relative position of the detecting optic module with respect to the laser detecting module on the basis of the first detecting data that is generated based on light with a predetermined pattern and obtained from the laser detecting module and obtained from the laser detecting module according to an embodiment, the first detecting data may include resolution data generated based on signals obtained from a plurality of detecting unit groups, but is not limited thereto.

In addition, in the step (S3811) of adjusting the relative position of the detecting optic module with respect to the laser detecting module on the basis of the first detecting data that is generated based on light with a predetermined pattern and obtained from the laser detecting module and obtained from the laser detecting module according to an embodiment, the position of the detecting optic module may be moved in parallel with respect to at least one axis, or rotated about at least one axis.

For example, in the step (S3811) of adjusting the relative position of the detecting optic module with respect to the laser detecting module on the basis of the first detecting data that is generated based on light with a predetermined pattern and obtained from the laser detecting module and obtained from the laser detecting module according to an embodiment, the position of the detecting optic module may be moved in parallel with respect to the Z axis or rotated about the X and Y axes, but is not limited thereto.

In addition, the step (S3811) of adjusting the relative position of the detecting optic module with respect to the laser detecting module on the basis of the first detecting data that is generated based on light with a predetermined pattern and obtained from the laser detecting module and obtained from the laser detecting module according to an embodiment may be implemented by a position adjustment module included in the active alignment device according to an embodiment.

Figure 27J:
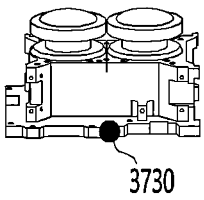

For example, the processor according to an embodiment may adjust the relative position of the detecting optic module with respect to the laser detecting module on the basis of the first detecting data that is generated based on light with a predetermined pattern and obtained from the laser detecting module by driving the position adjustment module included in the active alignment device according to an embodiment, but it is not limited thereto In addition, referring to FIG. 28, the active alignment process 3800 of the LiDAR device according to an embodiment may include providing the LiDAR module including the laser emitting module, the laser detecting module, the emitting optic holder, the detecting optic holder, the detecting optic module, and the emitting optic module to a fifth area (S3812), which is briefly shown in FIG. 27J.

Herein, although the LiDAR module may refer to a LiDAR device in which at least some of the components of the LiDAR device are unassembled, it may refer to, but is not limited to, an assembly that includes at least a portion of the LiDAR device provided as a product.

In addition, in the step (S3812) of providing the LiDAR module including the laser emitting module, the laser detecting module, the emitting optic holder, the detecting optic holder, the detecting optic module, and the emitting optic module to the fifth area according to an embodiment, the fifth area may refer to a predetermined area.

For example, in the step (S3812) of providing the LiDAR module including the laser emitting module, the laser detecting module, the emitting optic holder, the detecting optic holder, the detecting optic module, and the emitting optic module to the fifth area according to an embodiment, the fifth area may refer to a pre-designated area for obtaining alignment between the transmission module and reception module of the target LiDAR device, but is not limited thereto.

In addition, in the step (S3812) of providing the LiDAR module including the laser emitting module, the laser detecting module, the emitting optic holder, the detecting optic holder, the detecting optic module, and the emitting optic module to the fifth area according to an embodiment, the fifth area may refer to an area where the middle area between the laser emitting module and the laser detecting module included in the LiDAR module is located at the third target region 3730.

Herein, the third target region 3730 may refer to an area defined by matching alignment optic modules included in the active alignment device according to an embodiment for obtaining alignment between the transmission module and reception module of the target LiDAR device, but is not limited thereto.

In addition, the third target region 3730 may be the same as or different from any one target region of the first and second target regions 3710 and 3720.

In addition, in the step (S3812) of providing the LiDAR module including the laser emitting module, the laser detecting module, the emitting optic holder, the detecting optic holder, the detecting optic module, and the emitting optic module to the fifth area according to an embodiment, the fifth area may refer to the same area as any one of the first to fourth areas, but is not limited thereto, and may refer to a different area from the first to fourth areas.

In addition, in the step (S3812) of providing the LiDAR module including the laser emitting module, the laser detecting module, the emitting optic holder, the detecting optic holder, the detecting optic module, and the emitting optic module to the fifth area according to an embodiment, when the fifth area is the same as the fourth area, this step may be omitted.

In addition, the step (S3812) of providing the LiDAR module including the laser emitting module, the laser detecting module, the emitting optic holder, the detecting optic holder, the detecting optic module, and the emitting optic module to the fifth area according to an embodiment may be implemented by a carrier module included in the active alignment device according to an embodiment.

For example, the processor according to an embodiment may move The LiDAR module including the laser emitting module, laser detecting module, emitting optic holder, detecting optic holder, detecting optic module, and emitting optic module to the fifth area by driving the carrier module included in the active alignment device according to an embodiment, but is not limited thereto.

Figure 27K:
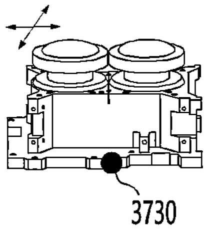

In addition, referring to FIG. 28, the active alignment process 3800 of the LiDAR device according to an embodiment may include shifting the relative position of the detecting optic module with respect to the laser detecting module on the basis of second detecting data that is generated based on the second laser emitted from the laser emitting module and obtained from the laser detecting module (S3813), which is briefly shown in FIG. 27K.

Herein, since the contents described referring to FIGS. 22 to 24 may be applied to the step (S3813) of shifting the relative position of the detecting optic module to the laser detecting module on the basis of the second detecting data that is generated based on the second laser emitted from the laser emitting module and obtained from the laser detecting module according to an embodiment, a redundant description will be omitted.

In addition, in the step (S3813) of shifting the relative position of the detecting optic module to the laser detecting module on the basis of the second detecting data that is generated based on the second laser emitted from the laser emitting module and obtained from the laser detecting module according to an embodiment, the second laser may include lasers output from a plurality of emitting unit groups, but is not limited thereto, and may include a laser output from at least one emitting unit.

In addition, in the step (S3813) of shifting the relative position of the detecting optic module to the laser detecting module on the basis of the second detecting data that is generated based on the second laser emitted from the laser emitting module and obtained from the laser detecting module according to an embodiment, the second detecting data may include, but is not limited to, signals obtained from a plurality of detecting unit groups.

In addition, in the step (S3813) of shifting the relative position of the detecting optic module to the laser detecting module on the basis of the second detecting data that is generated based on the second laser emitted from the laser emitting module and obtained from the laser detecting module according to an embodiment, the second detecting data may include, but is not limited to, point data generated based on signals obtained from a plurality of detecting unit groups.

In addition, in the step (S3813) of shifting the relative position of the detecting optic module to the laser detecting module on the basis of the second detecting data that is generated based on the second laser emitted from the laser emitting module and obtained from the laser detecting module according to an embodiment, the second detecting data may include, but is not limited to, resolution data generated based on signals obtained from a plurality of detecting unit groups.

In addition, in the step (S3813) of shifting the relative position of the detecting optic module to the laser detecting module on the basis of the second detecting data that is generated based on the second laser emitted from the laser emitting module and obtained from the laser detecting module according to an embodiment, the position of the detecting optic module may be moved in parallel with respect to at least one axis.

For example, in the step (S3813) of shifting the relative position of the detecting optic module to the laser detecting module on the basis of the second detecting data that is generated based on the second laser emitted from the laser emitting module and obtained from the laser detecting module according to an embodiment, the position of the detecting optic module may be moved in parallel with respect to the X-axis or Y-axis, but is not limited thereto.

In addition, the step (S3813) of shifting the relative position of the detecting optic module to the laser detecting module on the basis of the second detecting data that is generated based on the second laser emitted from the laser emitting module and obtained from the laser detecting module according to an embodiment may be implemented by a position adjustment module included in the active alignment device according to an embodiment.

For example, the processor according to an embodiment may shift the relative position of the detecting optic module with respect to the laser detecting module on the basis of the second detecting data that is generated based on the second laser emitted from the laser emitting module and obtained from the laser detecting module by driving the position adjustment module included in the active alignment device according to an embodiment, but is not limited thereto.

Figure 27L:
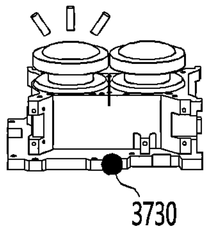

In addition, referring to FIG. 28, the active alignment process 3800 of the LiDAR device according to an embodiment may include curing the adhesive material applied around the detecting optic holder so that the shifted relative position between the detecting optic module and the laser detecting module is maintained (S3814), which is briefly shown in FIG. 27L.

Herein, since the above-mentioned information for curing the adhesive material may be applied to the step (S3814) of curing the adhesive material applied around the detecting optic holder so that the shifted relative position between the detecting optic module and the laser detecting module is maintained according to an embodiment, a redundant description will be omitted.

In addition, the step (S3814) of curing the adhesive material applied around the detecting optic holder so that the shifted relative position between the detecting optic module and the laser detecting module is maintained according to an embodiment may be implemented by an adhesive material curing module included in the active alignment device according to an embodiment.

For example, the processor according to an embodiment may cure the adhesive material applied around the detecting optic holder so that the shifted relative position between the detecting optic module and the laser detecting module is maintained by driving the adhesive material curing module included in the active alignment device according to an embodiment, but is not limited thereto.

The method according to the embodiment may be implemented in the form of program instructions that may be executed through various computer means and recorded on a computer-readable medium. The computer-readable medium may include program instructions, data files, data structures, etc., singly or in combination. Program instructions recorded on the medium may be specially designed and configured for the embodiment or may be known and available to those skilled in the art of computer software. Examples of computer-readable recording media include magnetic media such as hard disks, floppy disks, and magnetic tapes; optical media such as CD-ROM and DVD; magneto-optical media, such as a floptical disk; and hardware devices specifically configured to store and execute program instructions, such as ROM, RAM, flash memory, etc. Examples of program instructions include machine language code, such as that produced by a compiler, as well as high-level language code that can be executed by a computer using an interpreter, etc. The hardware devices described above may be configured to operate as one or more software modules to perform the operations of the embodiments, and vice versa.

As described above, although the embodiments have been described with limited examples and drawings, those skilled in the art will be able to make various modifications and variations from the above description. For example, even though the techniques described may be performed in a different order than the method described, and/or the components of the described system, structure, device, circuit, and the like are combined in a form different from the described method, or are replaced or substituted by other components or equivalents, adequate results can be achieved.

Therefore, other implementations, other embodiments, and equivalents of the claims also fall within the scope of the claims described below.

FORMS FOR PRACTICING THE INVENTION

As described above, the relevant details have been described in the best mode for carrying out the invention.

What is claimed is:

1. A method for manufacturing a LiDAR (Light Detection And Ranging) device comprising a laser emitting module, a laser detecting module, an emitting optic module and a detecting optic module, the method comprising:

providing a LiDAR module comprising the laser emitting module and the laser detecting module on a target region;

positioning the detecting optic module on the laser detecting module;

adjusting a relative position of the laser detecting module with respect to the detecting optic module based on first detecting data obtained from the laser detecting module, wherein the first detecting data is generated based on light having a predetermined pattern;

fixing the laser detecting module so that the adjusted relative position of the laser detecting module with respect to the detecting optic module is maintained;

positioning the emitting optic module on the laser emitting module;

adjusting a relative position of the laser emitting module with respect to the emitting optic module based on image data obtained from at least one of image sensors, wherein the image data is generated for laser emitted from the laser emitting module;

shifting the adjusted relative position of the laser emitting module with respect to the emitting optic module based on second detecting data obtained from the laser detecting module, wherein the second detecting data is generated based on laser emitted from the laser emitting module; and fixing the laser emitting module so that the shifted relative position of the laser emitting module with respect to the emitting optic module is maintained.

2. The method for manufacturing the LiDAR device of claim 1, wherein the LiDAR module further includes an emitting optic holder and detecting optic holder.

3. The method for manufacturing the LiDAR device of claim 2, wherein the positioning the emitting optic module on the laser emitting module comprises:

inserting the emitting optic module into the emitting optic holder.

4. The method for manufacturing the LiDAR device of claim 2, wherein the positioning the detecting optic module on the laser detecting module comprises:

inserting the detecting optic module into the detecting optic holder.

5. The method for manufacturing the LiDAR device of claim 2, further comprising:

applying an adhesive material around the emitting optic holder, wherein the fixing the emitting optic module comprises:

curing the adhesive material applied around the emitting optic holder.

6. The method for manufacturing the LiDAR device of claim 2, further comprising:

applying an adhesive material around the detecting optic holder, wherein the fixing the detecting optic module comprises:

curing the adhesive material applied around the detecting optic holder.

7. The method for manufacturing the LiDAR device of claim 1, wherein the image data includes a first image data and second image data, wherein the first image data is generated for laser emitted from the laser emitting module when the laser emitting module is in a first position, and wherein the second image data is generated for laser emitted from the laser emitting module in response to the laser emitting module being in a second position.

8. The method for manufacturing the LiDAR device of claim 7, wherein the second position of the laser emitting module is a position that is moved in parallel with respect to a first axis from the first position of the laser emitting module, and wherein a direction of the first axis is a direction in which the laser emitting module and the emitting optic module are positioned.

9. The method for manufacturing the LiDAR device of claim 1, wherein the image data includes first image data obtained from a first image sensor and second image data obtained from a second image sensor.

10. The method for manufacturing the LiDAR device of claim 9, wherein the first image data is generated for laser emitted from a first emitting unit group of the laser emitting module, and wherein the second image data is generated for laser emitted from a second emitting unit group of the laser emitting module.

11. The method for manufacturing the LiDAR device of claim 10, wherein the first emitting unit group and the second emitting unit group include at least one of emitting unit.

12. The method for manufacturing for the LiDAR device of claim 10, wherein the first emitting unit group and the second emitting unit group are disposed on different areas.

13. The method for manufacturing the LiDAR device of claim 1, wherein the first detecting data includes detecting data generated based on light having the predetermined pattern in response to the laser detecting module being in a first position and detecting data generated based on light having the predetermined pattern in response to the laser detecting module being in a second position.

14. The method for manufacturing the LiDAR device of claim 13, wherein the second position of the laser detecting module is a position that is moved in parallel with respect to a first axis from the first position of the laser detecting module, and wherein a direction of the first axis is a direction in which the laser detecting module and the detecting optic module are positioned.

15. The method for manufacturing the LiDAR device of claim 1, wherein a wavelength range of the light having the predetermined pattern overlaps at least partially with a wavelength range of laser emitted from the laser emitting module.

* * * * *